United States Patent
Shimizu et al.

(10) Patent No.: US 7,094,280 B2
(45) Date of Patent: Aug. 22, 2006

(54) WATER-SOLUBLE COMPLEX DYE, RECORDING FLUID AND RECORDING METHOD

(75) Inventors: Wataru Shimizu, Fukuoka (JP); Masahiro Yamada, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 171 days.

(21) Appl. No.: 11/014,854

(22) Filed: Dec. 20, 2004

(65) Prior Publication Data

US 2005/0103225 A1    May 19, 2005

Related U.S. Application Data

(63) Continuation of application No. PCT/JP03/09113, filed on Jul. 17, 2003.

(30) Foreign Application Priority Data

Jul. 17, 2002 (JP) .............................. 2002-207711
Apr. 3, 2003 (JP) .............................. 2003-099931

(51) Int. Cl.
*C09D 11/02* (2006.01)
*C09B 45/00* (2006.01)

(52) U.S. Cl. .............................. 106/31.46; 106/31.48; 106/31.49; 106/31.5; 106/31.52; 534/707

(58) Field of Classification Search ............ 106/31.48, 106/31.46, 31.49, 31.5, 31.52; 347/100; 534/707
See application file for complete search history.

(56) References Cited

U.S. PATENT DOCUMENTS

| | | | |
|---|---|---|---|
| 6,001,161 A | 12/1999 | Evans et al. | |
| 6,534,636 B1 * | 3/2003 | Wang et al. | 534/707 |
| 6,712,890 B1 * | 3/2004 | Hadjisoteriou et al. | 106/31.47 |
| 6,737,517 B1 | 5/2004 | Shimizu | 534/704 |
| 6,755,903 B1 * | 6/2004 | Yamada et al. | 106/31.45 |
| 6,827,770 B1 | 12/2004 | Chino et al. | 106/31.46 |
| 2002/0130937 A1 * | 9/2002 | Hadjisoteriou et al. | 347/100 |
| 2003/0088077 A1 * | 5/2003 | Yamada et al. | 534/707 |
| 2003/0148216 A1 * | 8/2003 | Wang et al. | 430/270.16 |

FOREIGN PATENT DOCUMENTS

| | | | |
|---|---|---|---|
| GB | 2372750 | | 9/2002 |
| JP | 57-42775 | | 3/1982 |
| JP | 2-80470 | | 3/1990 |
| JP | 04-235093 | * | 8/1992 |
| JP | 8-295811 | | 11/1996 |
| JP | 10-72560 | | 3/1998 |
| JP | 11-293168 | | 10/1999 |
| JP | 2001-19880 | | 1/2001 |

OTHER PUBLICATIONS

Derwent abstract of JP 04-235093, Aug. 1992.*
Patent Abstracts of Japan of JO 04-235093, Aug. 1992.*
English Translation of Japanese Patent Application No. 04-235093, Aug. 1992.

* cited by examiner

*Primary Examiner*—Helene Klemanski

(57) ABSTRACT

A water-soluble complex dye capable of forming an image having light resistance, ozone resistance and high saturation; a water-based recording fluid, particularly an ink jet recording fluid, employing such a dye; and an ink jet recording method, are presented.

25 Claims, No Drawings

WATER-SOLUBLE COMPLEX DYE, RECORDING FLUID AND RECORDING METHOD

TECHNICAL FIELD

The present invention relates to a water-soluble complex dye, a recording fluid, especially an ink jet recording fluid, and an ink jet recording method. Particularly, the present invention relates to a water-soluble complex dye which is capable of satisfying three characteristics of high saturation, high light resistance and high gas resistance at the time of forming a color image, a recording fluid, especially an ink jet recording fluid, containing such a dye, and an ink set employing such a recording fluid, as well as an ink jet recording method.

BACKGROUND ART

An ink jet recording method is a method wherein droplets of a recording fluid containing a water-soluble dye such as a direct dye or an acid dye are jetted from fine discharge orifices, and it is a recording method whereby high speed recording or multi color image recording is possible. The recording fluid is required to quickly fix to recording sheets commonly used for the office work, such as PPC (plain paper copier) sheets for electrophotography or fan hold sheets (continuous paper for e.g. computers) and yet to present a good printing quality for the printed matter i.e. to present a sharp profile of printed letters without bleeding, and the recording fluid is also required to be excellent in the stability during storage. Accordingly, the solvent which may be used for the recording fluid, is very limited.

Further, with respect to the dye for the recording fluid, it is required to have an adequate solubility in the solvent which is limited as described above, and it is also required that even when stored for a long period of time in the form of a recording fluid, it is stable, and the saturation and density of the printed image are high, and yet, it is excellent in water resistance, light resistance and ozone resistance.

Thus, in a conventional yellow color recording fluid (ink), a common dye such as direct yellow 132, direct yellow 86 or acid yellow 23, as disclosed in the color index, has been used. However, these dyes have had a problem that the image tends to fade under irradiation with light i.e. the light resistance is poor.

As a method for solving this problem, e.g. JP-A-57-42775 proposes a recording fluid containing a specific metal complex dye of the type where a metal is coordinated in the vicinity of an azo group. The metal complex dye exemplified there is one prepared by using, as a diazo component, a specific 6-membered cyclic aromatic compound having either a carbon atom possessing an orthohydroxyl group, or a nitrogen atom to form a coordination bond and using, as a coupling component, a 5-membered cyclic pyrazole derivative having a hydroxy group on the carbon adjacent to the carbon bonded to the azo group. It is certainly expected that if such a dye is employed for ink jet recording, the light resistance will be improved as compared with the above-mentioned common dyes. The present inventors have earlier proposed a recording fluid containing a metal complex dye of this type having the water resistance or light resistance improved (JP-A-2-80470). However, the metal complex dye of the above-mentioned type tends to be inferior to the conventional common dye in the gas resistance which has recently become important in order to preserve an ink jet image. Such an inferior performance tends to be more distinct in an image formed on an ink jet sheet dedicated to obtain an image like a photograph, which has been remarkably progressed in the last few years. Accordingly, a dye satisfying both light resistance and gas resistance has been desired more than ever.

Here, the gas resistance is a nature to prevent an undesirable phenomenon such that the dye tends to fade by a gas which becomes various active species, such as a nitrogen oxide, a sulfur oxide, other acidic gas or ozone, in air. This fading phenomenon by gas is known to have a high inter-relation with an accelerated test wherein an image is exposed to e.g. an air containing ozone at a concentration of 3 ppm or 10 ppm. Accordingly, the gas resistance is commonly reworded as ozone resistance. Also in this specification, as an index of gas resistance, a parameter obtained by evaluating the degree of fading of a test specimen subjected to exposure to ozone (i.e. an evaluation result of ozone resistance) will be used hereinafter for evaluation.

Further, JP-A-11-293168 discloses examples of a compound prepared by using, as a diazo component, a specific aromatic compound having a carbon having a hydroxyl group adjacent to the carbon bonded to the azo group or a specific aromatic compound having a carbon substituted with a sulfo group adjacent to the carbon bonded to the azo group and using, as a coupling component, a pyrazole derivative as a 5-membered ring or a pyridone-derivative as a 6-membered ring, similar to the dye disclosed in the above-mentioned JP-A-57-42775. This publication clearly describes that it is possible to obtain a vivid magenta dye with the value a* representing a reddish color being at least 50 and with the value b* representing yellowish color being in the vicinity of 0, which is excellent in light resistance. However, in this publication, nothing is disclosed with respect to the ozone resistance of the dye, and such a dye is also considered to be poor in ozone resistance, as is often the case with a compound wherein a coordinate bond is formed via a hydroxyl group of the diazo component.

Further, JP-A-10-072560 proposes a specific metal complex dye of the type wherein a metal is dicoordinated with a part of a coupler i.e. not in the vicinity of the azo group. The characteristic of the metal complex dye exemplified here is that the metal coordinate bond is not present in the vicinity of a so-called chromophoric group such as an azo group or a methine group, but it forms a dicoordinated or higher coordinated bond at a site distanced from there. It is reported that as a result, a dye having a highly vivid color and yet having high light resistance, was obtained. However, nothing is disclosed with respect to the gas resistance.

In addition, in order to form a full color image by an ink jet recording method, it is common to use inks with three primary colors of yellow (Y), magenta (M) and cyan (C) or inks with four colors having black (Bk) added thereto, and to control the discharge amounts of the respective inks, so that such colors are mixed on the recording material to form an image. With respect to fading of such a full color image, it is desired that the fading balance of the primary colors constituting such a color is uniform, but when common dyes such as direct yellow 132, direct yellow 86 and acid yellow 23 disclosed in the above-mentioned color index are used as the yellow color to be used in a conventional dye ink set, they had a problem such that a red or green image obtained in a case where they are used in combination with a magenta dye or a cyan dye to form the color image, is likely to undergo a color change.

It is an object of the present invention to provide a water-soluble complex dye which is excellent in light resistance and ozone resistance and yet capable of forming an image having high saturation in an ink jet recording method; a water-based recording fluid, particularly an ink jet recording fluid, employing such a dye; and an ink set employing such a recording fluid, as well as an ink jet recording method.

DISCLOSURE OF THE INVENTION

As a result of an extensive study on a dye satisfying all of the above-mentioned three characteristics i.e. light resistance, ozone resistance and color saturation, the present inventors have found that a water-soluble metal complex dye having a specific structure at a site adjacent to the carbon bonded to the azo group, is excellent in all of the light resistance, ozone resistance and color saturation, and thus have accomplished the present invention.

Namely, the gist of the present invention resides in a water-soluble complex dye comprising an azo dye represented by the following formula (1) or its tautomer, and transition metal ions, a water-based recording fluid, particularly an ink jet recording fluid, containing at least one of such dyes, and an ink set employing such a recording fluid, as well as an ink jet recording method employing such a recording fluid.

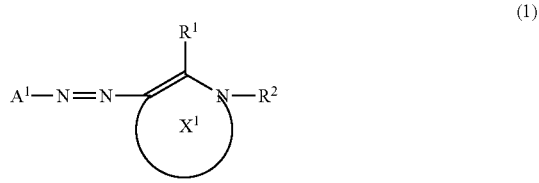

(1)

(In the formula (1), $A^1$ is a 5- to 7-membered hetero monocyclic group containing one or two hetero atoms among the ring forming atoms, or a condensed heterocyclic group containing such a hetero monocyclic group and may have an optional substituent, provided that it is a group which does not have a hydroxyl group as a substituent at a position adjacent to the carbon atom bonded to the azo group; ring $X^1$ represents a condensed hetero ring containing a 6-membered hetero ring, said 6-membered hetero ring being a group bonded to the azo group, and may have an optional substituent; and each of $R^1$ and $R^2$ which are independent of each other, represents a hydrogen atom or a monovalent substituent.)

BEST MODE FOR CARRYING OUT THE INVENTION

1. Water-soluble Complex Dye

The metal complex dye useful for the water-based recording fluid, particularly the ink jet recording fluid, of the present invention, is a water-soluble complex dye having a specific structure, which comprises an azo compound represented by the above formula (1) or its tautomer, and transition metal ions.

In the formula (1), $A^1$ is a 5- to 7-membered hetero monocyclic group containing one or two hetero atoms among the ring forming atoms, or a condensed heterocyclic group containing such a hetero monocyclic group, and such a heteromonocyclic group or a condensed heterocyclic group may have an optional substituent, but is one which does not have a hydroxyl group as a substituent at a position adjacent to the carbon atom bonded to the azo group.

The heterocyclic group represented by $A^1$ may, for example, be a thiophene ring, a pyrrole ring, a furan ring, an imidazole ring, a pyrazole ring, an oxazole ring, an isoxazole ring, a thiazole ring, an isothiazole ring, a pyridine ring, a pyridazine ring, a pyrimidine ring, a pyrazine ring, a benzothiazole ring, a benzoxazole ring, a benzimidazole ring, a quinoline ring, a phthalazine ring, an imidazopyrimidine ring, an imidazoquinoline ring, an imidazoquinoxaline ring, a pyrazolopyrimidine ring, a pyrrolotriazine ring, a pyrrolotriazole ring, a triazolopyrimidine ring, a triazolotriazine ring or a triazoloquinoxaline ring. Among them, preferred is a ring containing at least one nitrogen atom as a hetero atom and more preferred is one containing two hetero atoms. Specifically, more preferred is an imidazole ring, a pyrazole ring, an oxazole ring, a thiazole ring or a thiazole ring or an isothiazole ring. Further preferred is an imidazole ring, a thiazole ring or an isothiazole ring. Particularly preferred is an imidazole ring.

Further, its bonding position is preferably such that it is bonded to the azo group at a carbon atom among the ring-forming atoms, and at least one of the ring-forming atoms adjacent to the bonded carbon atom is a nitrogen atom, an oxygen atom or a sulfur atom, or a carbon atom having a substituent capable of forming a coordinate bond with a metal atom other than a hydroxyl group. It is more preferred that it is bonded so that the ring-forming atom adjacent to the bonded carbon atom will be a nitrogen atom.

The heterocyclic group represented by $A^1$ may have at least one substituent on the hetero ring, and the substituent on the hetero ring is not particularly limited so long as it is a group which does not.adversely affect the performance of the dye. However, the substituent is usually a group having a molecular weight of from about 10 to 1000. Specifically, it may be substituted by substituent(s) selected from the group consisting of a halogen atom such as a chlorine atom, a bromine atom or a fluorine atom; a hydroxyl group; a mercapto group; a nitro group; a cyano group; a carboxyl group; a sulfo group; a phosphono group; a linear, branched or cyclic alkyl group such as a methyl group, an ethyl group, a n-propyl group, an isopropyl group or a n-butyl group, which may be substituted; a linear, branched or cyclic alkenyl group such as a vinyl group, a 2-propenyl group, an isopropenyl group or a 2-butenyl group, which may be substituted; an aryl group such as a phenyl group or a naphthyl group, which may be substituted; an alkoxy group such as a methoxy group, an ethoxy group, a n-propoxy group, an isopropoxy group or a n-butoxy group, which may be substituted; an alkenyloxy group such as a vinyloxy group, a 2-propenyloxy group, an isopropenyloxy group or a 2-butenyloxy group, which may be substituted; an aryloxy group such as a phenoxy group or a naphthyloxy group, which may be substituted, an acyl group such as an acetyl group, a propionyl group, a propylcarbonyl group, a butylcarbonyl group, a vinylcarbonyl group, an isopropenylcarbonyl group, a benzoyl group or a benzylcarbonyl group; an acyloxy group such as an acetyloxy group, a propionyloxy group, an isobutyryloxy group, a pivaloyloxy group, an acryloyloxy group, a methacryloyloxy group or a benzoyloxy group; a carbamoyl group which may be substituted; a carboxylate group comprising an alkoxycarbonyl group which may be substituted, such as a methoxycarbonyl group, an ethoxycarbonyl group, a propoxycarbonyl group, an isopropoxycarbonyl group or a butoxycarbonyl group, and an aryloxycarbonyl group which may be substituted, such as a phenoxycarbonyl group, a naphthyloxycarbonyl group, a methylphenoxycarbonyl group, a methoxyphenoxycarbonyl group, a carboxyphenoxycarbonyl group or a sulfophenoxycarbonyl group; an amino group which may be substituted; an alkylthio group such as a methylthio group, an ethylthio group, a propylthio group or a butylthio group, which may be substituted; an alkenylthio group such as a vinylthio group, a 2-propenylthio group or an isopropenylthio group, which may be substituted; an arylthio group such as a phenylthio group or a naphthylthio group, which may be substituted; an alkylsulfinyl group such as a methylsulfinyl group, an ethylsulfinyl group, a propylsulfinyl group or an isopropylsulfinyl group, which may be substituted; an arylsulfinyl group such as a phenylsulfinyl group or a naphthylsulfinyl group, which may be substituted; an alkylsulfonyl group such as a methylsulfonyl group, an ethylsulfonyl group, a propylsulfonyl group or a butylsulfonyl group, which may be substituted; an arylsulfonyl group such as a phenylsulfonyl group or a naphthylsulfonyl group, which may be substituted; a sulfamoyl group which may be substituted; a sulfonate group comprising an alkoxysulfonyl group such as a methoxysulfonyl group, an ethoxysulfonyl group, an isopropoxysulfonyl group, a butoxysulfonyl group or a benzyloxysulfonyl group, and an aryloxysulfonyl group such as a phenoxysulfonyl group or a methylphenoxysulfonyl group; and a thiocyanate group.

The above-mentioned alkyl group which may be substituted, the alkenyl group which may be substituted, the alkoxy group which may be substituted, the alkenyloxy group which may be substituted, the acyl group, the acyloxy group, the carbamoyl group which may be substituted, the carboxylate group, the amino group which may be substituted, the alkylthio group which may be substituted, the alkenylthio group which may be substituted, the alkylsulfinyl group which may be substituted, the alkylsulfonyl group which may be substituted, the sulfamoyl group which may be substituted, and the sulfonate group, are preferably those having a carbon number of at most 10, more preferably at most 6, further preferably at most 4. The above-mentioned aryl group which may be substituted, the aryloxy group which may be substituted, the arylthio group which may be substituted, the arylsulfinyl group which may be substituted, and the arylsulfonyl group which may be substituted, are preferably those having a carbon number of at most 15, more preferably at most 12, further preferably at most 8.

Substituents for the above alkyl group, the alkenyl group, the aryl group, the alkoxy group, the alkenyloxy group, the aryloxy group, the carbamoyl group, the amino group, the alkylthio group, the alkenylthio group, the arylthio group, the alkylsulfinyl group, the arylsulfinyl group, the alkylsulfonyl group, the arylsulfonyl group and the sulfamoyl group, may, for example, be a halogen atom; a hydroxyl group; a cyano group; a carboxyl group; a sulfo group; a phosphono group; an alkyl group which may be substituted by a hydrophilic group such as a hydroxyl group, a carboxyl group, a sulfo group or a phosphono group; an aryl group which may be substituted by a hydrophilic group such as a hydroxyl group, a carboxyl group, a sulfo group or a phosphono group; an alkoxy group which may be substituted by a hydrophilic group such as a hydroxyl group, a carboxyl group, a sulfo group or a phosphono group; an aryloxy group which may be substituted by a hydrophilic group such as a hydroxyl group, a carboxyl group, a sulfo group or a phosphono group; an acyl group; a carbamoyl group; a carboxylate group; a sulfonate group; or an amino group which may be substituted by alkyl. Among them, a halogen atom; a hydroxyl group; a carboxyl group; a sulfo group; a phosphono group; an alkyl group which may be substituted by a hydrophilic group such as a hydroxyl group, a carboxyl group, a sulfo group or a phosphono group; an aryl group or an alkoxy group which may be substituted by a hydrophilic group such as a hydroxyl group, a carboxyl group, a sulfo group or a phosphono group; or an acyl group, is preferred.

Further, among the above alkyl groups which may be substituted, preferred is an alkyl group which may be substituted by a substituent selected from the group consisting of a halogen atom, a hydroxyl group, a carboxyl group and an aryl group, such as a methyl group, an ethyl group, a n-propyl group, an isopropyl group, a n-butyl group, a hydroxyethyl group, a carboxymethyl group, a carboxyethyl group, a trifluoromethyl group, a benzyl group or a phenethyl group.

Among the above alkenyl group which may be substituted, preferred is a hydroxyalkenyl group or an unsubstituted alkenyl group.

Among the above aryl groups which may be substituted, preferred is an aryl group which may be substituted by a substituent selected from the group consisting of a carboxyl group and a sulfo group, such as a phenyl group, a naphthyl group, a carboxyphenyl group or a sulfophenyl group.

Among the above alkoxy groups which may be substituted, preferred is a hydroxyalkoxy group or an unsubstituted alkoxy group.

Among the above alkenyloxy groups which may be substituted, preferred is a hydroxyalkenyloxy group or an unsubstituted alkenyloxy group.

The aryl group in the above aryloxy group which may be substituted may be the same as mentioned with respect to the above aryl group.

Among the above carbamoyl groups which may be substituted, preferred is a carbamoyl group which may be substituted by a substituent selected from the group consisting of an alkyl group and an aryl group, which may be substituted, such as a carbamoyl group, an N,N-dimethylcarbamoyl group, a hydroxyethylaminocarbonyl group, a carboxyethylaminocarbonyl group, a sulfoethylaminocarbonyl group, a phenylcarbamoyl group, a carboxyphenylcarbamoyl group, a sulfophenylcarbamoyl group or a phosphonophenylcarbamoyl group, and more preferred is a carbamoyl group which may be substituted by an alkyl group substituted by a hydrophilic group represented by a hydroxyl group, a carboxyl group, a sulfo group and a phosphono group, or by a phenyl group substituted by a hydrophilic group represented by a hydroxyl group, a carboxyl group, a sulfo group and a phosphono group. Particularly preferred is a carboxyphenylcarbamoyl group or a sulfophenylcarbamoyl group.

Among the above carboxylates, preferred is an alkoxycarbonyl group such as a methoxycarbonyl group, an ethoxycarbonyl group, a propoxycarbonyl group, an isopropoxycarbonyl group, a butoxycarbonyl group or a hydroxyethylcarbonyl group, or an aryloxycarbonyl group which may be substituted by a substituent selected from the group consisting of an alkyl group, an alkoxy group, a carboxyl group, a sulfonic group and a phosphono group, such as a phenoxycarbonyl group, a naphthyloxycarbonyl group, a methylphenoxycarbonyl group, a methoxyphenoxycarbonyl group, a carboxyphenoxycarbonyl group, a sulfoxyphenoxycarbonyl group or a phosphonophenoxycarbonyl group. Particularly preferred is a phenoxycarbonyl group substituted by a substituent selected from the group consisting of a carboxyl group and a sulfo group.

Among the above amino groups which may be substituted, preferred is an amino group which may be substituted by an alkyl group or an acyl group, such as a methylamino group, an ethylamino group, a dimethylamino group, a diethylamino group, a hydroxyethylamino group, an acetylamino group, a trichloroacetylamino group or a benzoylamino group.

Among the above alkylthio groups which may be substituted, preferred is a hydroxyalkylthio group or an unsubstituted alkylthio group.

Among the above alkenylthio groups which may be substituted, preferred is a hydroxyalkenylthio group or an unsubstituted alkenylthio group.

Among the above arylthio groups which may be substituted, preferred is an arylthio group which may be substituted by a substituent selected from the group consisting of a carboxyl group, a sulfo group, a phosphono group, an alkyl group and an alkoxy group, such as a phenylthio group, a methylphenylthio group, a carboxyphenylthio group, a sulfophenylthio group, a phosphonophenylthio group or a methoxyphenylthio group, and more preferred is an arylthio group substituted by a substituent selected from the group consisting of a carboxyl group and a sulfo group.

Among the above alkylsulfinyl groups which may be substituted, preferred is a hydroxylalkylsulfinyl group or an unsubstituted alkylsulfinyl group.

Among the above arylsulfinyl groups which may be substituted, preferred is an arylsulfinyl group which may be substituted by a substituent selected from the group consisting of an alkyl group, a carboxyl group, a sulfo group and a phosphono group, such as a phenylsulfinyl group, a methylphenylsulfinyl group, a naphthylsulfinyl group, a carboxyphenylsulfinyl group, a sulfophenylsulfinyl group or a phosphonophenylsulfinyl group, and more preferred is an arylsulfinyl group substituted by a substituent selected from the group consisting of a carboxyl group and a sulfo group.

Among the above alkylsulfonyl groups which may be substituted, preferred is a hydroxyalkylsulfonyl group or an unsubstituted alkylsulfonyl group.

Among the above arylsulfonyl groups which may be substituted, preferred is an arylsulfonyl group which may be substituted by a substituent selected from the group consisting of an alkyl group, a carboxyl group, a sulfo group and a phosphono group, such as a phenylsulfonyl group, a methylphenylsulfonyl group, a naphthylsulfonyl group, a carboxyphenylsulfonyl group, a sulfophenylsulfonyl group or a phosphonophenylsulfonyl group, and more preferred is an arylsulfonyl group substituted by a substituent selected from the group consisting of a carboxyl group and a sulfo group.

Among the above sulfamoyl groups which may be substituted, preferred is a sulfamoyl group which may be substituted by a substituent selected from the group consisting of an alkyl group and an aryl group, which may be substituted, such as a sulfamoyl group, an N,N-dimethylsulfamoyl group, a hydroxyethylaminosulfonyl group, a carboxyethylaminosulfonyl group, a sulfoethylaminosulfonyl group, a phenylsulfamoyl group, a carboxyphenylsulfamoyl group, a sulfophenylsulfamoyl group or a phosphonophenylsulfamoyl group, and more preferred is a sulfamoyl group which may be substituted by an alkyl group substituted by a hydrophilic group represented by a hydroxyl group, a carboxyl group, a sulfo group and a phosphono group, or by a phenyl group substituted by a hydrophilic group represented by a hydroxyl group, a carboxyl group, a sulfo group and a phosphono group. Particularly preferred is a carboxyphenylsulfamoyl group or a sulfophenylsulfamoyl group.

Among the above sulfonate groups, preferred is an alkoxysulfonyl group such as a methoxysulfonyl group, an ethoxysulfonyl group, a hydroxyethoxysulfonyl group, a propoxysulfonyl group, an isopropoxysulfonyl group or a butoxysulfonyl group, or an aryloxysulfonyl group which may be substituted by a substituent selected from the group consisting of an alkyl group, an alkoxy group, a carboxyl group and a sulfonic group, such as a phenoxysulfonyl group, a naphthyloxysulfonyl group, a methylphenoxysulfonyl group, a methoxyphenoxysulfonyl group, a carboxyphenoxysulfonyl group or a sulfophenoxysulfonyl group.

Among the above substituents on the hetero ring, preferred is a halogen atom, a hydroxyl group, a nitro group, a cyano group, a carboxyl group, a sulfo group, an alkyl group which may be substituted, an aryl group which may be substituted, an alkoxy group which may be substituted, an aryloxy group which may be substituted, an acyl group, an acyloxy group, a carbamoyl group which may be substituted, a carboxylate group, an amino group which may be substituted, an alkylthio group which may be substituted, an arylthio group which may be substituted, an alkylsulfonyl group which may be substituted, an arylsulfonyl group which may be substituted, a sulfonate group or a thiocyanate group, and more preferred is a hydroxyl group, a cyano group, a carboxyl group, a sulfo group, an alkyl group which may be substituted, an aryl group which may be substituted, an alkoxy group which may be substituted, an aryloxy group which may be substituted, a carbamoyl group which may be substituted, a carboxylate group, an alkylthio group which may be substituted, an arylthio group which may be substituted, an alkylsulfonyl group which may be substituted, or a sulfonate group. Further preferred is a cyano group, a carboxyl group, a carbamoyl group which may be substituted, or an alkylthio group or an alkylsulfonyl group having at most 10 carbon atoms, preferably at most 6 carbon atoms, more preferably from 1 to 5 carbon atoms. Particularly preferred is a cyano group; a carboxyl group; an alkyl group which may be substituted by a substituent selected from the group consisting of a halogen atom and a carboxyl group; a carbamoyl group; an alkylcarbamoyl group or an alkylsulfonyl group which may be substituted by a hydrophilic group represented by a hydroxyl group, a carboxyl group, a sulfo group and a phosphono group. Among the above heterocyclic groups represented by A1, particularly preferred is a group represented by the following formula (2).

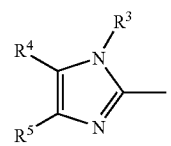

(2)

In the formula (2), each of $R^3$ to $R^5$ which are independent of one another, is a hydrogen atom or a monovalent substituent, or they may respectively form a condensed ring. The monovalent substituent represented by such $R^3$ to $R^5$ may be the same substituent as the above-described substituent which the heterocyclic group represented by $A^1$ may have.

Among them, $R^3$ is preferably a hydrogen atom or an alkyl group which may be substituted. The substituent for the alkyl group is not particularly limited, but, it is preferably a hydrophilic group such as a hydroxyl group, a carboxyl group, a sulfo group or a phosphono group. Among them, preferred is a carboxyl group or a sulfo group. Each of $R^4$ and $R^5$ which are independent of each other, is preferably a hydrogen atom, a carboxyl group, a cyano group, an alkylthio group, an alkylsulfonyl group, a phenyl group, an alkoxycarbonyl group, a carbamoyl group, an alkylaminocarbonyl group which may be substituted or a trifluoromethyl group. Particularly preferred is a carboxyl group, a carbamoyl group or a cyano group. Most preferred is a cyano group. The substituent for the above-mentioned alkyl group is not particularly limited, but, it is preferably a hydrophilic group such as a hydroxyl group, a carboxyl group, a sulfo group or a phosphono group. Among them, preferred is a hydroxyl group.

Now, suitable specific examples of the heteromonocyclic group and the condensed heterocyclic group represented by $A^1$ will be shown in Tables 1-1 and 1-2.

TABLE 1-1

| (1) | 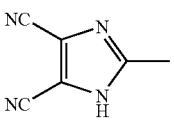 |
| (2) | 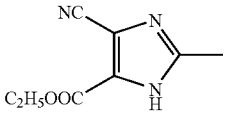 |
| (3) | 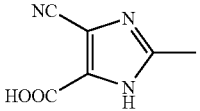 |
| (4) | 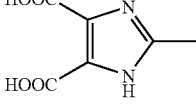 |
| (5) | 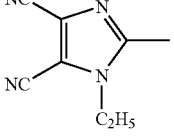 |
| (6) | 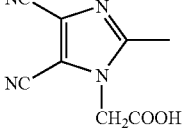 |
| (7) | 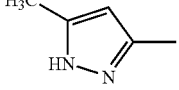 |
| (8) | 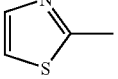 |
| (9) | 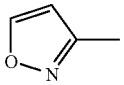 |
| (10) | 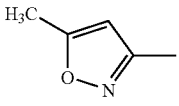 |

TABLE 1-1-continued

| (11) | 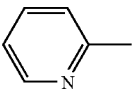 |
| (12) | 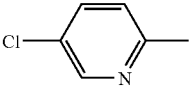 |
| (13) | 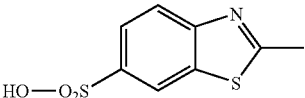 |
| (14) | 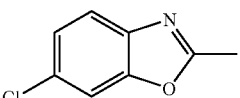 |
| (15) | 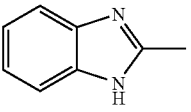 |
| (16) | 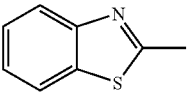 |
| (17) | 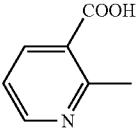 |
| (18) | 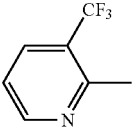 |
| (19) | 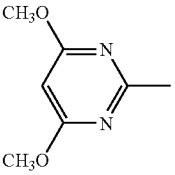 |
| (20) | 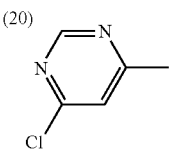 |
| (21) | 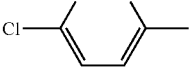 |
| (22) | 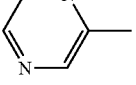 |

TABLE 1-1-continued
(23) 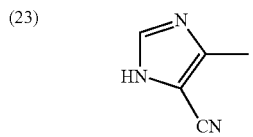
(24) 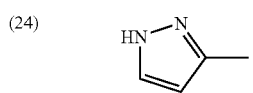
(25) 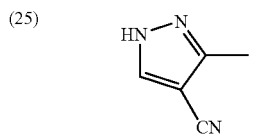
TABLE 1-2
(26) 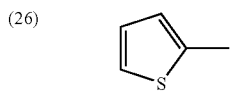
(27) 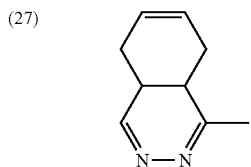
(28) 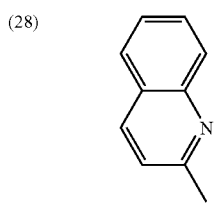
(29) 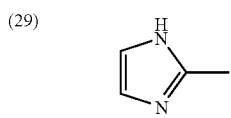
(30) 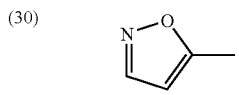
(31) 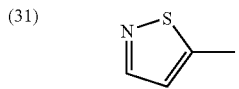
(32) 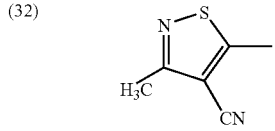
(33) 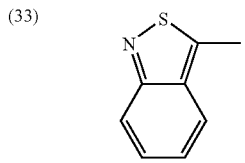
TABLE 1-2-continued
(34) 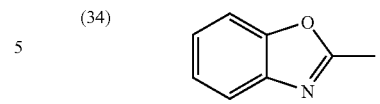
(35) 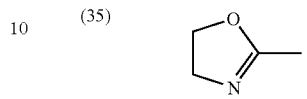
(36) 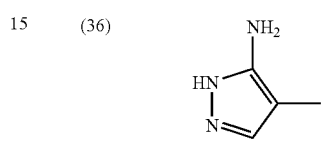
(37) 
(38) 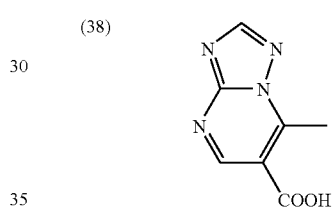
(39) 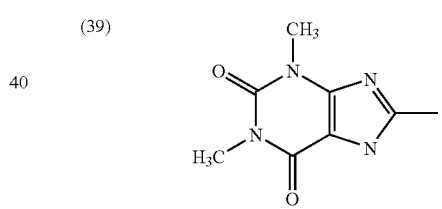
(40) 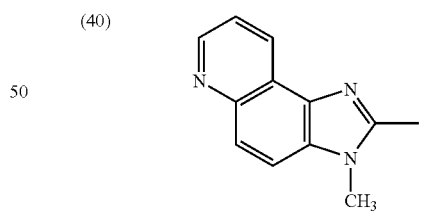
(41) 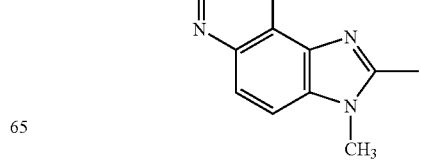

TABLE 1-2-continued

(42) 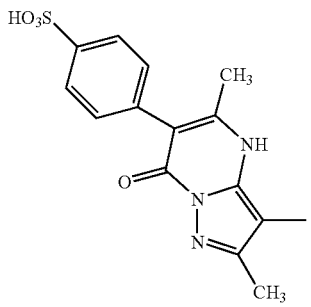

(43) 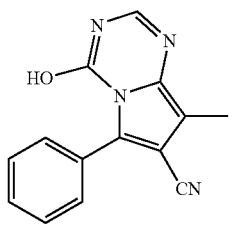

(44) 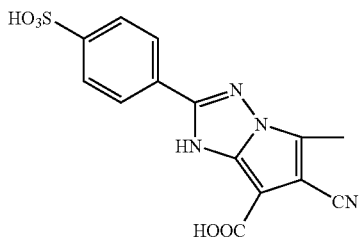

(45) 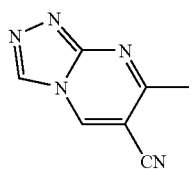

In the complex dye of the present invention, the ring represented by $X^1$ in the formula (1) represents a condensed hetero ring containing a 6-membered hetero ring. Namely, next to the carbon atom bonded to the azo group is a carbon atom which may have a substituent capable of forming a coordinate bond, and next to such a carbon atom, a nitrogen atom which may be substituted, is present, and the ring containing these atoms is a 6-membered ring, and such a 6-membered hetero ring comprises a condensed ring.

Further, $R^1$ and $R^2$ in the formula (1) are independent of each other and each represents a hydrogen atom or a monovalent substituent.

Here, the above monovalent substituent for $R^1$ is not particularly limited so long as it is a group which does not adversely affect the performance of the dye. Specifically, it may be a $C_{1-9}$ alkyl group which may be substituted, a $C_{2-9}$ alkenyl group which may be substituted, or a substituent capable of forming a coordinate bond to a metal atom. Among them, preferred is a substituent capable of forming a coordinate bond to a metal atom. Here, the substituent for such an alkyl group and an alkenyl group may, for example, be preferably a halogen atom, a carboxyl group, a sulfo group, a phosphono group, a hydroxyl group, a cyano group, a nitro group or an amino group which may be substituted.

The above substituent capable of forming a coordinate bond, for $R^1$, may be a group capable of being coordinated to a metal atom, containing an atom having a lone-pair electron (a lone electron pair) such as an oxygen atom, a sulfur atom and a nitrogen atom. Specifically, it may, for example, be a halogen atom; a hydroxyl group; a mercapto group; a nitro group; a cyano group; a carboxyl group; a sulfonic group; a carbamoyl group which may be substituted by an alkyl group or an aryl group, such as a carbamoyl group, a methylcarbamoyl group or a phenylcarbamoyl group; a sulfamoyl group which may be substituted by an alkyl group or an aryl group, such as a sulfamoyl group, a methylsulfamoyl group or a phenylsulfamoyl group; an amino group which may be substituted by an alkyl group, an alkylsulfonyl group or an arylsulfonyl group, such as an amino group, a methylamino group, a bis(2-hydroxyethyl) amino group, a methylsulfonylamino group or a benzenensulfonylamino group; an alkoxy group which may be substituted, such as a methoxy group or a 2-hydroxyethoxy group; or an alkylthio group which may be substituted, such as a methylthio group or a 2-hydroxyethylthio group; a carboxylate group such as an alkoxycarbonyl group which may be substituted such as a methoxycarbonyl group or an ethoxycarbonyl group, or a phenoxycarbonyl group; or a sulfonate group such as an alkoxysulfonyl group such as a methoxysulfonyl group or an ethoxysulfonyl group, or a phenoxysulfonyl group. More preferred is a hydroxyl group, a mercapto group, a carboxyl group, a sulfo group, or an amino group which may be substituted by an alkyl group (such an alkyl group may be substituted by a substituent selected from the group consisting of a sulfo group, a carboxyl group and a hydroxyl group). Further preferred is a hydroxyl group or an amino group which may be substituted by an alkyl group (such an alkyl group may be substituted by a substituent selected from the group consisting of a sulfo group, a carboxyl group and a hydroxyl group). Particularly preferred is a hydroxyl group.

$R^2$ is a hydrogen atom or a monovalent substituent. Such a monovalent substituent is not particularly limited so long as it is a group which does not adversely affect the performance of the dye and which is capable of bonding to a nitrogen atom. However, in a case where next to the carbon atom connected to the nitrogen atom on ring $X^1$ is a hetero atom like a 2-pyridyl group, it is likely that when complexed, a compound having a metal coordinated at such a site will be formed, and such is not desirable as unacceptable as the compound of the present invention which essentially requires formation of a coordinate bond in the vicinity of the azo group.

The above monovalent substituent for $R^2$ is preferably an alkyl group which may be substituted, an alkenyl group which may be substituted, an alkoxy group which may be substituted, or an aryl group which may be substituted, and the substituents for such an alkyl group, an alkenyl group, an alkoxy group and an aryl group may, for example, be a halogen atom, a hydroxyl group, a nitro group, a cyano group, a carboxyl group, a sulfo group, an alkyl group which may be substituted, an aryl group which may be substituted, an alkoxy group which may be substituted, an aryloxy group which may be substituted, an acyl group, an acyloxy group, a carbamoyl group which may be substituted, a carboxylate group, an amino group which may be substituted, an alkylthio group which may be substituted, an arylthio group which may be substituted, an alkylsulfonyl group which may be substituted, an arylsulfonyl group which may be substituted, a sulfamoyl group which may be substituted, a sulfonate group, or a thiocyanate group. The above alkyl group which may be substituted, the aryl group which may be substituted, the alkoxy group which may be substituted, the aryloxy group which may be substituted, the acyl group, the acyloxy group, the carbamoyl group which may be substituted, the carboxylate group, the amino group which may be substituted, the alkylthio group which may be substituted, the arylthio group which may be substituted, the alkylsulfonyl group which may be substituted, the arylsulfonyl group which may be substituted, the sulfamoyl group which may be substituted, and the sulfonate group, may be the same groups as mentioned with respect to the substituent in the above-described heterocyclic group for $A^1$.

$R^2$ is more preferably a hydrogen atom, an alkyl group which may be substituted, an alkenyl group which may be substituted, an alkoxy group which may be substituted or an aryl which may be substituted (wherein the substituents for such an alkyl group, an alkenyl group, an alkoxy group and an aryl group may, for example, be a halogen atom, a hydroxyl group, a cyano group, a carboxyl group, a sulfo group or an amino group which may be substituted, preferably a halogen atom, a hydroxyl group, a cyano group, a carboxyl group or a sulfo group, particularly preferably a hydroxyl group, a cyano group, a carboxyl group or a sulfo group), more preferably a hydrogen atom; or an alkyl group which may be substituted by a substituent selected from the group consisting of a hydroxyl group, a cyano group, a carboxyl group and a sulfo group; a hydroxyalkoxy group; or an aryl group which may be substituted by a substituent selected from the group consisting of a hydroxyl group, a cyano group, a carboxyl group and a sulfo group.

As a preferred example of the ring represented by $X^1$, a quinoline ring or a benzopyridine ring may be mentioned. Among them, more preferred is a group represented by the following formula (3) or (4) and its tautomers.

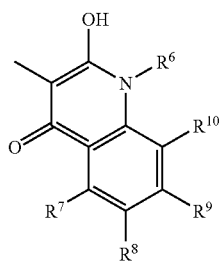

(3)

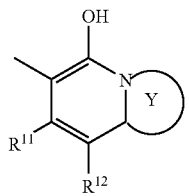

(4)

In the formulae (3) and (4), each of $R^6$ to $R^{12}$ which are independent of one another, is a hydrogen atom or a monovalent substituent (inclusive of a tautomer).

Here, the monovalent substituent for $R^6$ to $R^{12}$ may be the same as mentioned with respect to the above $R^1$ and $R^2$ Y is a hetero ring constituted by 5- to 7-atoms, which is formed by coupling of $R^2$ that is a substituent of the nitrogen atom in the formula (1), with a substituent of a carbon atom that is adjacent to the nitrogen atom, and such ring may be substituted by an optional substituent.

A preferred example for substituent $R^6$ may be a hydrogen atom, a $C_{1-9}$ alkyl group which may be substituted, a $C_{2-9}$ alkenyl group which may be substituted, or an aryl group which may be substituted. The substituents for such an alkyl group, an alkenyl group and an aryl group, may, for example, be preferably a halogen atom, a sulfo group, a carboxyl group, a hydroxyl group, a cyano group, a nitro group, an alkyl group which may be substituted or an amino group which may be substituted.

Among them, $R^6$ is preferably a hydrogen atom; a $C_{1-9}$ alkyl group substituted by a substituent selected from the group consisting of a halogen atom, a sulfo group, a carboxyl group and a cyano group; or a phenyl group substituted by a sulfo group or a substituted amino group (the substituent for the amino group is a $C_{1-9}$ alkyl group substituted by a substituent selected from the group consisting of a halogen atom, a sulfo group, a carboxyl group and a cyano group), more preferably a hydrogen atom; or a $C_{1-9}$, particularly $C_{1-2}$, alkyl group substituted by a substituent selected from the group consisting of a halogen atom, a sulfo group, a carboxyl group and a cyano group.

A particularly preferred example for substituents $R^7$ to $R^{12}$ may be a hydrogen atom, a halogen atom, a sulfo group, a carboxyl group, a phosphono group, a cyano group, a nitro group, a hydroxyl group, an alkyl group which may be substituted, a $C_{2-9}$ alkenyl group which may be substituted, an alkoxy group which may be substituted, an amino group which may be substituted, or a carbamoyl group which may be substituted. Here, the substituents for such an alkyl group, an alkenyl group and an alkoxy group are preferably at least one group selected from a halogen atom, a sulfo group, a carboxyl group, a hydroxyl group, a cyano group, a nitro group and an amino group which may be substituted, and the substituents for such an amino group and a carbamoyl group are preferably at least one group selected from an alkyl group and an alkenyl group, which may be substituted by a substituent selected from the group consisting of a halogen atom, a sulfo group, a carboxyl group, a hydroxyl group, a cyano group and a nitro group. Further, for example, adjacent substituents among $R^7$ to $R^{12}$ may form a ring through a nitrogen atom, a carbon atom or the like.

Preferred as $R^7$ or $R^{10}$, is a hydrogen atom, a halogen atom, a cyano group, a nitro group, a carbamoyl group, an alkyl group which may be substituted, an alkenyl group which may be substituted, an alkoxy group which may be substituted or an alkylcarbamoyl group which may be substituted, more preferred is a hydrogen atom, an alkyl group which may be substituted, an alkenyl group which may be substituted, an alkoxy group which may be substituted or an alkylcarbamoyl group which may be substituted, and further preferred is a hydrogen atom or an alkyl group which may be substituted.

Here, the substituent for the alkyl group, the alkenyl group or the alkoxy group, may, for example, be a halogen atom, a sulfo group, a carboxyl group, a hydroxyl group, a cyano group or a nitro group.

Preferred as $R^8$ or $R^9$, is a hydrogen atom, a halogen atom, a cyano group, a nitro group, a carboxyl group, a sulfo group, a phosphono group, an alkoxy group which may be substituted, an amino group, an alkylamino group which may be substituted, a carbamoyl group, or an alkylcarbamoyl group which may be substituted, and more preferred is a hydrogen atom, a cyano group, a nitro group, a carboxyl group, a sulfo group, a phosphono group, an alkoxy group which may be substituted, an alkylamino group which may be substituted, or an alkylcarbamoyl group which may be substituted.

Preferred as $R^{11}$, is a hydrogen atom, a hydroxyl group, a carboxyl group, a sulfo group, a phosphono group, an amino group, an alkylamino group which may be substituted, a carbamoyl group, or an alkylcarbamoyl group which may be substituted, and more preferred is a hydrogen atom, a hydroxyl group, a carboxyl group or an amino group.

Preferred as $R^{12}$, is a hydrogen atom, a halogen atom, a cyano group, a nitro group, a carboxyl group, a sulfo group, a phosphono group, an alkoxy group which may be substituted, an amino group, an alkylamino group which may be substituted, a carbamoyl group, or an alkylcarbamoyl group which may be substituted, and more preferred is a hydrogen atom, a cyano group, a nitro group, a carboxyl group or a sulfo group.

Ring Y is not particularly limited so long as it presents no adverse effect on the dye performance. However, when complexed with a metal ion, one having a hetero atom at an adjacent portion of the nitrogen atom shown in the formula (4) or in the vicinity of the adjacent portion, is likely to form a compound that coordinates to the metal ion at such a portion, and such is not desirable as being incompatible with the compound of the present invention wherein formation of the coordination bond adjacent to the azo group is essential. Namely, as ring Y, preferred is one having no hetero atom or no chelate forming group at a peri-position of the carbon atom substituted by a hydroxyl group as shown in the formula (4).

Now, suitable specific examples of the groups represented by the formulae (3) and (4) will be shown in Table 2.

TABLE 2

(1) 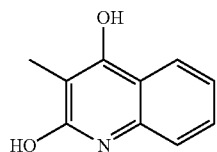

(2) 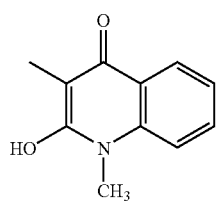

(3) 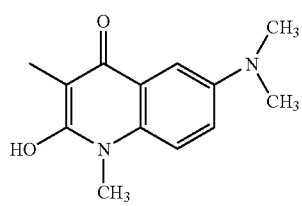

(4) 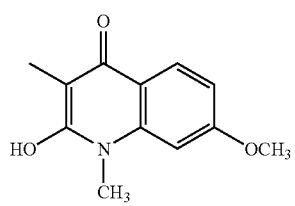

TABLE 2-continued (5) 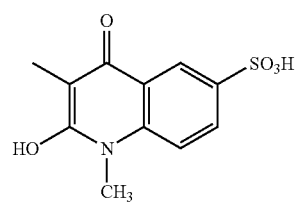

(6) 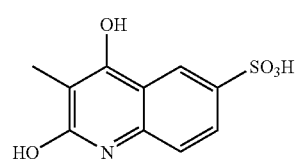

(7) 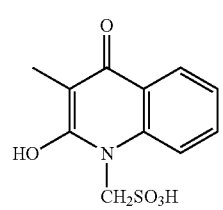

(8) 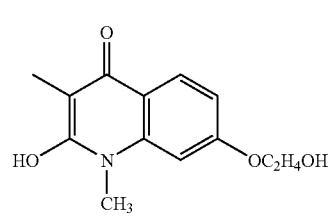

(9) 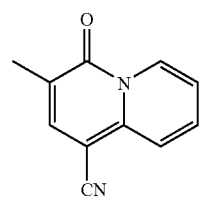

(10) 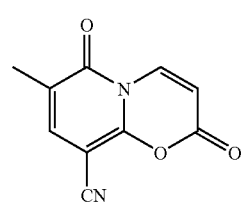

(11) 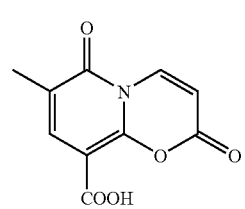

(12) 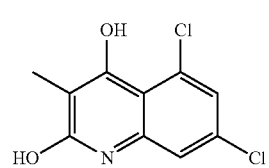

TABLE 2-continued

(13) 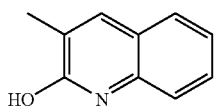

(14) 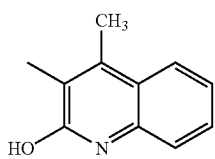

(15) 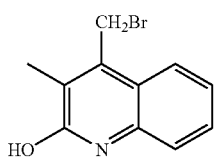

(16) 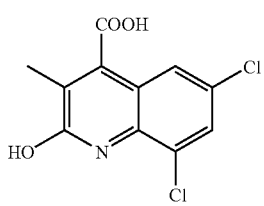

(17) 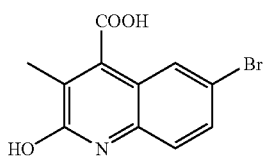

(18) 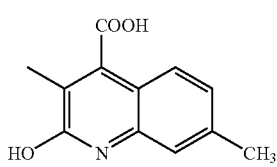

(19) 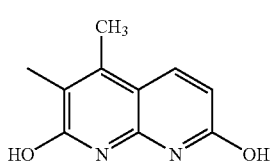

(20) 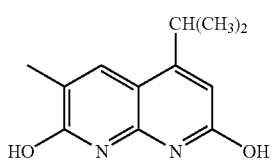

The transition metal atoms to be used for the water-soluble complex dye of the present invention, may, for example, be silver(I), aluminum(III), gold(III), cerium(III, IV), cobalt(II,III), chromium(III), copper(I,II), europium (III), iron(II,III), gallium(III), germanium(IV), indium(III), lanthanum(III), manganese(II), nickel(II), palladium(II), platinum(II,IV), rhodium(II,III), ruthenium(II,III,IV)I scandium(III), silicon(IV), samarium(III), titanium(IV), uranium (IV), zinc(II) or zirconium(IV). Among them, a preferred example of the transition metal ions to be used in the present invention may be Cu, Ni, Co, Zn or Fe. Particularly from the viewpoint of fastness, Cu or Ni is preferred. Particularly preferred is nickel.

The structure of the water-soluble complex dye comprising the azo compound represented by the above formula (1) or its tautomer and the transition metal ions, according to the present invention, may be represented more specifically, for example, in the form of the following formula (5):

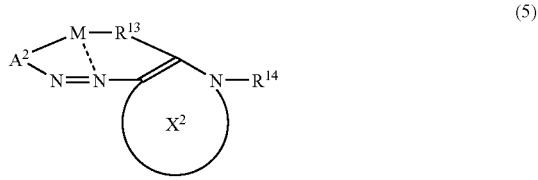

(5)

In the formula (5), M is an optional transition metal ion.

$A^2$ is a 5- to 7-membered hetero monocyclic group containing one or two hetero atoms among the ring forming atoms, or a condensed heterocyclic group containing such a hetero monocyclic group, and may have an optional substituent, but it represents a group which does not have a hydroxyl group at a position adjacent to the carbon atom bonded to the azo group.

Ring $X^2$ represents a condensed hetero ring containing a 6-membered hetero ring, said 6-membered hetero ring being a group bonded to the azo group, and may have an optional substituent.

$R^{13}$ represents a substituent (inclusive of a tautomer) capable of forming a coordinate bond, and $R^{14}$ represents a hydrogen atom or a monovalent substituent, or it may form a hetero ring of 5 to 7 atoms together with a carbon atom adjacent to the nitrogen atom to which the substituent is bonded.

$A^2$ may specifically be the same as the groups mentioned in the above description of $A^1$. The substituent capable of forming a coordinate bond for $R^{13}$ may specifically be the same as the groups mentioned in the above description of $R^1$. The monovalent substituent for $R^{14}$ may specifically be the same as the groups mentioned in the above description of $R^2$.

Here, in the formula (5), two ion bonds and one coordinate bond are indicated between the metal ion represented by M of the complex dye and the complex ligand. However, the structure in the aqueous solution is considered to be variously and dynamically changing and is considered to be hardly represented by a single structural formula. Accordingly, it should be understood that the coordination form of the formula (5) shown here is merely an example representing its various forms. Further, other than the bonds shown in this formula, M is capable of forming a coordinate bond with other ligands. As such ligands, halogen ions, hydroxyl ions, water molecules, acetic ions, acetylacetonate ions, bipyridyl ions or another molecule of an azo dye ligand of the same type or different type, may, for example, be mentioned.

Examples particularly preferred as the metal complex dye of the present invention will be presented in the following Table 3.

TABLE 3

(In the formula (1))

| | $A^1$ | $X^2$ | Metal |
|---|---|---|---|
| (1) | 4,5-dicyano-2-methylimidazole | 3-methyl-2,4-dihydroxyquinoline | Ni |
| (2) | 4,5-dicyano-2-methylimidazole | 3-methyl-2,4-dihydroxyquinoline | Cu |
| (3) | 4,5-dicyano-2-methylimidazole | 3-methyl-2,4-dihydroxyquinoline-6-sulfonic acid | Ni |
| (4) | 4,5-dicyano-2-methylimidazole | 3-methyl-2,4-dihydroxyquinoline-6-sulfonic acid | Co |
| (5) | 4,5-dicyano-2-methylimidazole | 3-methyl-2,4-dihydroxy-1-methyl-tetrahydroquinoline-6-sulfonic acid | Ni |
| (6) | 4,5-dicyano-2-methyl-1-(carboxymethyl)imidazole | 3-methyl-9-cyano-4H-quinolizin-4-one | Ni |
| (7) | 2-methylbenzothiazole-6-sulfonic acid | 3-methyl-9-cyano-pyrano[3,2-a]pyridine-dione | Cu |
| (8) | 2-(4-sulfophenyl)-5-methyl-6-cyano-7-carboxypyrrolo[1,2-b][1,2,4]triazole | 3-methyl-9-carboxy-pyrano[3,2-a]pyridine-dione | Ni |

TABLE 3-continued
(In the formula (1))
| | A¹ | X² | Metal |
|---|---|---|---|
| (9) | 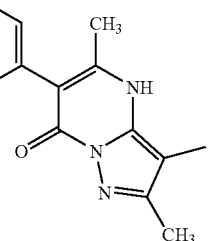 | 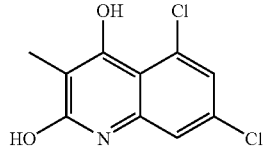 | Ni |
| (10) | 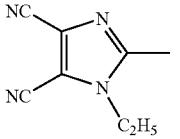 | 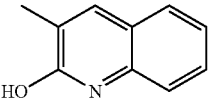 | Ni |
| (11) | 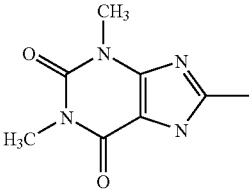 | 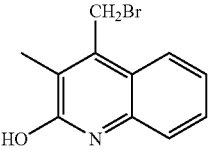 | Ni |
| (12) | 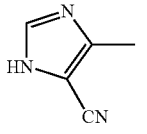 | 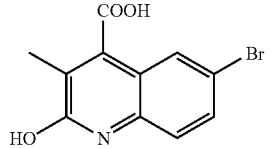 | Cu |
| (13) | 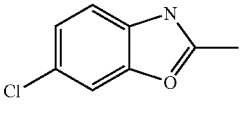 | 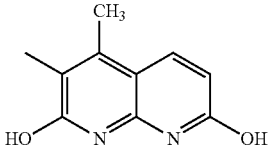 | Ni |
| (14) | 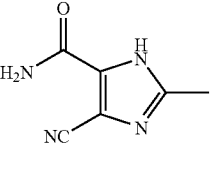 | 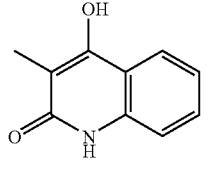 | Ni |
| (15) | 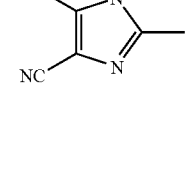 | 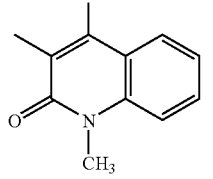 | Ni |
| (16) | 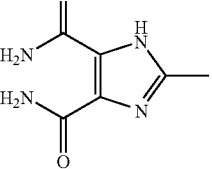 | 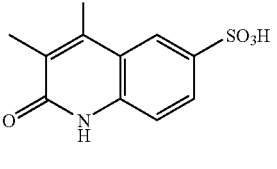 | Cu |

TABLE 3-continued (In the formula (1))

| | $A^1$ | $X^2$ | Metal |
|---|---|---|---|
| (17) | 2-methyl-1H-imidazole-4,5-dicarboxylic acid | 4-hydroxy-3-methyl-2-oxo-1,2-dihydroquinoline-6-sulfonic acid | Ni |
| (18) | 5-cyano-2-methyl-1H-imidazole-4-carboxamide | 6-bromo-2-hydroxy-3-methylquinoline-4-carboxylic acid | Ni |
| (19) | 2-methyl-1H-imidazole-4,5-dicarboxylic acid | 5,7-dichloro-2,4-dihydroxy-3-methylquinoline | Ni |
| (20) | 3,5-dimethylisothiazole-4-carbonitrile | 4-hydroxy-3-methyl-2-oxo-1,2-dihydroquinoline-6-sulfonic acid | Ni |
| (21) | 3-methylbenzo[d]isothiazole | 4-hydroxy-3-methylquinolin-2(1H)-one | Cu |
| (22) | 3-methyl-1H-pyrazole-4-carbonitrile | 4-hydroxy-3-methylquinolin-2(1H)-one | Ni |
| (23) | 2-methylpyridine | 4-hydroxy-6-methoxy-3-methylquinolin-2(1H)-one | Ni |
| (24) | 5-chloro-2-methylpyridine | 1-(carboxymethyl)-4-hydroxy-3-methyl-2-oxo-1,2-dihydroquinoline-6-sulfonic acid | Ni |

TABLE 3-continued (In the formula (1))

| | A¹ | X² | Metal |
|---|---|---|---|
| (25) | 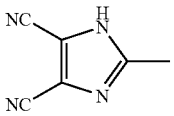 | 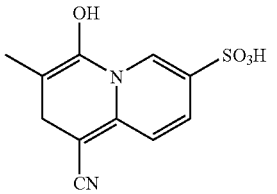 | Ni |

The molecular weight of the azo compound to be used in the present invention is preferably within a range of from 200 to 3000, more preferably within a range of from 300 to 1500, in the form of a free acid.

The complex dye of the present invention is formed of the above-described azo compound and the above-described metal salt, and the ratio of the metal atoms to the azo compound is from 1:1 to 1:2. Further, the above metal chelate dye may be in the form of a hydrate or an acid addition salt.

Further, the water-soluble complex dye of the present invention may be produced by carrying out usual diazotization, coupling reaction and complexing in accordance with known methods. For example, it may be synthesized by diazotizing an amino compound having a monocyclic hetero ring or a condensed hetero ring represented by $A^1$, coupling a condensed heterocyclic compound containing a 6-membered heterocyclic group having ring $X^1$ thereto, and reacting a solution of a metal salt to the azo compound thereby obtained.

In the complex dye of the present invention, the compound having a monocyclic hetero ring or a condensed hetero ring containing such a monocyclic hetero ring corresponding to the $A^1$ moiety constitutes a diazo component, and the condensed heterocyclic compound containing a 6-membered heterocyclic group corresponding to the $X^1$ moiety constitutes a coupler. The metal-bonding portion of the coupler is present in the vicinity of the azo group-bonding portion of the 6-membered hetero ring, whereby the coordinate bond is considered to form a bond among the hetero atom of the diazo component, the bonding group (the coordinate bond-forming group) of the 6-membered hetero ring of the coupler, and the metal. The reason as to why the dye of the present invention exhibits a performance superior to dyes prepared by using 5-membered heterocyclic couplers as disclosed in JP-A-57-42775 or JP-A-2-80470, i.e. the mechanism whereby the dye of the present invention exhibits a high performance in any one of three properties of saturation, light resistance and ozone resistance, is not clearly understood. Generally, a metal complex dye will have a high molecular aggregation on printing media, whereby the saturation tends to decrease although the fastness will be improved. However, in the dye of the present invention, the coordinate bond from the hetero atom and the above-mentioned 6-membered heterocyclic structure, as its essential components, are present in the vicinity of the metal, whereby it is considered that the above intermolecular aggregation takes place with a proper intensity thereby to satisfy fastness in both the saturation, and the light resistance and ozone resistance. Further, JP-A-11-293168 discloses a metal complex dye employing a carbon aromatic compound as a diazo component and a 6-membered heterocyclic compound as a coupler, but as shown in Comparative Example 1 given hereinafter, the dye employing a carbon aromatic ring as a diazo component is very poor in the ozone resistance. Also from this fact, the bond between the hetero atom of the diazo component and the metal, in the dye of the present invention, is considered to somehow contribute to improvement of the ozone resistance.

When the water-soluble complex dye of the present invention is used for a recording fluid (hereinafter sometimes referred to as an ink), the dye may be used in the form of a free acid, but in a case where it is obtained in the from of a salt at the time of the production, it may be used as it is, or it may be converted to a desired salt form. As a method for exchanging the salt form, a known method may optionally be employed. For example, the following methods may be mentioned.

1) A method wherein a strong acid such as hydrochloric acid is added to an aqueous solution of the dye obtained in a salt form to precipitate the dye in the form of a free acid, and thereafter, acidic groups of the dye are neutralized with an alkaline solution having a desired counter ion (for example, an aqueous lithium hydroxide solution) for salt exchange.

2) A method wherein a large excess amount of a neutral salt having a desired counter ion (for example, lithium chloride) is added to an aqueous solution of the dye obtained in a salt form, to carry out salt exchange in the form of a salted out cake.

3) A method wherein an aqueous solution of the dye obtained in a salt form, is treated with a strongly acidic cation exchange resin to precipitate the dye in the form of a free acid, and thereafter, the acidic groups of the dye are neutralized with an alkaline solution having a desired counter ion (for example, an aqueous lithium hydroxide solution) for salt exchange.

4) An aqueous solution of the dye obtained in a salt form is treated with a strongly acidic cation exchange resin preliminarily treated with an alkaline solution having a desired counter ion (for example, an aqueous lithium hydroxide solution), to carry out salt exchange.

Further, the dye to be used for the recording fluid of the present invention may be one wherein acid groups are partially in the form of a salt form, or a dye of a salt form and a dye of a free acid form may be present as mixed. Here, whether acid groups will take a free acid form or a salt form, depends on the pKa of the dye and the pH of the ink. Usually, it is preferred that sulfo groups take a salt form more than carboxyl groups, from the viewpoint of avoiding ink clogging. On the other hand, a dye wherein carboxyl groups are in an acid form, is preferred in a case where the water resistance or bleeding resistance is of importance. As an example of the above salt form, a salt of an alkali metal such as Na, Li or K, a salt of ammonium which may be substituted by an alkyl group or a hydroxyalkyl group, or a salt of an organic amine may be mentioned. As an example of the organic amine, a lower alkylamine, a hydroxy-substituted lower alkylamine, a carboxyl-substituted lower alkyl amine, or a polyamine having from 2 to 10 $C_{2-4}$ alkyleneimine units, may be mentioned. In the case of such a salt form, the type is not limited to a single type and a plurality of different types may be present as mixed.

The type of the counter ion of the acid group may freely be selected depending upon the properties regarded as important for the particular ink. Usually, an intermediate or a reagent for the synthesis of a dye contains Na in many cases, and a water-soluble dye is usually obtained in the form of a Na salt. However, when the water resistance is of importance, it may be converted to a $NH_4$ salt in many cases. Whereas, in a case where it is required to maintain the ink clogging resistance at a high level by increasing the solubility of the dye, it may be converted to a form of a Li salt, or an alkanolammonium salt represented by a triethanolammonium.

Further, in the structure of the dye to be used in the present invention, in a case where a plurality of acid groups are contained in one molecule thereof, such a plurality of acid groups may be in a salt form or in an acid form, or may take mutually different salt forms.

More preferred specific examples of the above dye may be those presented in Table 3-1.

TABLE 3-1

(In the formula (1))

| | $A^1$ | $X^1$ | Metal M | Metal/Ligand ratio | Counter ion |
|---|---|---|---|---|---|
| (1) | dicyanoimidazole | 3-methyl-2,4-dihydroxyquinoline | Ni | 1/2 | — |
| (2) | dicyanoimidazole | 3-methyl-2,4-dihydroxyquinoline | Ni | 1/1 | — |
| (3) | dicyanoimidazole | 3-methyl-2,4-dihydroxyquinoline | Cu | 1/2 | — |
| (4) | dicyanoimidazole | 3-methyl-2,4-dihydroxyquinoline | Cu | 1/1 | — |
| (5) | dicyanoimidazole | 3-methyl-2,4-dihydroxy-6-sulfoquinoline | Ni | 1/2 | $NH_4$ |
| (6) | dicyanoimidazole | 3-methyl-2,4-dihydroxy-6-sulfoquinoline | Ni | 1/1 | Li |
| (7) | dicyanoimidazole | 3-methyl-2,4-dihydroxy-6-sulfoquinoline | Ni | 1/1.75 | $NH_4$ |

TABLE 3-1-continued (In the formula (1))

| | A¹ | X¹ | Metal M | Metal/Ligand ratio | Counter ion |
|---|---|---|---|---|---|
| (8) | 4,5-dicyano-2-methylimidazole | 3-methyl-2,4-dihydroxyquinoline-6-sulfonic acid | Co | 1/1.75 | $NH_4$ |
| (9) | 4,5-dicyano-2-methylimidazole | 3-methyl-4-hydroxy-2(1H)-quinolinone | Ni | 1/1.5 | — |
| (10) | 4-carbamoyl-5-cyano-2-methylimidazole | 3-methyl-4-hydroxy-2(1H)-quinolinone | Ni | 1/2 | — |
| (11) | 4-carboxy-5-cyano-2-methylimidazole | 1,3-dimethyl-4-hydroxy-2(1H)-quinolinone | Ni | 1/2 | Na |
| (12) | 4,5-dicyano-2-methylimidazole | 3-methyl-4-hydroxy-2-oxo-1,2-dihydroquinoline-6-sulfonic acid | Ni | 1/1 | Na |
| (13) | 4,5-dicarbamoyl-2-methylimidazole | 3-methyl-4-hydroxy-2-oxo-1,2-dihydroquinoline-6-sulfonic acid | Cu | 1/1.2 | Na |
| (14) | 4,5-dicarboxy-2-methylimidazole | 3-methyl-4-hydroxy-2-oxo-1,2-dihydroquinoline-6-sulfonic acid | Ni | 1/1 | Na |
| (15) | 4-carbamoyl-5-cyano-2-methylimidazole | 6-bromo-4-carboxy-3-methyl-2-hydroxyquinoline | Ni | 1/1.2 | Na |

TABLE 3-1-continued (In the formula (1))

| | $A^1$ | $X^1$ | Metal M | Metal/Ligand ratio | Counter ion |
|---|---|---|---|---|---|
| (16) | imidazole with 2-methyl and 4,5-dicarboxylic acid (HOOC, HOOC) | 3-methyl-5,7-dichloro-2,4-dihydroxyquinoline (OH, Cl, HO, Cl) | Ni | 1/1 | Na |
| (17) | 3-methyl-4-cyano-5-methylisothiazole (H₃C, CN) | 3-methyl-4-hydroxy-6-sulfo-quinolin-2(1H)-one (OH, SO₃H) | Ni | 1/2 | Na |
| (18) | 3-methylbenzo[c]isothiazole | 3-methyl-4-hydroxyquinolin-2(1H)-one (OH) | Cu | 1/1 | — |
| (19) | 4-cyano-3-methylpyrazole (HN, CN) | 3-methyl-4-hydroxyquinolin-2(1H)-one (OH) | Ni | 1/1 | — |
| (20) | 2-methylpyridine | 3-methyl-4-hydroxy-6-methoxy-quinolin-2(1H)-one (OH, OCH₃) | Ni | 1/2 | — |
| (21) | 5-chloro-2-methylpyridine (Cl) | 3-methyl-4-hydroxy-6-sulfo-1-(carboxymethyl)quinolin-2(1H)-one (OH, SO₃H, CH₂COOH) | Ni | 1/2 | Na |
| (22) | 4,5-dicyano-2-methylimidazole (NC, NC) | 4-hydroxy-3-methyl-7-sulfo-9-cyano-quinolizine (OH, SO₃H, CN) | Ni | 1/1 | Na |

The water-soluble complex dye of the present invention presents a color of from yellow to orange when used for a recording fluid, as a color material for the recording fluid. Namely, it presents a color of from yellow to orange corresponding to the maximum absorption wavelength (λmax) of the dye being from 380 to 500 nm. However, it is expected by selecting an electron attracting one as the substituent for the diazo component or by chemical modification, for example, to increase the electron donating property of the coupling component, dyes having a wide range of brilliant colors such as magenta, violet or cyan, may be synthesized while maintaining the same good fastness as in Examples.

2. Recording Fluid

The water-soluble complex dye of the present invention may be employed at an optional concentration. The total dye concentration in the recording fluid is usually at a level of from 0.1 to 10 wt %, preferably at a level of from 0.5 to 7 wt %, more preferably at a level of from 2 to 5 wt %, based on the total amount of the recording fluid. Further, the recording fluid may be prepared by using the water-soluble complex dye of the present invention in combination with other dyes.

An ink containing the water-soluble complex dye of the present invention may be produced in accordance with a method for preparing an ink to be used for a usual ink jet recording method.

The aqueous medium to be used for the ink may be water, but water containing a water-soluble organic solvent is preferably employed. The water-soluble organic solvent may, for example, be a polyhydric alcohol such as ethylene glycol, propylene glycol, butylene glycol, diethylene glycol, triethylene glycol, polyethylene glycol (weight average molecular weight: about 190 to 400) or glycerol; a heterocyclic compound such as 2-pyrrolidone, N-methylpyrrolidone, N-ethylpyrrolidone or 1,3-dimethylimidazolidinone; thiodiethanol; a sulfoxide such as dimethylsulfoxide; an ether such as ethylene glycol monoallyl ether, ethylene glycol monomethyl ether or diethylene glycol monomethyl ether; a sulfone such as sulfolane; or an alcohol such as ethyl alcohol or isopropanol. Such a water-soluble organic solvent is used usually within a range of from 1 to 50 wt %, based on the total amount of the recording fluid. On the other hand, water is used within a range of from 45 to 95 wt % based on the total amount of the recording fluid.

The recording fluid of the present invention may contain a dye other than the metal chelate dye of the present invention or other additives.

Further, it is possible to further improve the quick drying property after printing or the printing quality, by adding from 0.1 to 10 wt %, preferably from 0.5 to 5 wt %, of a compound selected from urea, thiourea, biuret and semicarbazide, or from 0.001 to 5 wt % of a surfactant, based on the total amount of the recording fluid of the present invention.

The pH value of the recording fluid of the present invention is usually at least 2, preferably at least 4, more preferably at least 6.5, most preferably at least 7. Further, the upper limit of the pH value is usually at most 12, preferably at most 11, more preferably at most 9.5. Particularly preferably, it is from neutral to slightly alkaline, so that a metal chelate of the azo compound will be stably formed.

If the pH of the recording fluid is lower beyond this range i.e. less than 2, the dissolution stability of the azo metal chelate compound of the dye tends to deteriorate, whereby the dye is likely to precipitate during the storage, or the metal chelate tends to disintegrate thereby to cause a color change. If the pH of the recording fluid exceeds 12, an alcoholate is likely to be formed by the alcoholic organic solvent and the metal chelate in the recording fluid, whereby deterioration of the ink performance is likely to be induced. Further, the recording fluid of the present invention is likely to be in contact with a human body, and from the viewpoint of safety, it is advisable to avoid high pH in its preparation.

The pH of the recording fluid can be adjusted by means of a pH controlling agent. In such a case, as the pH controlling agent, any optional substance may be used so long as it is capable of controlling the pH within the prescribed range without adversely affecting the recording fluid to be prepared. Specifically, a hydroxide such as sodium hydroxide, potassium hydroxide, lithium hydroxide or ammonium hydroxide; an alkali metal inorganic acid salt such as sodium carbonate, sodium hydrogencarbonate, potassium carbonate, lithium carbonate, sodium phosphate, potassium phosphate, lithium phosphate, potassium dihydrogenphosphate or disodium hydrogenphosphate; an alkali metal organic acid salt such as sodium acetate, potassium acetate, lithium acetate, sodium oxalate, potassium oxalate, lithium oxalate, sodium borate, sodium tetraborate, potassium hydrogenphthalate or potassium hydrogentartarate; ammonia; an amine such as methylamine, ethylamine, diethylamine, tris(hydroxymethyl)aminomethane hydrochloride, diethanolamine, triethanolamine, morpholine or propanolamine; 4-morpholine ethanesulfonic acid or 4-morpholine propanesulfonic acid, may, for example, be preferably employed.

Among them, a buffer agent showing a buffering activity is more preferred. As such a buffer agent, a combination (mixture) of a weak acid and its salt, or a weak base or its salt may be mentioned. Specifically, sodium acetate, lithium acetate, sodium phosphate, lithium phosphate, potassium dihydrogenphosphate, disodium hydrogenphosphate, sodium borate, sodium tetraborate, tris(hydroxymethyl)aminomethane hydrochloride, 4-morpholine ethanesulfonic acid or 4-morpholine propanesulfonic acid, may, for example, be mentioned. Preferred is tris(hydroxymethyl)aminomethane hydrochloride, 4-morpholine ethanesulfonic acid or 4-morpholine propanesulfonic acid.

The buffer agent is used usually at a concentration of from 0.01 to 3 wt %, preferably from 0.1 to 1 wt %, more preferably from 0.1 to 0.5 wt %, based on the total weight of the recording fluid.

Further, the pH control of the recording fluid may be carried out by means of a buffer solution. In such a case, as the buffer solution, various ones which are commonly used for the purpose of preventing a decrease of the pH due to inclusion of hydrogen ions, for example, systems having the following combinations wherein the respective components are mixed in suitable amounts, may be mentioned. It may be suitably selected for use among them.

Combination of potassium hydrogenphthalate with sodium hydroxide,

Combination of potassium dihydrogenphosphate with sodium hydroxide,

Combination of boric acid and potassium chloride with sodium hydroxide,

Combination of glycine and sodium chloride with hydrochloric acid,

Combination of glycine and sodium chloride with sodium hydroxide,

Combination of sodium citrate with hydrochloric acid,

Combination of sodium citrate with sodium hydroxide,

Combination of sodium tetraborate (borax) with hydrochloric acid,

Combination of sodium tetraborate (borax) with sodium hydroxide,

Combination of potassium dihydrogenphosphate with disodium hydrogenphosphate,

Combination of potassium dihydrogencitrate with sodium hydroxide,

Combination of succinic acid with sodium tetraborate,

Combination of potassium dihydrogencitrate with sodium tetraborate,

Combination of potassium dihydrogenphosphate with sodium tetraborate,

Combination of sodium tetraborate with sodium carbonate,

Combination of hydrochloric acid with sodium carbonate,

Combination of tartaric acid with sodium tartarate,

Combination of lactic acid with sodium lactate,

Combination of acetic acid with sodium acetate,

Combination of ammonium chloride with ammonia,

Combination of sodium diethylbarbiturate and sodium acetate with hydrochloric acid, Combination of sodium diethylbarbiturate with hydrochloric acid, Combination of N,N-diethylglycinesodium salt with hydrochloric acid, Combination of disodium hydrogenphosphate with citric acid, Combination of citric acid, potassium dihydrogenphosphate, boric acid and diethylbarbiturate with trisodium phosphate, Combination of boric acid and citric acid with trisodium phosphate, Combination of 2,4,6-trimethylpyridine with hydrochloric acid, Combination of tris(hydroxymethyl)aminomethane with hydrochloric acid, Combination of 2-amino-2-methyl-1,3-propanediol with hydrochloric acid, Combination of 3-[4-(2-hydroxyethyl)-1-piperazinyl]-1-propanesulfonic acid, sodium hydroxide and sodium chloride, Combination of citric acid, potassium dihydrogenphosphate, sodium triborate, tris(hydroxymethyl)aminomethane and potassium chloride with sodium hydroxide.

Among them, preferred is:

Combination of potassium dihydrogenphosphate with sodium hydroxide,

Combination of boric acid and potassium chloride with sodium hydroxide,

Combination of sodium tetraborate (borax) with hydrochloric acid,

Combination of sodium tetraborate (borax) with sodium hydroxide,

Combination of potassium dihydrogenphosphate with disodium hydrogenphosphate,

Combination of potassium dihydrogenphosphate with sodium tetraborate,

Combination of ammonium chloride with ammonia, or

Combination of tris(hydroxymethyl)aminomethane with hydrochloric acid. Particularly preferred among them is a combination of sodium tetraborate (borax) with sodium hydroxide, or a combination of tris(hydroxymethyl)aminomethane with hydrochloric acid.

The buffer solution is used usually at a concentration of from 0.1 to 40 wt %, preferably from 0.5 to 30 wt %, more preferably from 1 to 25 wt %, based on the total weight of the recording fluid.

The method for carrying out ink jet recording by means of the water-based recording fluid (ink) of the present invention, is not particularly limited, and a commonly employed method may be used. Specifically, as an on-demand system, an electrical/thermal conversion system (such as a thermal ink jet type, a bubble jet type or the like), an electrical/mechanical conversion system (such as a single cavity type, a double cavity type, a bender type, a piston type, a share mode type, a shared wall type or the like), other electrostatic system or a discharge system, may, for example, be mentioned.

Further, at the time of carrying out recording by using the metal chelate dye of the present invention, recording may be carried out by employing the above-mentioned recording fluid containing the metal chelate dye. However, it is also possible to adopt a method wherein the above-mentioned azo compound-containing fluid and the above-mentioned metal salt-containing fluid are separately jetted to form the above-mentioned metal chelate dye on the paper surface thereby to carry out recording, or a method wherein the above-mentioned azo compound-containing fluid is jetted onto a paper surface having metal ions thereon to form the above-mentioned metal chelate dye on the paper surface to carry out recording.

3. Ink Set

The ink set of the present invention is one having three primary colors combined by using the recording fluid of the present invention as an yellow ink in combination with a magenta ink and a cyan ink, or one having a black ink further combined thereto, as the case requires.

Magenta Ink

The above-mentioned magenta ink may be one which optionally contains in an aqueous medium a known magenta dye such as C.I. (color index) acid red 1, 8, 14, 18, 26, 32, 35, 37, 42, 49, 50, 51, 52, 57, 62, 73, 80, 82, 83, 87, 91, 92, 93, 94, 95, 98, 106, 111, 114, 118, 119, 119:1, 122, 127, 128, 131, 143, 143:1, 151, 154, 158, 161, 186, 212, 217, 218, 228, 249, 251, 252, 254, 257, 260, 261, 263, 265, 266, 274, 276, 277, 289, 299, 301, 303, 305, 318, 328, 336, 337, 341, 355, 361, 366, 396 or 397; Direct Red 2, 4, 6, 9, 23, 26, 31, 39, 54, 55, 57, 62, 63, 64, 65, 68, 72, 75, 76, 79, 80, 81, 83, 83:1, 84, 89, 92, 95, 99, 111, 141, 173, 180, 184, 207, 211, 212, 214, 218, 221, 223, 224, 225, 226, 227, 232, 233, 240, 241, 242, 243 or 247; Reactive Red 3, 13, 17, 19, 21, 22, 23, 24, 29, 35, 37, 40, 41, 43, 45, 49, 55 or 180; Basic Red 12, 13, 14, 15, 18, 22, 23, 24, 25, 27, 28, 35, 37, 39, 40 or 48; Acid Violet 5, 34, 43, 47, 48, 90, 103 or 126; Direct Violet 7, 9, 47, 48, 51, 66, 90, 93, 94, 95, 98, 100 or 101; Reactive Violet 1, 3, 4, 5, 6, 7, 8, 9, 16, 17, 22, 23, 24, 26, 27, 33 or 34; Basic violet 1, 2, 3, 7, 10, 15, 16, 20, 21, 25, 27, 28, 35, 37, 39, 40 or 48. Preferred may, for example, be a quinacridone pigment, a xanthene pigment, a perylene pigment, an anthanthrone pigment or a monoazo pigment, represented by e.g. C.I. Pigment Red 5, 7, 12, 112, 81, 112, 123, 146, 147, 168, 173, 202, 206, 207 or 209; a water-soluble azo metal chelate compound formed of an azo compound and a metal atom; an anthrapyridone water-soluble compound represented by the following formula (101); or a magenta dye selected from water-soluble azo compounds represented by the following formulae (MA) to (MG).

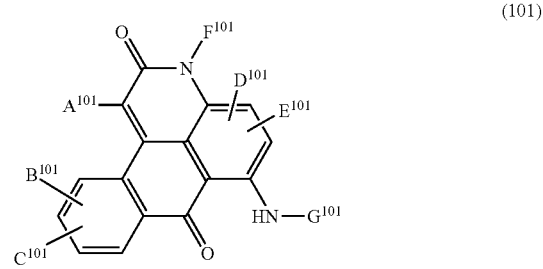

(101)

(Wherein each of $A^{101}$ to $E^{101}$ which are independent of one another, is a hydrogen atom, a halogen atom, a hydroxyl group, a mercapto group, a nitro group, a cyano group, a carboxyl group, a sulfo group, a phosphono group, an alkyl group which may be substituted, an alkenyl group which may be substituted, an aryl group which may be substituted, an alkoxy group which may be substituted, an alkenyloxy group which may be substituted, an aryloxy group which may be substituted, an acyl group, an acyloxy group, a carbamoyl group which may be substituted, a carboxylate group, an amino group which may be substituted, an alkylthio group which may be substituted, an alkenylthio group which may be substituted, an arylthio group which may be substituted, an alkylsulfinyl group which may be substituted, an arylsulfinyl group which may be substituted, an alkylsulfonyl group which may be substituted, an arylsulfonyl group which may be substituted, a sulfonate group, or a thiocyanate group, each of $F^{101}$ and $G^{101}$ which are independent of each other, is a hydrogen atom; an alkyl group which may be substituted; an alkenyl group which may be substituted;

an aryl group which may be substituted; an acyl group; a carboxylate group; an alkylsulfonyl group which may be substituted; an arylsulfonyl group which may be substituted; a sulfonate group; or a triazinyl group which may be substituted by a substituent selected from the group consisting of a halogen atom, a hydroxyl group, an alkylamino group which may be substituted, an alkenylamino group which may be substituted, an arylamino group which may be substituted, an alkoxy group which may lo be substituted, an alkenyloxy group which may be substituted, an aryloxy group which may be substituted, an alkylthio group which may be substituted, an alkenylthio group which may be substituted, and an arylthio group.)

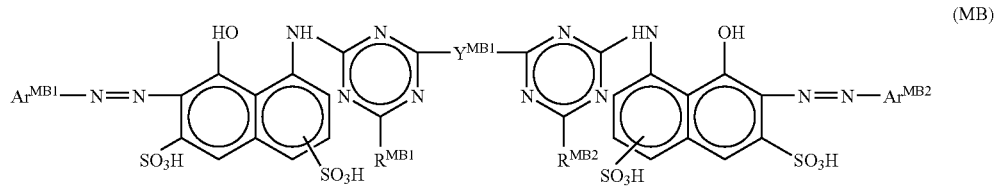

(MA)

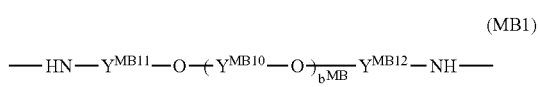

(Wherein each of $R^{MA1}$, $R^{MA2}$ and $R^{MA3}$ which are independent of one another, is a hydrogen atom, a halogen atom, a hydroxyl group, a carboxyl group, a nitro group, a $C_{1-9}$ alkyl group which may be substituted, a $C_{1-9}$ alkoxy group, a carbamoyl group which may be substituted, a sulfamoyl group which may be substituted, an amino group which may be substituted, a sulfonate group, a $C_{1-9}$ alkylsulfonyl group, a $C_{6-5}$ arylsulfonyl group, or a carboxylate group; $a^{MA}$ represents 0, 1 or 2; $E^{MA1}$ is a hydrogen atom or a $C_{1-4}$ alkyl group; and each of $G^{MA1}$ and $G^{MA2}$ which are independent of each other, is a halogen atom, a group represented by $NR^{MA4}R^{MA5}$ or $OR^{MA6}$, where each of $R^{MA4}$, $R^{MA5}$ and $R^{MA6}$ which are independent of one another, is a hydrogen atom, a $C_{1-18}$ alkyl group, a $C_{2-18}$ alkenyl group, an aryl group, an aralkyl group, an aromatic hydrocarbon cyclic group or a heterocyclic group, provided that such a group, other than the hydrogen atom, may have a substituent.)

(Wherein each of $R^{MA1}$ and $R^{MA2}$ represents $-OR^{Mb1}$, $-NR^{Mb2}R^{Mb3}$ or a chlorine atom, each of $R^{Mb1}$, $R^{Mb2}$ and $R^{Mb3}$ represents a hydrogen atom, a $C_{1-8}$ linear or branched alkyl group, a $C_{2-3}$ alkenyl group, an aryl group, an aralkyl group, a cycloalkyl group or a nitrogen-containing heterocyclic group, provided that such a group other than the hydrogen atom may further have a substituent, or $R^{Mb2}$ and $R^{Mb3}$ may form a 5- or 6-membered ring together with the nitrogen atom bonded thereto; $Y^{MB1}$ represents a bivalent connecting group selected from groups represented by the following formulae (MB1) to (MB4) and groups represented by the following formula (MB5) to (MB8):

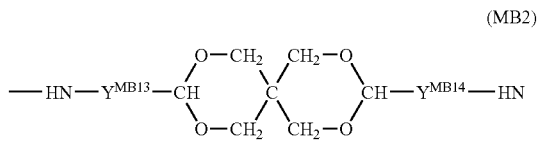

(MB1)

(Wherein each of $Y^{MB11}$ and $Y^{MB12}$ which are independent of each other, is a $C_{1-8}$ linear or branched alkylene group, and $Y^{MB10}$ is a $C_{1-12}$ linear or branched alkylene group, and $b^{MB}$ is an integer of from 0 to 20.)

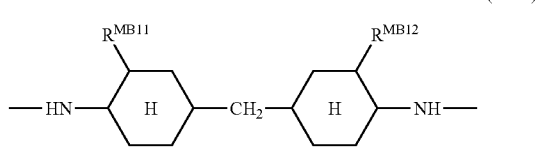

(MB2)

(Wherein each of $Y^{MB13}$ and $Y^{MB14}$ which are independent of each other, is a $C_{1-8}$ linear or branched alkylene group.)

(MB3)

(Wherein each of $R^{MB11}$ and $R^{MB12}$ is a hydrogen atom or a methyl group.)

(MB4)

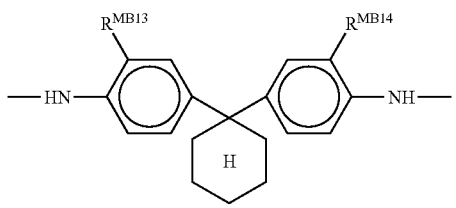

(Wherein each of $R^{MB13}$ and $R^{MB14}$ which are independent of each other, is a hydrogen atom, a methyl group or a methoxy group.)

(MB5)

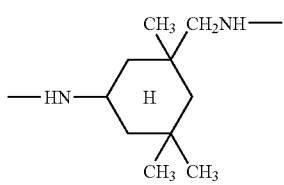

(MB6)

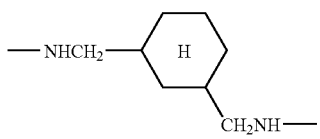

(MB7)

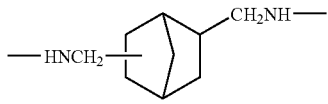

(MB8)

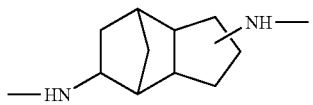

(Each of $Ar^{MB1}$ and $Ar^{MB2}$ which are independent of each other, is a phenyl group which may be substituted, or a naphthyl group which may be substituted.)

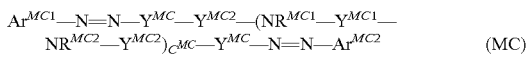
(MC)

(Wherein each of $Ar^{MC1}$ and $Ar^{MC2}$ which are independent of each other, is an aryl group which may be substituted, provided that at least one of $Ar^{MC1}$ and $Ar^{MC2}$ has at least one substituent selected from —COOH and —COSH, as a substituent; each of $R^{MC1}$ and $R^{MC2}$ which are independent of each other, is a hydrogen atom, an alkyl group which may be substituted, or an alkenyl group which may be substituted; $Y^{MC}$ represents the following group:

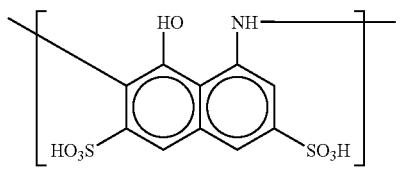

$Y^{MC1}$ represents a bivalent organic connecting group, $C^{MC}$ is 0 or 1, and $Y^{MC2}$ is a carbonyl group or a group represented by the following formula ①, ② or ③:

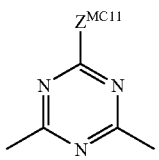
①

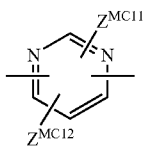
②

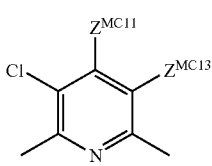
③

(Wherein Z represents $NR^{MC21}R^{MC22}$, $SR^{MC23}$ or $OR^{MC23}$, $Z^{MC12}$ represents a hydrogen atom, a chlorine atom or a group represented by $Z^{MC11}$, $Z^{MC13}$ represents a chlorine atom or a cyano group; each of $R^{MC21}$, $R^{MC22}$ and $R^{MC23}$ which are independent of one another, is a hydrogen atom, an alkyl group which may be substituted, an alkenyl group which may be substituted, an aryl group which may be substituted, or an aralkyl group which may be substituted, provided that $R^{MC21}$ and $R^{MC22}$ may form a 5- or 6-membered ring together with the nitrogen atom bonded thereto.))

(MD)

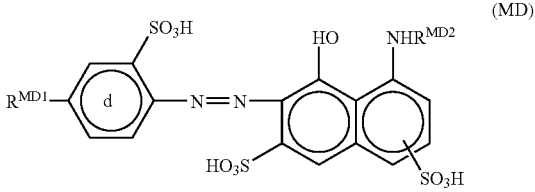

(Wherein $R^{MD1}$ represents a hydrogen atom, a methyl group, a methoxy group, an acetylamino group or a nitro group, but may form a benzene ring together with the carbon atom 5 at the 3-position of the benzene ring d; $R^{MD2}$ represents an acetyl group, a benzoyl group, a p-toluenesulfonyl group or a 4-chloro-6-hydroxy-1,3,5-triazin-2-yl group.)

(ME)

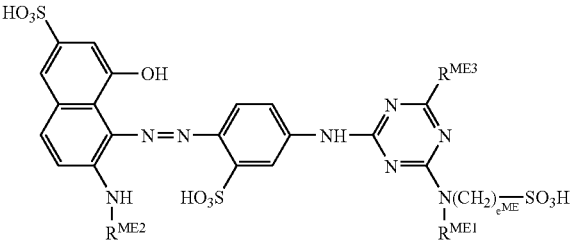

(Wherein $R^{ME1}$ represents a hydrogen atom or a $C_{1-6}$ aliphatic group; $R^{ME2}$ represents a hydrogen atom; a $C_{1-6}$ alkyl group which may have a substituent selected from the group consisting of a cyano group, a hydroxyl group, a $COOR^{Me}$ group ($R^{Me}$ is a hydrogen atom, a metal atom or an ammonium group which may have a substituent), a $COOCH_3$ group and a $COOCH_2CH_3$ group; or an aryl group which may be substituted by a methyl group; $e^{ME}$ is an integer of from 2 to 4; and $R^{ME3}$ represents a hydroxyl group, an amino group which may have a substituent, an alkylthio group or an alkoxy group.)

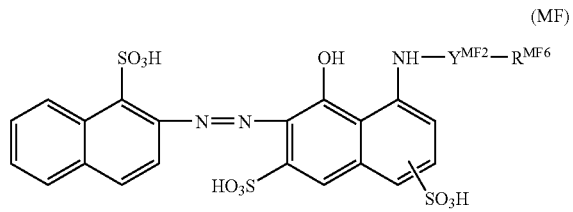

(MF)

(Wherein $Y^{MF2}$ represents a carbonyl group or a sulfonyl group, and $R^{MF6}$ is a $C_{1-18}$ aliphatic group or a group represented by the following formula (F1):

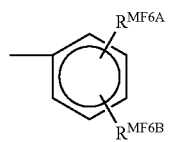

(F1)

(Wherein $R^{MF6A}$ represents a hydrogen atom, a halogen atom, a nitro group, a cyano group, a carboxyl group, a $C_{1-4}$ lower alkyl group or a $C_{1-4}$ lower alkoxy group, $R^{MF6B}$ represents a hydrogen atom, a halogen atom, a carboxyl group, or a $C_{1-4}$ lower alkyl group.))

Among the above, preferred as the magenta dye to be used for the ink set of the present invention is a water-soluble azo metal chelate compound, and a preferred specific example of such a compound may be one formed of an azo compound represented by the following formula (102) to (105) and a metal atom. Particularly preferred is one formed of an azo compound represented by the following formula (103) and a metal atom.

Formula (102):

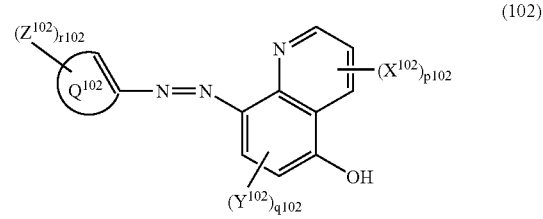

(102)

(Wherein each of $X^{102}$, $Y^{102}$ and $Z^{102}$ which are independent of one another, is a halogen atom; a cyano group; a nitro group; a hydroxyl group; a carboxyl group; a sulfo group; a phospho group; an ureido group; a $C_{1-6}$ alkyl group which may be substituted; a $C_{1-6}$ alkoxy group which may be substituted; a $C_{6-10}$ aryl group which may be substituted; a heteroaryl group which may be substituted; an alkoxycarbonyl group which may be substituted; an amino group which may be mono- or di-substituted by a substituent selected from the group consisting of an alkyl group which may be substituted, an alkenyl group which may be substituted, an alkoxy group which may be substituted, an aryloxy group which may be substituted, a carbamoyl group which may be substituted, an acyl group or an acyloxy group, provided that in a case where a plurality of $R^{MG3}$, $R^{MG4}$ and $R^{MG5}$ are present, a plurality of $R^{MG3}$, $R^{MG4}$ and $R^{MG5}$ may be the same or different, respectively; each of $m^{MG}$, $n^{MG}$ and $p^{MG}$ which are independent of one another, is an integer of from 0 to 3, provided that $(m^{MG}+n^{MG}+p^{MG})$ is from 0 to 5.)

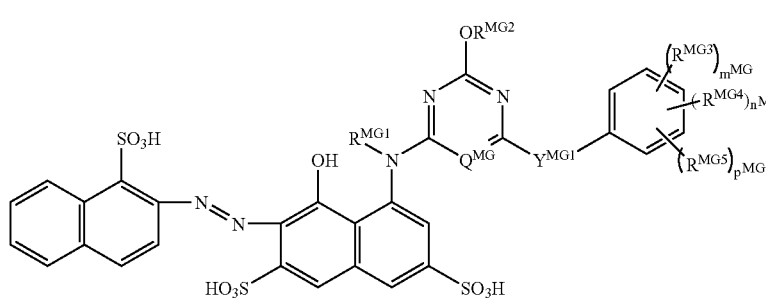

(MG)

(Wherein $Q^{MG1}$ represents N, C—Cl, C—CN or C—NO$_2$, $R^{MG1}$ represents a hydrogen atom or an alkyl group which may be substituted, and $R^{MG2}$ is a hydrogen atom or an alkyl group; $Y^{MG1}$ represents —O—, —S— or —NR$^{MG6}$— ($R^{MG6}$ represents a hydrogen atom or an alkyl group which may be substituted.); $R^{MG3}$ represents —CO$_2$H or —SO$_3$H, $R^{MG4}$ represents an amino group which may be substituted, $R^{MG5}$ represents a halogen atom, a hydroxyl group, a thiol group, a nitro group, a cyano group, an alkyl group which may be substituted, an aryl group which may be substituted, an acyl group, an alkylsulfonyl group and an arylsulfonyl group; a carbamoyl group which may be substituted by a substituent selected from the group consisting of an alkyl group which may be substituted and an aryl group which may be substituted; a sulfamoyl group which may be substituted by a substituent selected from the group consisting of an alkyl group which may be substituted and an aryl group which may be substituted; or a quaternary ammonium or phosphonium group, $Q^{102}$ is a 5- or 6-hetero ring, each of $p^{102}$ and $r^{102}$ which are independent of each other is an integer of from 0 to 3, and $q^{102}$ is an integer of from 0 to 2.)

Formula (103):

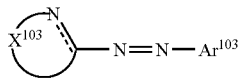

(103)

(The formula (103) represents an azo compound having at least one hydrophilic group in its molecule, and $X^{103}$ represents a plurality of atoms required to form at least one 5- to 7-membered heterocyclic group, and the heterocyclic group containing $X^{103}$ may have a substituent on its hetero ring, and the substituents on the hetero ring may be condensed to form a condensed ring, or the condensed hetero ring containing $X^{103}$ may further be substituted, and $Ar^{103}$ represents a substituted naphthyl group selected from the following formulae (103-1) to (103-3), $Y^{103}$ represents a chelating group, and $Z^{103}$ represents optional substituents which may be different from one another, and $a^{103}$ represents an integer of from 0 to 6.)

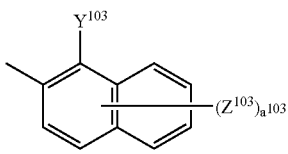

(103-1)

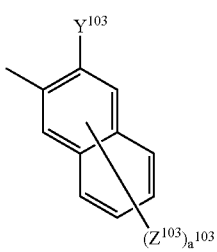

(103-2)

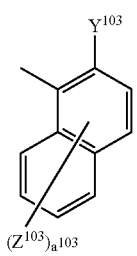

(103-3)

Formula (104):

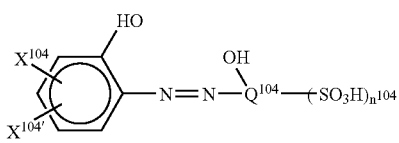

(104)

(Wherein $X^{104}$ represents a hydrogen atom, a halogen atom, a nitro group, a carboxyl group, a sulfo group, a $C_{1-4}$ alkyl group, a $C_{1-4}$ alkoxy group, a $C_{1-4}$ alkylsulfonylamino group, a $C_{6-10}$ arylsulfonylamino group, a $C_{2-7}$ acylamino group, a substituted or unsubstituted triazinylamino group or a substituted or unsubstituted sulfamoyl group, and $X^{104}$ represents a hydrogen atom or a sulfo group. $Q^{104}$ represents a phenyl group or a naphthyl group which may have a substituent selected from the group consisting of a hydroxyl group, a $C_{1-4}$ alkoxy group, a $C_{2-7}$ acylamino group, a substituted or unsubstituted triazinylamino group and a substituted or unsubstituted carbamoyl group, and here, the hydroxyl group is one bonded to a ring-constituting atom adjacent to the carbon atom bonded to the azo group. $n^{104}$ represents an integer of from 0 to 3.)

Formula (105):

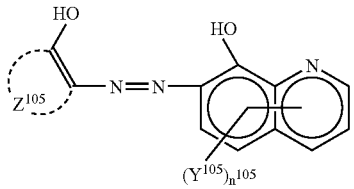

(105)

(Wherein, $Z^{105}$ represents a benzene ring or a naphthalene ring having at least a sulfo group as a substituent, $Y^{105}$ is a sulfo group or a substituted amino group, and $n^{105}$ is an integer of from 0 to 2.)

In the above formula (102), a preferred specific example of the ureido group represented by $X^{102}$, $Y^{102}$ and $Z^{102}$ may be a ureido group which may be substituted by a substituent selected from the group consisting of an alkyl group and an aryl group, which may be substituted, such as a ureido group, a n-methylureido group, or a 3,5-biscarboxyphenylureido group.

A preferred specific example of the $C_{1-6}$ alkyl group which may be substituted, may be a linear or branched alkyl group which may be substituted by a substituent selected from the group consisting of a hydroxyl group, an amino group which may be substituted, a sulfate group and an aryl group, such as a methyl group, an ethyl group, an isopropyl group, a hydroxyethyl group, a 3-(N,N-dimethylamino)propyl group, a sulfate ethyl group or a benzyl group.

A preferred specific example of the alkoxy group which may be substituted or of the alkoxy group in the alkoxycarbonyl group which may be substituted, may be an alkoxy group which may be substituted by a substituent selected from the group consisting of a hydroxyl group and a carboxyl group, such as a methoxy group, an isopropoxy group, a 2-hydroxyethoxy group or a carboxymethoxy group.

A preferred specific example of the $C_{6-10}$ aryl group which may be substituted, may be a phenyl group or a naphthyl group, which may be substituted by a substituent selected from the group consisting of a halogen atom and a carboxyl group, such as a phenyl group, a naphthyl group, a 4-chlorophenyl group or a 2-carboxyphenyl group.

A preferred specific example of the heteroaryl group which may be substituted, may be a pyridyl group, an imidazolyl group or a quinolyl group.

A preferred specific group of the amino group which may be mono or di-substituted by a substituent selected from the group consisting of an alkyl group which may be substituted, an aryl group which may be substituted, an acyl group, an alkylsulfonyl group and an arylsulfonyl group, may be a methylamino group, an N,N-dimethylamino group, a carboxymethylamino group, a 2,5-disulfoanilinomethanesulfonylamino group, a p-toluenesulfonylamino group, a 2-(trimethylammonium)ethanesulfonylamino group, an acetamide group, a carboxyethylacetamide group or a benzamide group.

A preferred specific example of the carbamoyl group which may be substituted by a substituent selected from the group consisting of an alkyl group which may be substituted and an aryl group which may be substituted, may be an N-methylcarbamoyl group, an N-methyl-N-(3-sulfophenyl)-carbamoyl group, an N-p-(trimethylammonium)phenylcarbamoyl group or an N,N-bis(4-carboxyphenyl)carbamoyl group.

A preferred specific example of the sulfamoyl group which may be substituted by a substituent selected from the group consisting of an alkyl group which may be substituted and an aryl group which may be substituted, may be an N-methylsulfamoyl group, an N-methyl-N-(3-sulfophenyl)-sulfamoyl group, an N-p-(trimethylammonium)phenylsulfamoyl group or an N,N-bis(4-carboxyphenyl)sulfamoyl group.

A preferred specific example of the quaternary ammonium group may be a trimethylammonium group or a benzyldimethylammonium group, and a preferred specific example of the phosphonium group may be a triphenylphosphonium group or a trimethylphosphonium group.

The 5- or 6-membered hetero ring represented by $Q^{102}$ may be a pyridine ring, a pyrazine ring, a quinoline ring, a thiazole ring, a benzothiazole ring or a pyrazole ring. Among them, preferred is a pyridine ring.

In the above formula (103), the 5- to 7-membered hetero ring represented by $X^{103}$ may be a 5- to 7-membered hetero ring such as an imidazole ring, a pyrazole ring, an isoxazole ring, a thiazole ring, a thiadiazole ring, a pyridine ring, a pyridazine ring, a pyrimidine ring, a pyrazine ring, a triazole ring, a tetrazole ring or an oxadiazole ring. It may further be such that substituents on the hetero ring may further be condensed to form a condensed ring such as a benzothiazole ring, a benzoxazole ring or a benzimidazole ring. Among them, preferred is one containing at least two nitrogen atoms as hetero atoms. More preferred is an imidazole ring, a pyrazole ring, a thiadiazole ring or a triazole ring. Further preferred is an imidazole ring or a triazole ring. Particularly preferred is an imidazole ring.

The 5- to 7-membered hetero ring or condensed hetero ring containing such $X^{103}$, may further be substituted by a substituent selected from the group consisting of a halogen atom such as a chlorine atom, a bromine atom or a fluorine atom; a hydroxyl group; a mercapto group; a nitro group; a cyano group; a carboxyl group; a sulfonic group; a phosphono group; a linear, branched or cyclic alkyl group such as a methyl group, an ethyl group, a n-propyl group, an isopropyl group or a n-butyl group, which may be substituted; a linear, branched or cyclic alkenyl group such as a vinyl group, a 2-propenyl group, an isopropenyl group or a 2-butenyl group, which may be substituted; an aryl group such as a phenyl group or a naphthyl group, which may be substituted; an alkoxy group such as a methoxy group, an ethoxy group, a n-propoxy group, an isopropoxy group or a n-butoxy group, which may be substituted; an aryloxy group such as a phenoxy group or a naphthyloxy group, which may be substituted; an acyl group such as an acetyl group, an ethylcarbonyl group, a propylcarbonyl group, a butylcarbonyl group, a phenylcarbonyl group or a benzylcarbonyl group; an acyloxy group such as an acetyloxy group, a propionyloxy group, an isobutyryloxy group, a pivaloyloxy group, an acryloyloxy group, a methacryloyloxy group or a benzoyloxy group; a carbamoyl group which may be substituted; a carboxylate group made of an alkoxycarbonyl group which may be substituted, such as a methoxycarbonyl group, an ethoxycarbonyl group, a propoxycarbonyl group, an isopropoxycarbonyl group or a butoxycarbonyl group, or an aryloxycarbonyl group which may be substituted, such as a phenoxycarbonyl group, a naphthyloxycarbonyl group, a methylphenoxycarbonyl group, a methoxyphenoxycarbonyl group, a carboxyphenoxycarbonyl group or a sulfoxyphenoxycarbonyl group; an amino group which may be substituted; an alkylthio group such as a methylthio group, an ethylthio group, a propylthio group, a butylthio group, a vinylthio group, a 2-propenylthio group or an isopropenylthio group, which may be substituted; an arylthio group such as a phenylthio group or a naphthylthio group, which may be substituted; an alkylsulfinyl group such as a methylsulfinyl group, an ethylsulfinyl group, a propylsulfinyl group or an isopropylsulfinyl group, which may be substituted; an arylsulfinyl group such as a phenylsulfinyl group or a naphthylsulfinyl group, which may be substituted; an alkylsulfonyl group such as a methylsulfonyl group, an ethylsulfonyl group, a propylsulfonyl group or a butylsulfonyl group, which may be substituted; an arylsulfonyl group such as a phenylsulfonyl group or a naphthylsulfonyl group, which may be substituted; a sulfamoyl group which may be substituted; a sulfonate group made of an alkoxycarbonyl group such as a methoxysulfonyl group, an ethoxysulfonyl group, an isopropoxysulfonyl group, a butoxysulfonyl group or a benzyloxysulfonyl group, or an aryloxysulfonyl group such as a phenoxysulfonyl group or a methylphenoxysulfonyl group; and a thiocyanate group.

The above-mentioned alkyl group which may be substituted, the alkenyl group which may be substituted, the alkoxy group which may be substituted, the acyl group, the acyloxy group, the carbamoyl group which may be substituted, the carboxylate group, the amino group which may be substituted, the alkylthio group which may be substituted, the alkylsulfinyl group which may be substituted, the alkylsulfonyl group which may be substituted, the sulfamoyl group which may be substituted, and the sulfonate group, may preferably be ones having a carbon number of at most 10, more preferably at most 6, further preferably at most 4, and the above aryl group which may be substituted, the aryloxy group which may be substituted, the arylthio group which may be substituted, the arylsulfinyl group which may be substituted, and the arylsulfonyl group which may be substituted, may preferably be ones having a carbon number of at most 15, more preferably at most 12, further preferably at most 8.

The substituents for the above alkyl, alkenyl, aryl, alkoxy, aryloxy, carbamoyl, amino, alkylthio, arylthio, alkylsulfinyl, arylsulfinyl, alkylsulfonyl, arylsulfonyl and sulfamoyl groups may, for example, be a halogen atom, a hydroxyl group, a cyano group, a carboxyl group, a sulfonic group, an alkyl group, an aryl group, an alkoxy group, an aryloxy group, an acyl group, a carbamoyl group, a carboxylate group, a sulfonate group or an amino group which may be substituted by an alkyl group. Among them, a halogen atom, a hydroxyl group, a carboxyl group, a sulfonic group, an alkyl group, an aryl group, an alkoxy group, an aryloxy group or an acyl group is preferred.

Further, preferred among the above alkyl groups which may be substituted, is an alkyl group which may be substituted by a substituent selected from the group consisting of a halogen atom, a carboxyl group and an aryl group, such as a methyl group, an ethyl group, a n-propyl group, an isopropyl group, a n-butyl group, a carboxymethyl group, a carboxyethyl group, a trifluoromethyl group, a benzyl group or a phenethyl group.

Preferred among the above alkenyl groups which may be substituted, is an unsubstituted one.

Preferred among the above aryl groups which may be substituted, is an aryl group which may be substituted by a substituent selected from the group consisting of an alkyl group, an alkoxy group, a carboxyl group and a sulfonic group, such as a phenyl group, a naphthyl group, a tolyl group, a methoxyphenyl group, a carboxyphenyl group or a sulfoxyphenyl group.

Preferred among the above alkoxy groups which may be substituted, is an unsubstituted one.

Preferred among the above aryloxy groups which may be substituted, is an aryloxy group which may be substituted by a substituent selected from the group consisting of an alkyl group, an alkoxy group, a carboxyl group and a sulfonic group, such as a phenoxy group, a naphthyloxy group, a tolyloxy group, a methoxyphenoxy group, a carboxyphenoxy group or a sulfoxyphenoxy group.

Preferred among the above carbamoyl groups which may be substituted, is a carbamoyl group which may be substituted by a substituent selected from the group consisting of an alkyl group and an aryl group, such as a carbamoyl group, an N,N-dimethylcarbamoyl group, a phenylcarbamoyl group or a 3-sulfonylcarbamoyl group, and more preferred is a carbamoyl group.

Preferred among the above carboxylate groups is an alkoxycarbonyl group such as a methoxycarbonyl group, an ethoxycarbonyl group, a propoxycarbonyl group, an isopropoxycarbonyl group or a butoxycarbonyl group, or an aryloxycarbonyl group which may be substituted by a substituent selected from the group consisting of an alkyl group, an alkoxy group, a carboxyl group and a sulfonic group, such as a phenoxycarbonyl group, a naphthyloxycarbonyl group, a methylphenoxycarbonyl group, a methoxyphenoxycarbonyl group, a carboxyphenoxycarbonyl group or a sulfoxyphenoxycarbonyl group.

Preferred among the above amino groups which may be substituted, is an amino group which may be substituted by an alkyl group or an acyl group, such as a methylamino group, an ethylamino group, a dimethylamino group, a diethylamino group, an acetylamino group or a benzoylamino group.

Preferred among the above alkylthio groups which may be substituted, is an unsubstituted one.

Preferred among the above arylthio groups which may be substituted, is an arylthio group which may be substituted by a substituent selected from the group consisting of a carboxyl group, an alkyl group and an alkoxy group, such as a phenylthio group, a methylphenylthio group, a carboxyphenylthio group or a methoxyphenylthio group, and more preferred is an unsubstituted arylthio group.

Preferred among the above alkylsulfinyl groups which may be substituted, is an unsubstituted one.

Preferred among the above arylsulfinyl groups which may be substituted, is an arylsulfinyl group which may be substituted by an alkyl group, such as a phenylsulfinyl group, a methylphenylsulfinyl group or a naphthylsulfinyl group, and more preferred is an unsubstituted arylsulfinyl group.

Preferred among the above alkylsulfonyl groups which may be substituted, is an unsubstituted one.

Preferred among the above arylsulfonyl groups which may be substituted, is an arylsulfonyl group which may be substituted by a substituent selected from the group consisting of an alkyl group and an alkoxy group, such as a phenylsulfonyl group, a methylbenzenesulfonyl group or a methoxybenzenesulfonyl group, and more preferred is an unsubstituted arylsulfonyl group.

Preferred among the above sulfamoyl groups which may be substituted, is a sulfamoyl group which may be substituted by a substituent selected from the group consisting of an alkyl group and an aryl group, which may be substituted, such as a sulfamoyl group, an N,N-dimethylsulfamoyl group, a hydroxyethylaminosulfonyl group, a carboxyethylaminosulfonyl group, a sulfoethylaminosulfonyl group, a phenylsulfamoyl group, a carboxyphenylsulfamoyl group, a sulfophenylsulfamoyl group or a phosphonophenylsulfamoyl group, and more preferred is a sulfamoyl group which may be substituted by an alkyl group substituted by a hydrophilic group represented by a hydroxyl group, a carboxyl group, a sulfo group and a phosphono group, or a phenyl group substituted by a hydrophilic group represented by a hydroxyl group, a carboxyl group, a sulfo group and a phosphono group. Particularly preferred is a carboxyphenylsulfamoyl group or a sulfophenylsulfamoyl group.

Preferred among the above sulfonate groups, is an alkoxysulfonyl group such as a methoxysulfonyl group, an ethoxysulfonyl group, a propoxysulfonyl group, an isopropoxysulfonyl group or a butoxysulfonyl group, or an aryloxysulfonyl group which may be substituted by a substituent selected from the group consisting of an alkyl group, an alkoxy group, a carboxyl group and a sulfonic group, such as a phenoxysulfonyl group, a naphthyloxysulfonyl group, a methylphenoxysulfonyl group, a methoxyphenoxysulfonyl group, a carboxyphenoxysulfonyl group or a sulfoxyphenoxysulfonyl group.

Among the substituents on the hetero ring, preferred is a halogen atom, a hydroxyl group, a nitro group, a cyano group, a carboxyl group, a sulfonic group, an alkyl group which may be substituted, an aryl group which may be substituted, an alkoxy group which may be substituted, an aryloxy group which may be substituted, an acyl group, an acyloxy group, a carbamoyl group which may be substituted, a carboxylate group, an amino group which may be substituted, an alkylthio group which may be substituted, an arylthio group which may be substituted, an alkylsulfonyl group which may be substituted, an arylsulfonyl group which may be substituted, a sulfonate group or a thiocyanate group. More preferred is a hydroxyl group, a cyano group, a carboxyl group, a sulfonic group, an alkyl group which may be substituted, an aryl group which may be substituted, an alkoxy group which may be substituted, an aryloxy group which may be substituted, a carboxylate group, an alkylthio group which may be substituted, an arylthio group which may be substituted, or a sulfonate group. Further preferred is a cyano group, a carboxyl group or an alkyl group or an alkoxy group having a carbon number of at most 10, especially at most 6, more especially from 1 to 5. Further preferred is a cyano group, a carboxyl group or an alkyl group.

Among them, as the hetero ring containing $X^{103}$, preferred are those similar to the ones disclosed in JP-A-2002-080765 (corresponding English publication: EP1241232A) and JP-A-2003-096323 (corresponding English publication: EP1270676A). Preferred specific examples thereof may be those presented in Tables 4-1 to 4-4.

TABLE 4-1

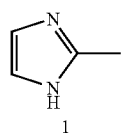 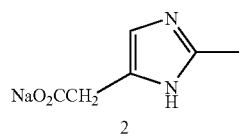

1           2

TABLE 4-1-continued
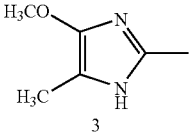

TABLE 4-2-continued
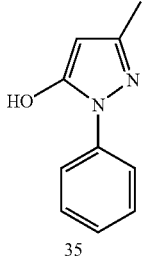
TABLE 4-2-continued
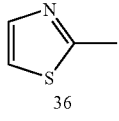
TABLE 4-3
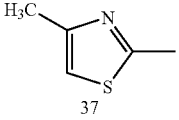

TABLE 4-3-continued

| | |
|---|---|
| 73: 2-pyrimidinyl-methyl | 74: 4-hydroxy-6-methylpyrimidin-2-yl-methyl |
| 75: 4-methylphthalazinyl | 76: 3-methyl-1H-1,2,4-triazol-5-yl |
| 77: 5-methyl-3-carboxy-1H-1,2,4-triazole (HO₂C-) | 78: 5-methyl-3-(trifluoromethyl)-1H-1,2,4-triazole (F₃C-) |
| 79: H₂NOC- triazole-methyl | 80: Cl- triazole-methyl |
| 81: C₂H₃- triazole-methyl | 82: ClH₂C- triazole-methyl |
| 83: NC- triazole-methyl | 84: OHC- triazole-methyl |
| 85: H₃C- triazole-methyl | 86: C₂H₅- triazole-methyl |
| 87: C₆H₅-CH=CH- triazole-methyl | 88: HO₂C-CH=CH- triazole-methyl |
| 89: H₃C-, F₃C- triazole | 90: HO₂CH₂C-, F₃C- triazole |

TABLE 4-3-continued

| | |
|---|---|
| 91: H₃C-N, HO₂C- triazole-methyl | 92: phenyl-triazole-methyl |
| 93: H₃CS- triazole-methyl | |

TABLE 4-4

| | |
|---|---|
| 94: H₃CO₂S- triazole-methyl | 95: H₃COS- triazole-methyl |
| 96: (H₃C)₂N- triazole-methyl | 97: H₃CO- triazole-methyl |
| 98: tetrazole-methyl (NH) | 99: tetrazole-methyl (N-CH₃) |
| 100: HO₂CH₂C- tetrazole-methyl | 101: C₂H₅- tetrazole |
| 102: C₆H₅H₂C- tetrazole-methyl | 103: NCH₂C- tetrazole-methyl |
| 104: ClHC=HCH₂C- tetrazole-methyl | 105: H₃C-, -oxadiazole-methyl |
| 106: C₂H₅- oxadiazole-methyl | 107: F₃C- oxadiazole-methyl |

TABLE 4-4-continued

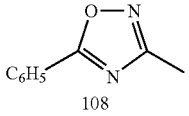
108

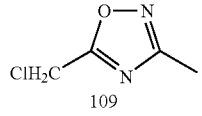
109

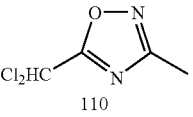
110

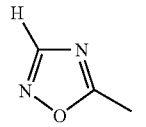
111

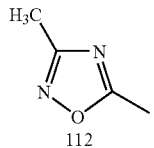
112

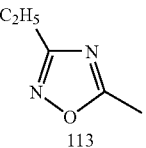
113

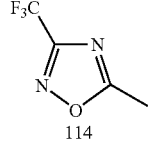
114

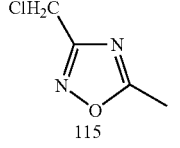
115

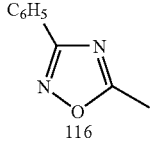
116

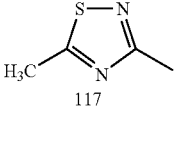
117

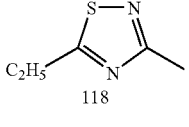
118

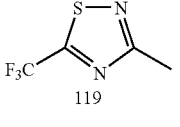
119

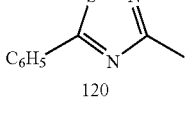
120

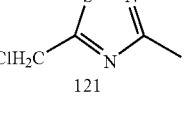
121

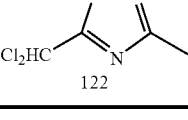
122

Further, $Ar^{103}$ in the above formula (103) is a substituted naphthyl group represented by the above formula (103-1) to (103-3).

Here, $Y^{103}$ is a chelating group, and such a chelating group may be a group similar to the one mentioned as a group capable of forming a coordinate bond in the description of the substituent $R^1$ in the water-soluble complex dye of the present invention represented by the above formula (1).

$Z^{103}$ in the above formulae (103-1) to (103-3) is a monovalent group, which is not particularly limited so long as the azo compound represented by the above formula (103) has a function as a water-soluble dye. Its specific examples may be the groups as exemplified as substituents on the hetero ring in the above description of $A^1$.

Among them, preferred is a halogen atom, a hydroxyl group, a carboxyl group, a sulfonic group, a phosphono group, a nitro group, a ureido group, an alkoxy group which may be substituted, an aryloxy group which may be substituted, an acyloxy group which may be substituted, a carbamoyl group which may be substituted, a carboxylate group, an amino group which may be substituted, a sulfamoyl group, an alkylsulfamoyl group which may be substituted, or an arylsulfamoyl group. More preferred is a halogen atom, a carboxyl group, a nitro group or an arylsulfamoyl group.

Here, the alkoxy group which may be substituted, the aryloxy group which may be substituted, the acyloxy group which may be substituted, the carbamoyl group which may be substituted, the carboxylate group, and the amino group which may be substituted, may be groups similar to those exemplified in the description of the above substituents on the hetero ring.

Among them, the above alkoxy group which may be substituted may preferably be a $C_{1-6}$ alkoxy group such as a methoxy group or an ethoxy group.

The above aryloxy group which may be substituted may preferably be a phenoxy group.

The above acyloxy group which may be substituted may preferably be a $C_{2-7}$ alkanoyloxy group such as an acetyloxy group, or a benzoyloxy group.

The above carbamoyl group which may be substituted may preferably be an unsubstituted carbamoyl group.

The above carboxylate group may preferably be a $C_{2-7}$ alkoxycarbonyl group such as a methoxycarbonyl group or an ethoxycarbonyl group, or an aryloxycarbonyl group such as a phenoxycarbonyl group or a naphthyloxycarbonyl group.

The above amino group which may be substituted may preferably be an amino group, a $C_{1-6}$ alkylamino group such as a methylamino group; an acylamino group, such as a $C_{2-7}$ alkanoylamino group such as an acetylamino group, or a benzoylamino group; a $C_{1-6}$ alkylsulfonylamino group such as a methylsulfonylamino group; or an arylsulfonylamino group such as a phenylsulfonylamino group or a 4-methylphenylsulfonylamino group.

The above alkylsulfamoyl group which may be substituted may preferably be an N,N-bis(carboxymethyl)sulfamoyl group.

The aromatic carbon ring or the aromatic hetero ring constituting the above arylsulfamoyl group may be a phenyl group which may be substituted, a naphthyl group which may be substituted, an anthryl group which may be substituted, a phenalenyl group which may be substituted, an anthraquinolyl group which may be substituted, a pentacenequinolyl group which may be substituted, a triazinyl group which may be substituted, a quinolyl group which may be substituted, an imidazolyl group which may be substituted, a pyrazolyl group which may be substituted, an isoxazolyl group which may be substituted, a thiazolyl group which may be substituted, a thiadiazolyl group which may be substituted, a pyridazinyl group which may be substituted, a pyrimidinyl group which may be substituted, a pyrazinyl group which may be substituted, a benzothiazolyl group which may be substituted, a benzoxazolyl group which may be substituted, a benzimidazolyl group which may be substituted, a triazolyl group which may be substituted, a tetrazolyl group which may be substituted, or an oxadiazolyl group which may be substituted. Among them, preferred is a phenyl group which may be substituted, a naphthyl group which may be substituted, a pyridinyl group which may be substituted, a triazinyl group which may be substituted or a quinolyl group which may be substituted. Further preferred is a phenyl group which may be substituted, a naphthyl group which may be substituted or a pyridinyl group which may be substituted. Most preferred is a phenyl group which may be substituted.

Here, in a case where the above aromatic ring is a benzene ring, the dye solubility will be high, such being preferred from the viewpoint of the reliability in storage of the recording fluid and the maintenance of the reliability. In the case where it is a naphthalene ring, the dye cohesiveness will be increased, such being preferred from the viewpoint of the improvement of fastness, and in the case where it is a pyridine ring, such is preferred from the viewpoint of the improvement of fastness due to the salt forming cohesive effect.

The substituents on the above aromatic carbon ring and the aromatic hetero ring are not particularly limited so long as the azo compound represented by the above formula (103) has a function as a water-soluble dye. However, specific examples thereof may be groups as exemplified as substituents on the hetero ring in the above description of Al. Among them, preferred is a halogen atom, a hydroxyl group, a mercapto group, an amino group, a cyano group, a nitro group, a carboxyl group, a sulfonic group, a $C_{1-4}$ alkyl group, a $C_{1-4}$ alkoxy group, a $C_{1-4}$ alkylthio group or a $C_{1-4}$ alkoxycarbonyl group. More preferred is a carboxyl group, a sulfonic group or a methyl group. Particularly preferred is a carboxyl group. The number of substituents on the aromatic carbon ring and the aromatic hetero ring is preferably from 0 to 3, more preferably from 0 to 2.

Further, the substituent on the nitrogen atom in the arylsulfamoyl group is usually a hydrogen atom, an alkyl group, a hydroxyalkyl group or a mercaptoalkyl group, preferably a hydrogen atom or a methyl group. The above alkyl, hydroxyalkyl or mercaptoalkyl group is preferably one having at most 4 carbon atoms, more preferably at most 2 carbon atoms.

$a^{103}$ represents an integer of from 0 to 6, preferably from 0 to 3 particularly preferably from 0 to 2.

Among them, preferred specific examples as the hetero ring containing $Ar^{103}$ may be those similar to ones disclosed in JP-A-2002-080765 (corresponding English publication: EP1241232A) and JP-A-2003-096323 (corresponding English publication: EP1270676A), and those disclosed in the following Tables 5-1 to 5-10.

TABLE 5-1

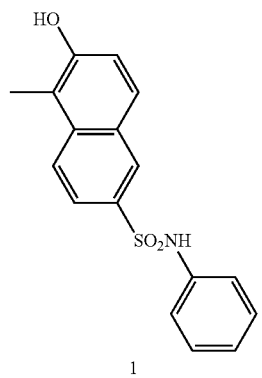

1

TABLE 5-1-continued

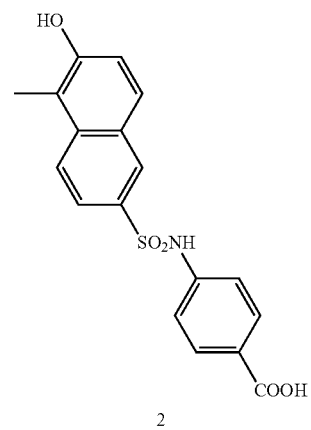

2

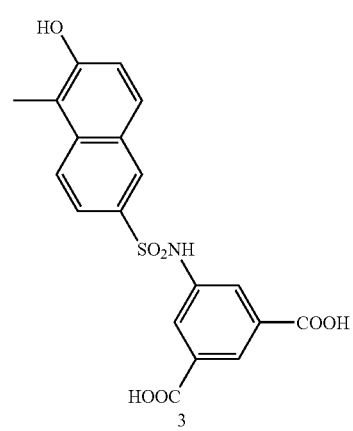

3

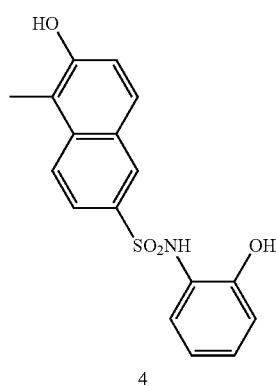

4

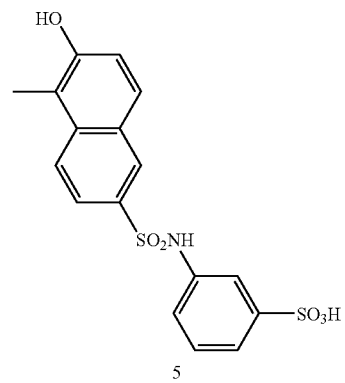

5

TABLE 5-1-continued
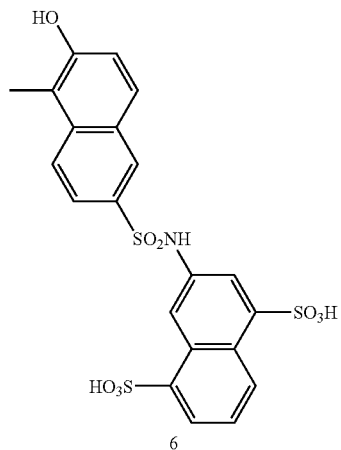
6
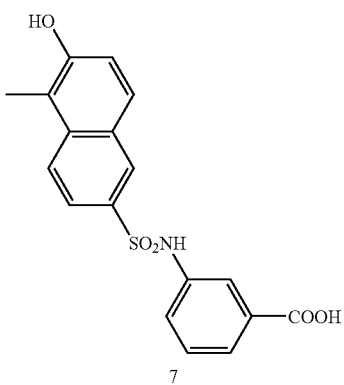
7
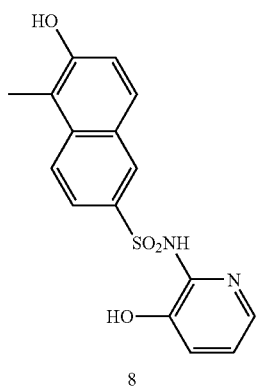
8
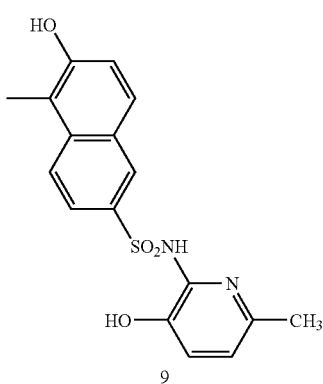
9
TABLE 5-1-continued
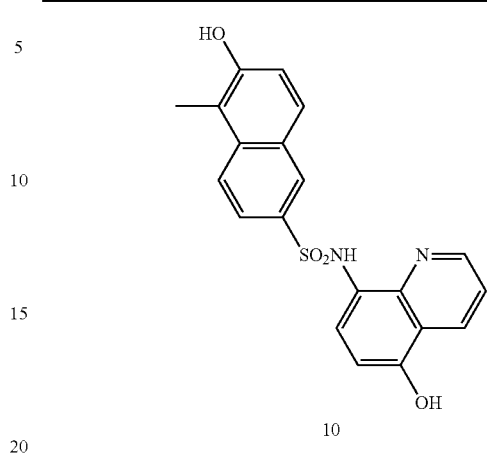
10
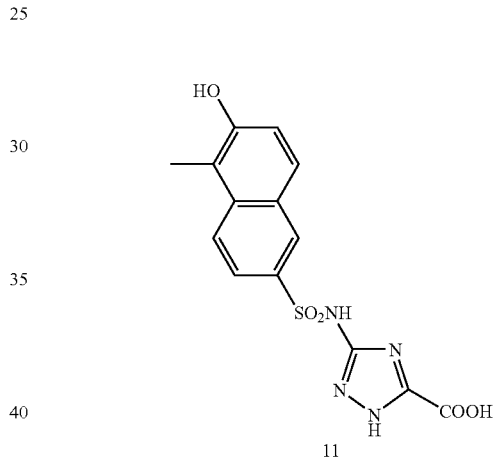
11
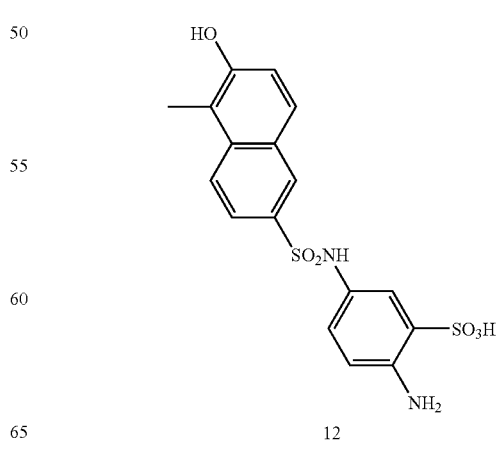
12

TABLE 5-1-continued
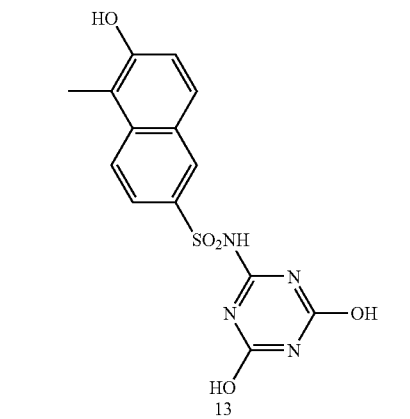
13
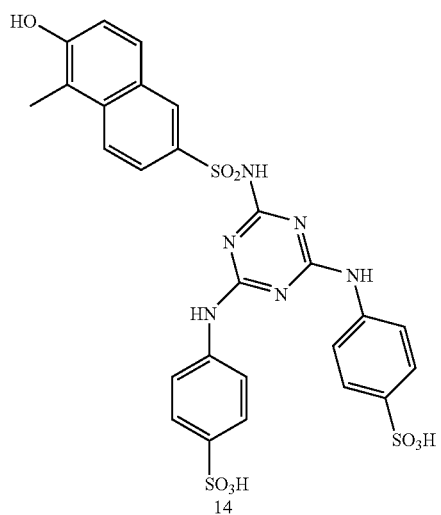
14
TABLE 5-2
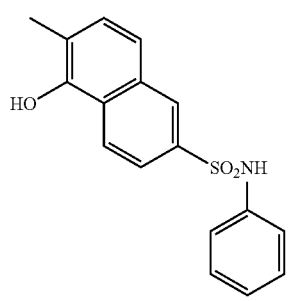
15
TABLE 5-2-continued
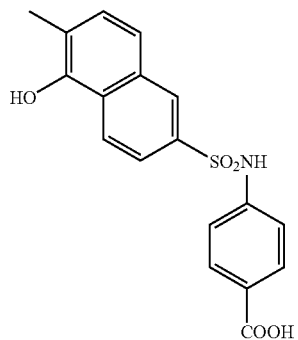
16
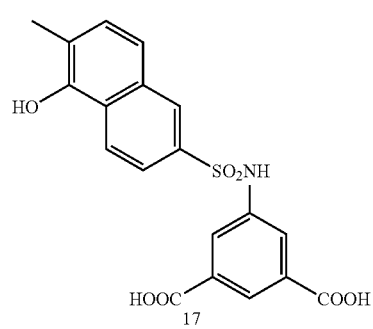
17
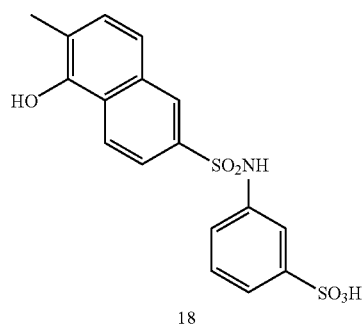
18
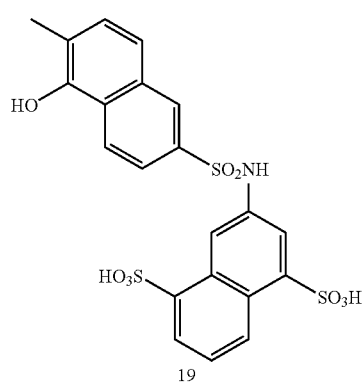
19

TABLE 5-2-continued
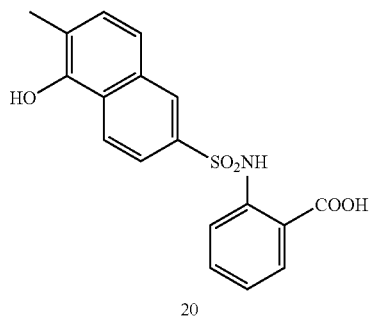
20
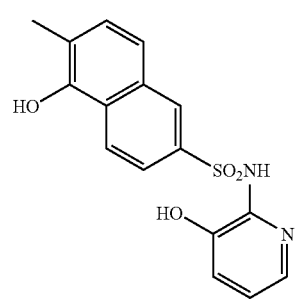
21
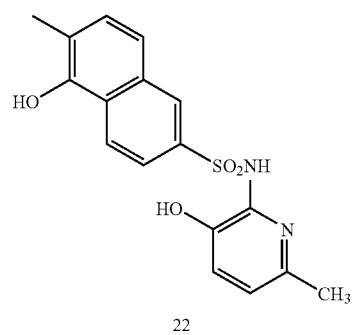
22
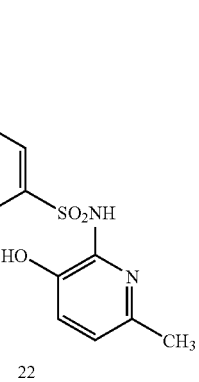
23
TABLE 5-2-continued
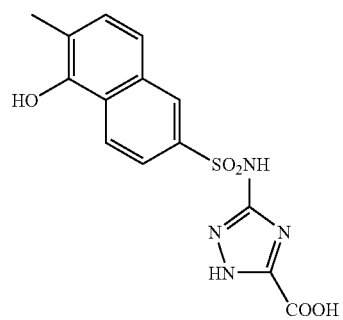
24
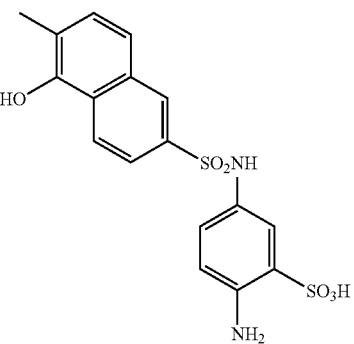
25
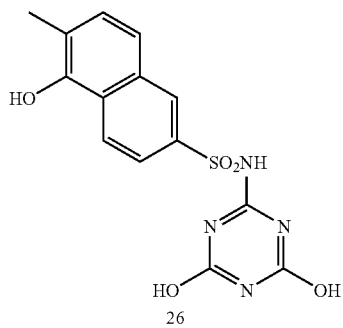
26
TABLE 5-3
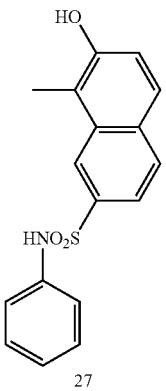
27

TABLE 5-3-continued
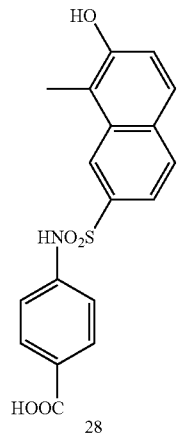
28
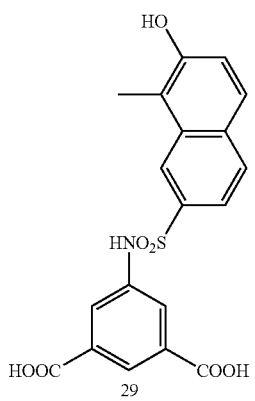
29
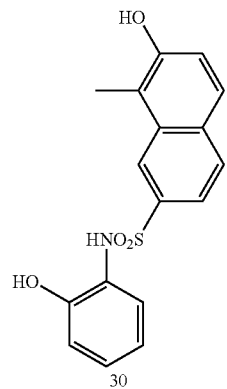
30
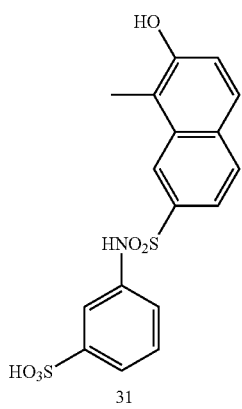
31
TABLE 5-3-continued
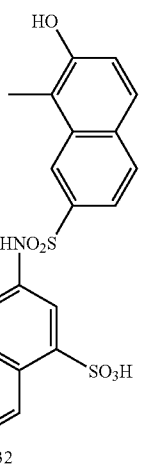
32
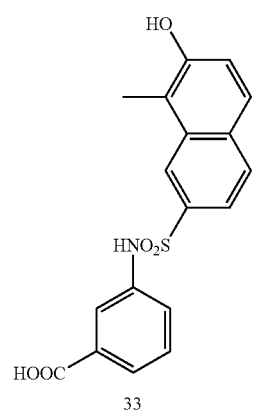
33
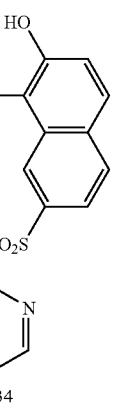
34

TABLE 5-3-continued
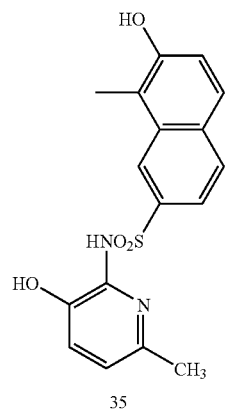
35
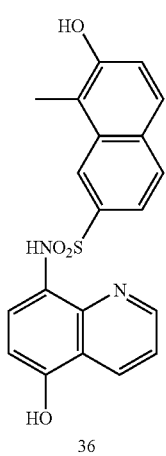
36
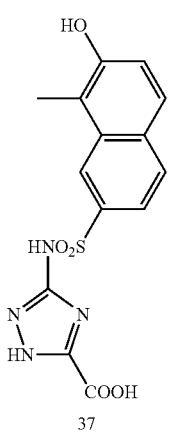
37
TABLE 5-3-continued
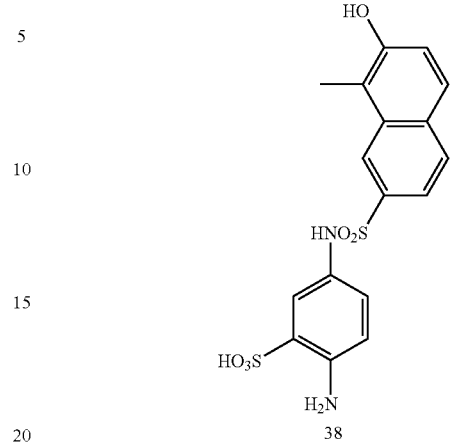
38
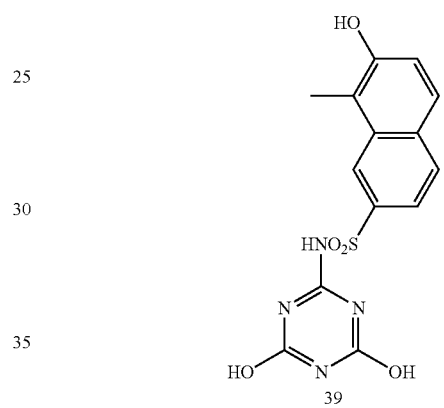
39
TABLE 5-4
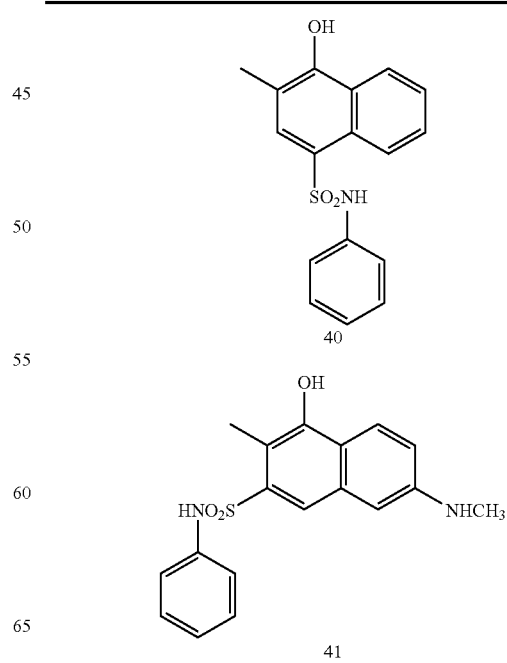
40
41

TABLE 5-4-continued
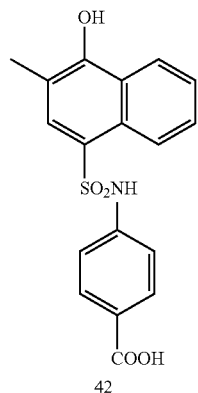
42
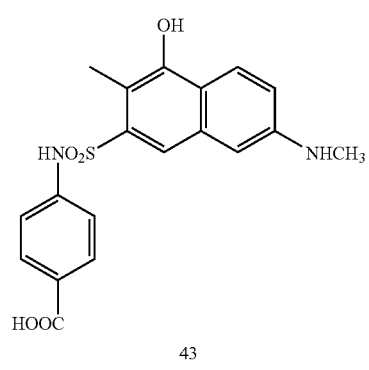
43
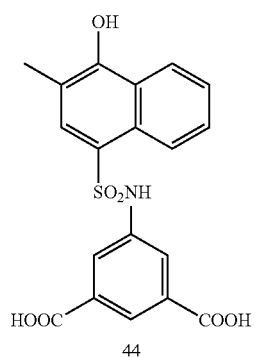
44
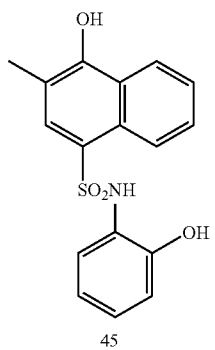
45
TABLE 5-4-continued
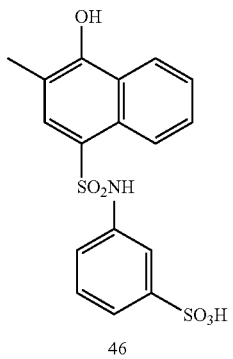
46
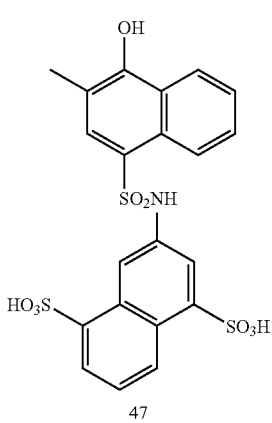
47
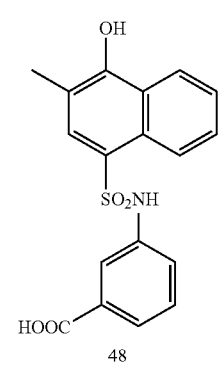
48
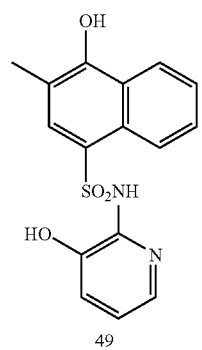
49

TABLE 5-4-continued
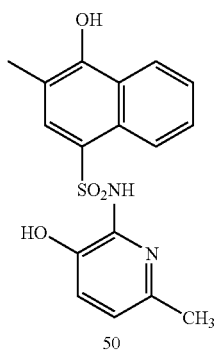
50
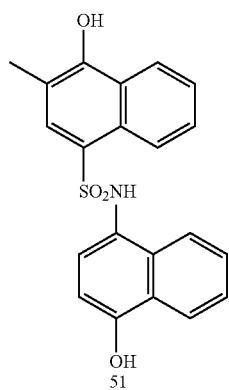
51
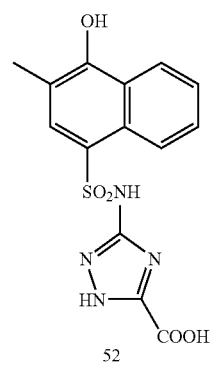
52
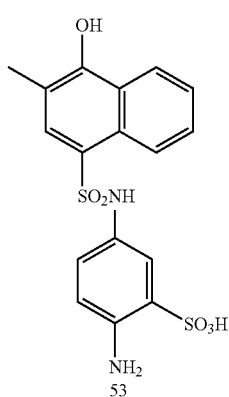
53
TABLE 5-4-continued
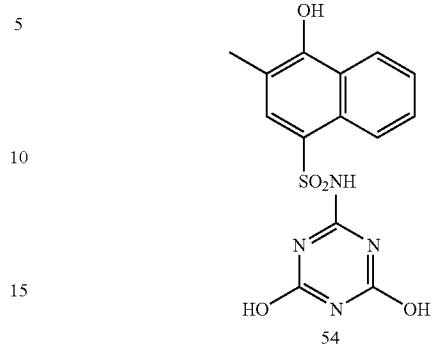
54
TABLE 5-5
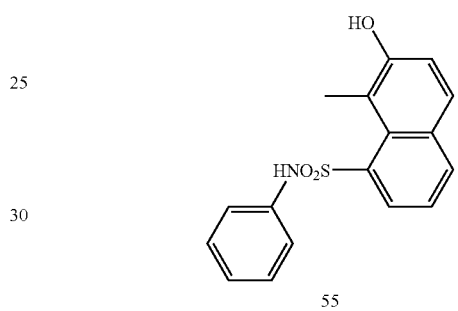
55
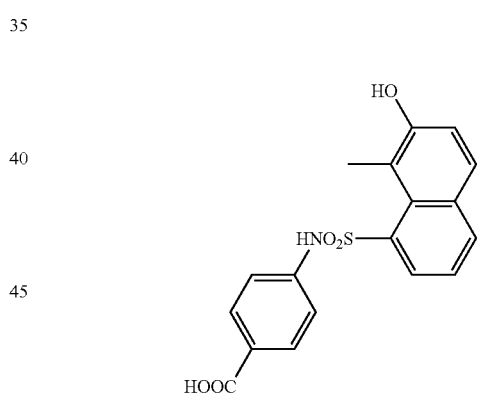
56
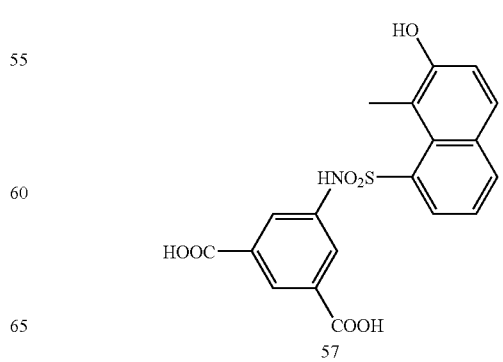
57

TABLE 5-5-continued
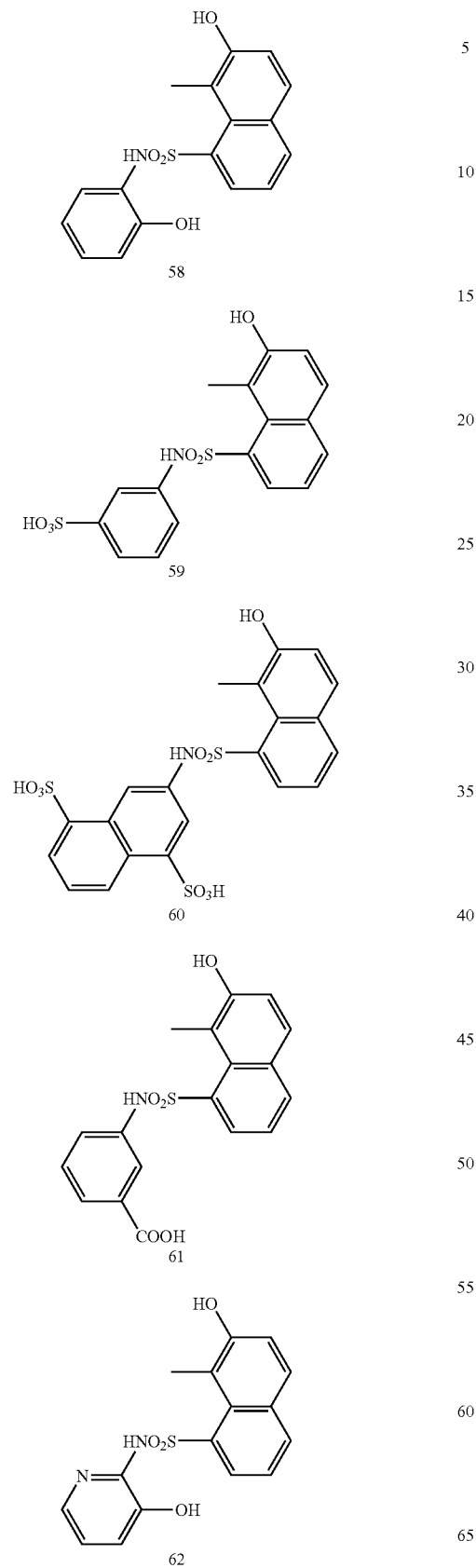
TABLE 5-5-continued
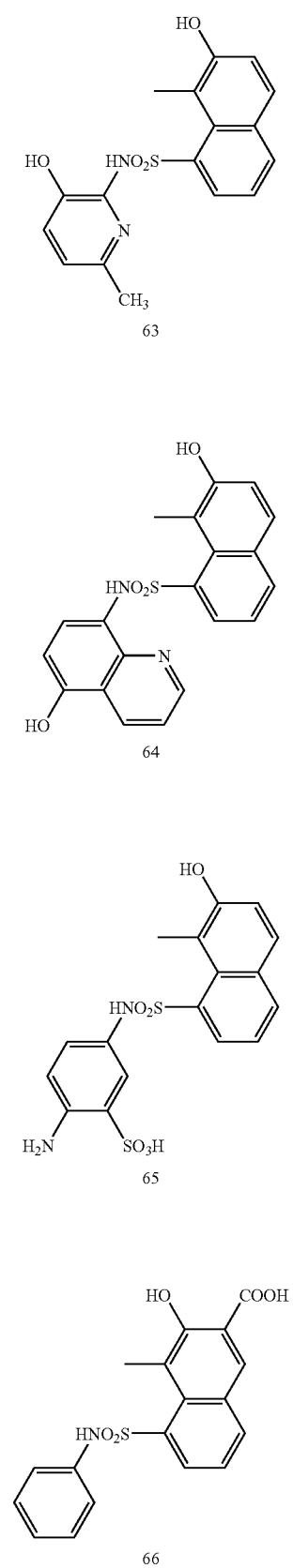

TABLE 5-5-continued
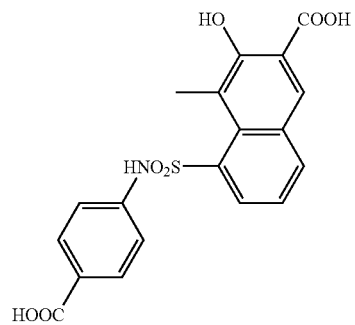
67
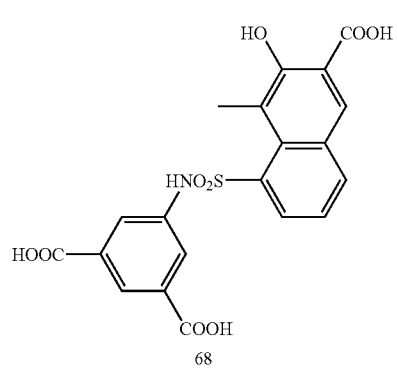
68
TABLE 5-6
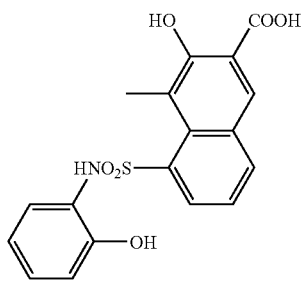
69
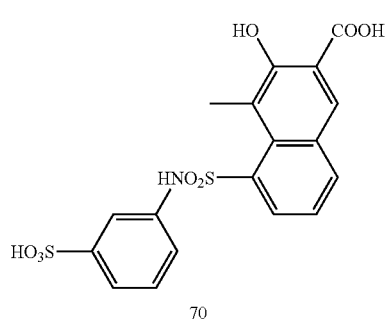
70
TABLE 5-6-continued
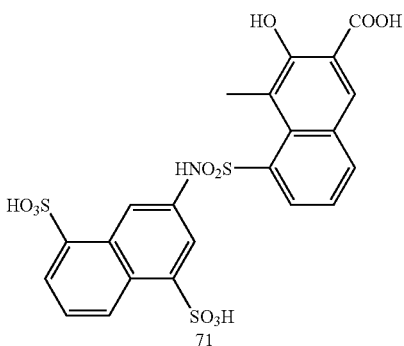
71
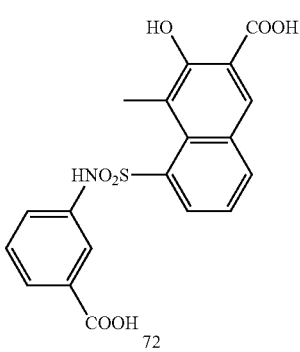
72
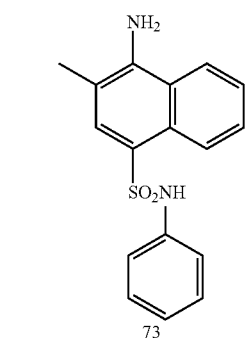
73
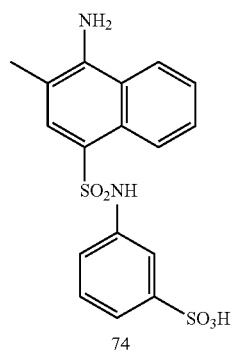
74

TABLE 5-6-continued
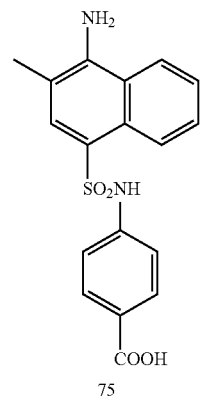
75
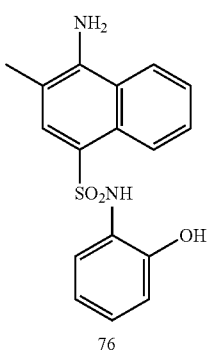
76
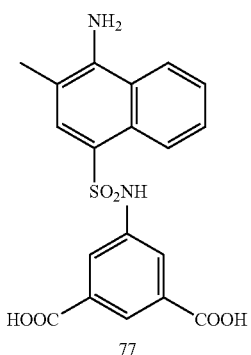
77
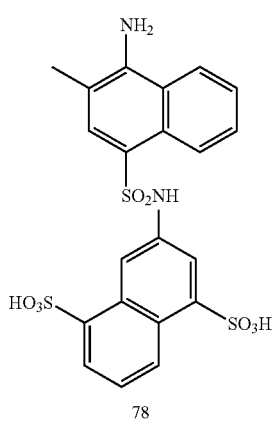
78
TABLE 5-6-continued
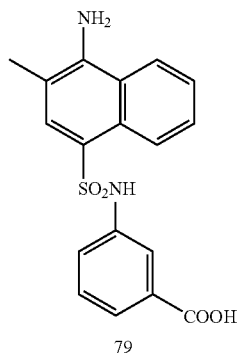
79
TABLE 5-7
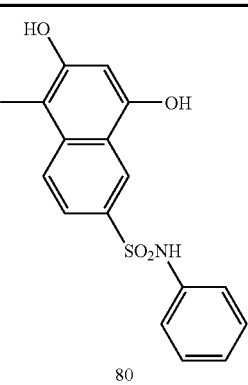
80
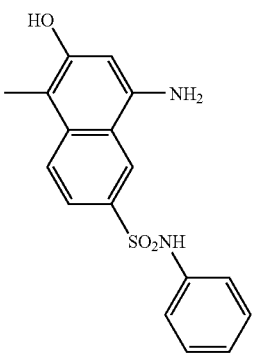
81
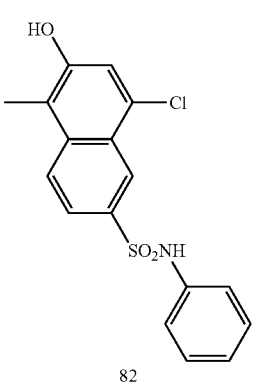
82

TABLE 5-7-continued
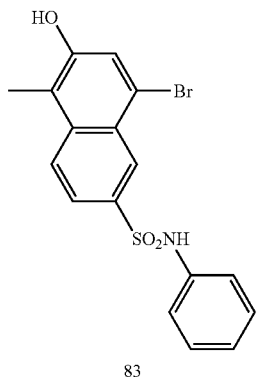
83
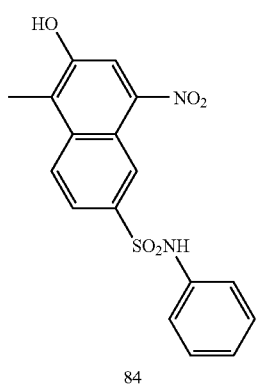
84
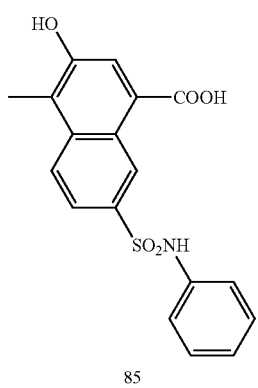
85
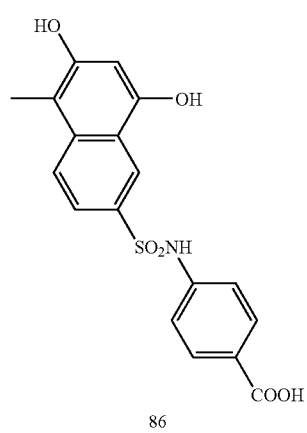
86
TABLE 5-7-continued
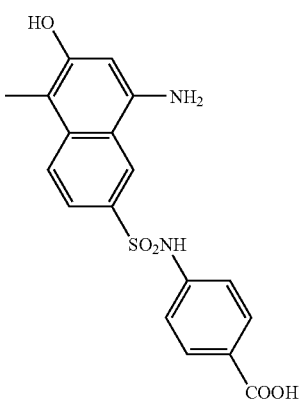
87
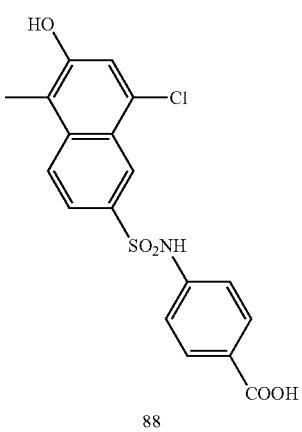
88
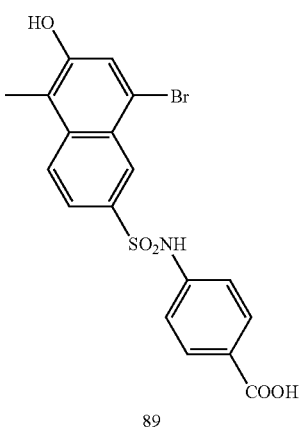
89

TABLE 5-7-continued
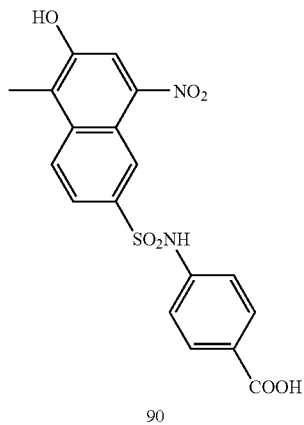
90
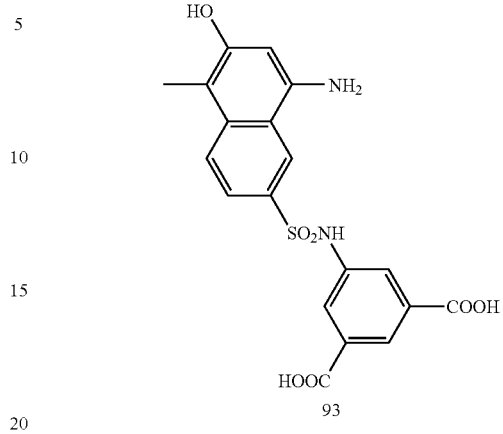
93
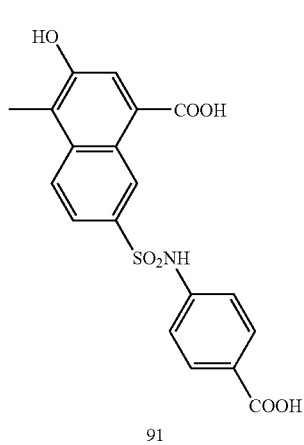
91
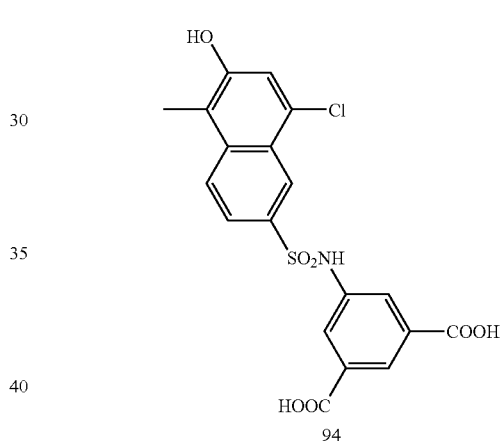
94
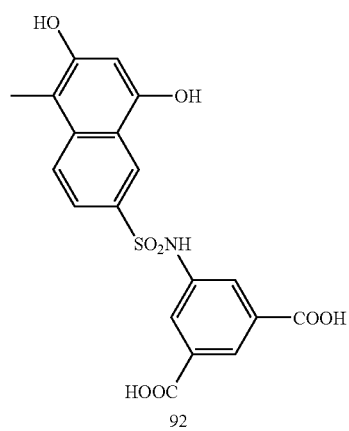
92
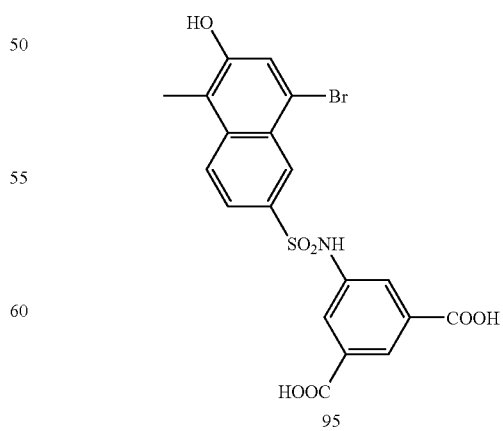
95

TABLE 5-7-continued
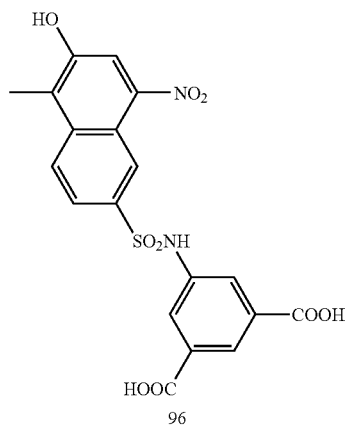
96
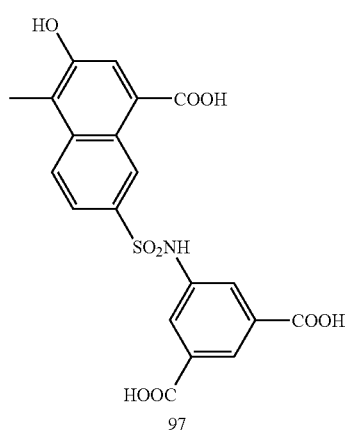
97
TABLE 5-8
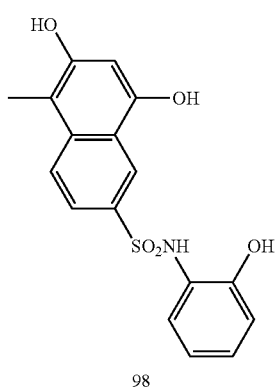
98
TABLE 5-8-continued
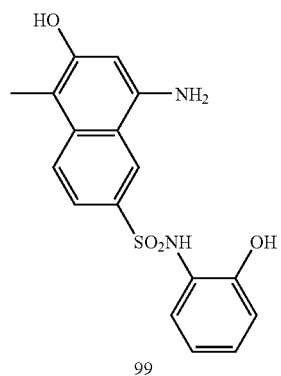
99
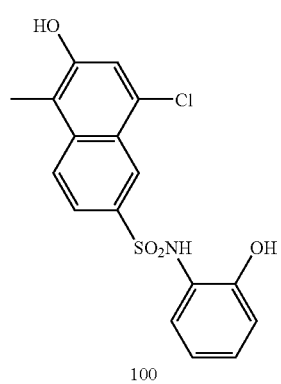
100
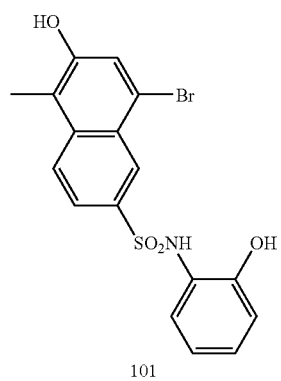
101
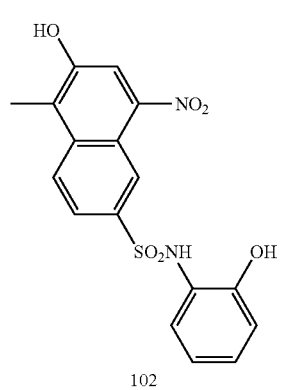
102

TABLE 5-8-continued
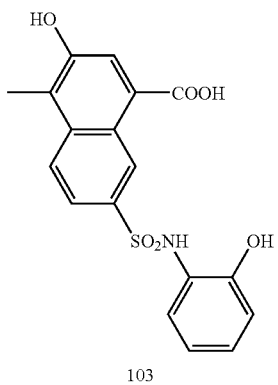
103
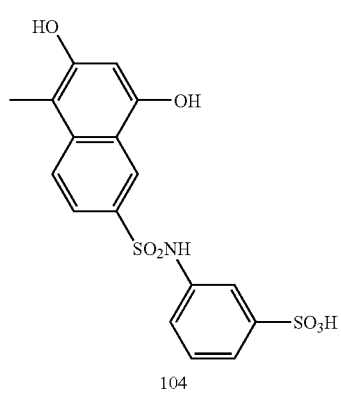
104
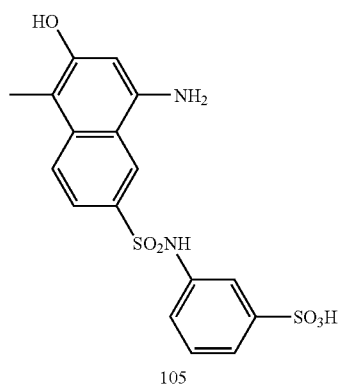
105
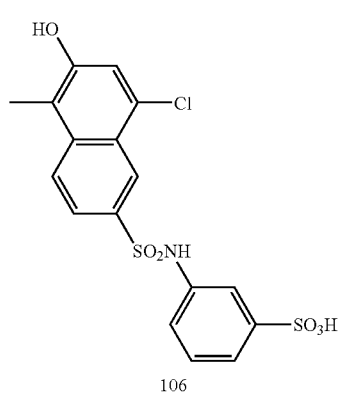
106
TABLE 5-8-continued
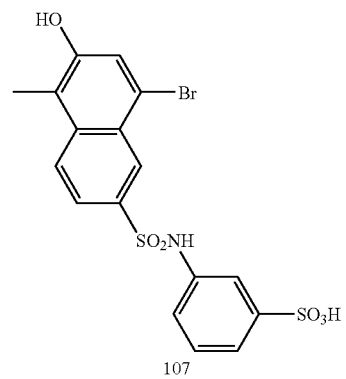
107
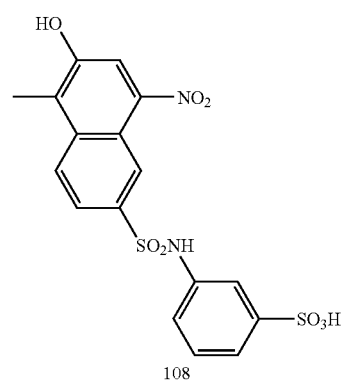
108
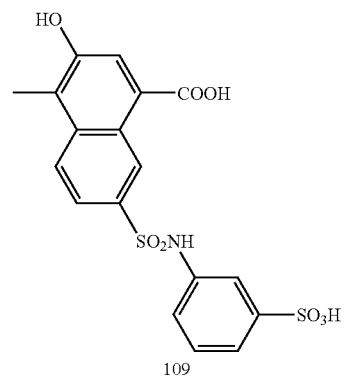
109
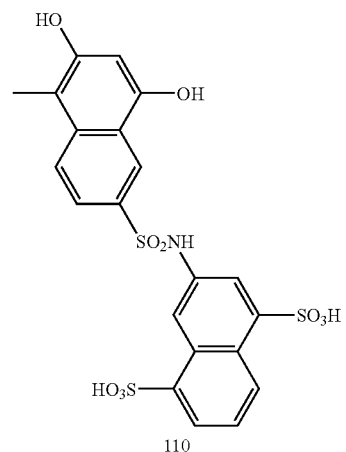
110

TABLE 5-8-continued
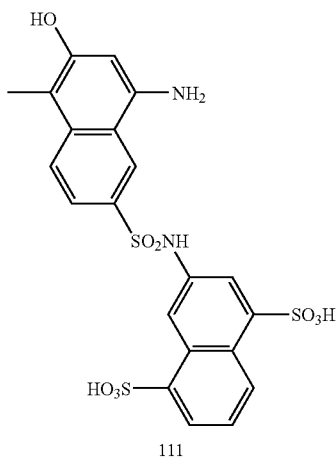
111
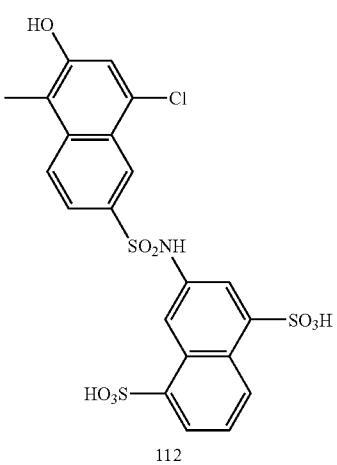
112
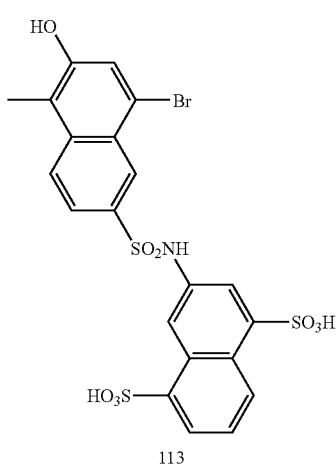
113
TABLE 5-8-continued
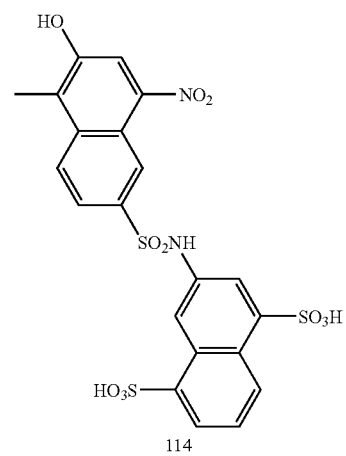
114
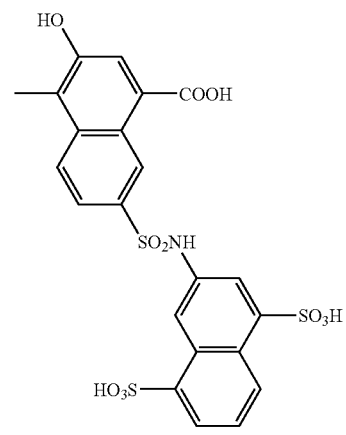
115
TABLE 5-9
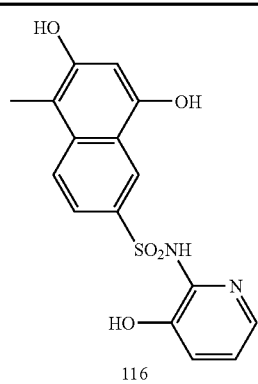
116

TABLE 5-9-continued
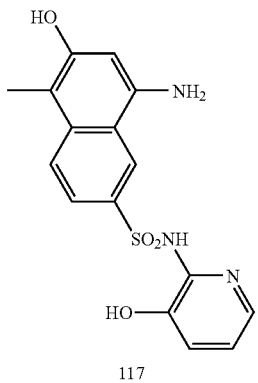
117
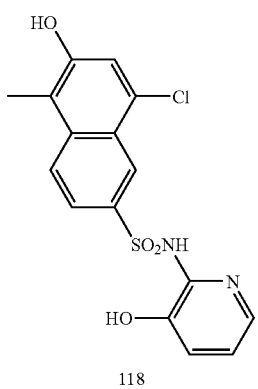
118
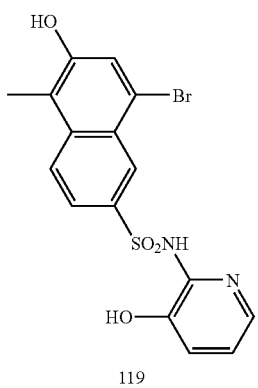
119
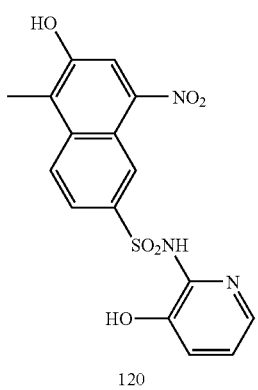
120
TABLE 5-9-continued
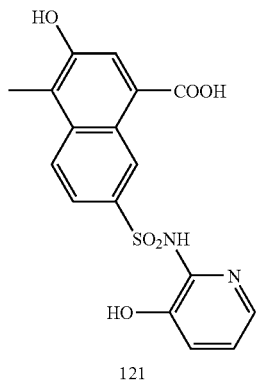
121
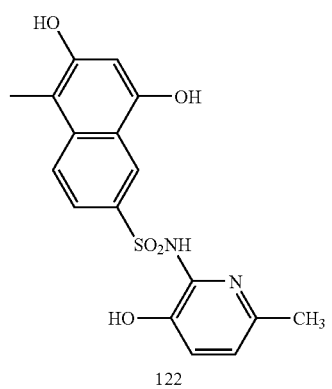
122
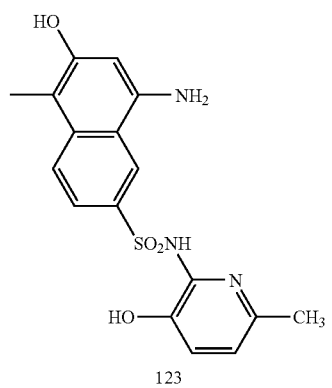
123
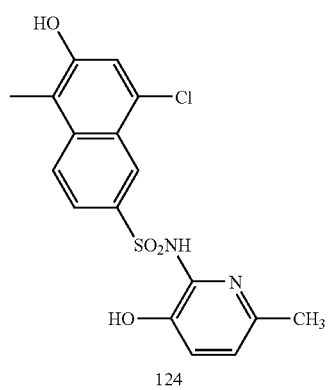
124

TABLE 5-9-continued
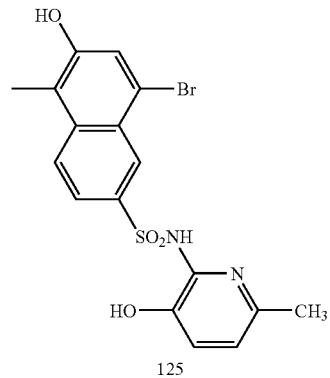
125
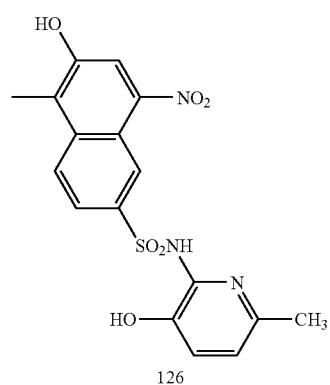
126
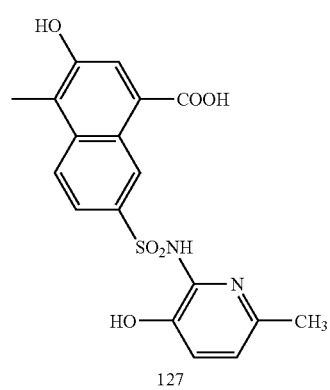
127
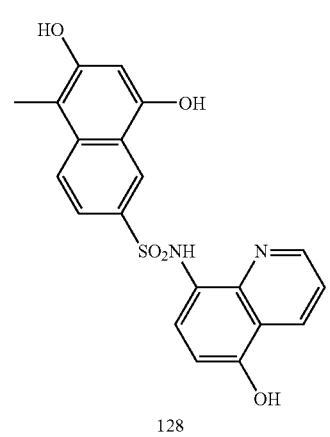
128
TABLE 5-9-continued
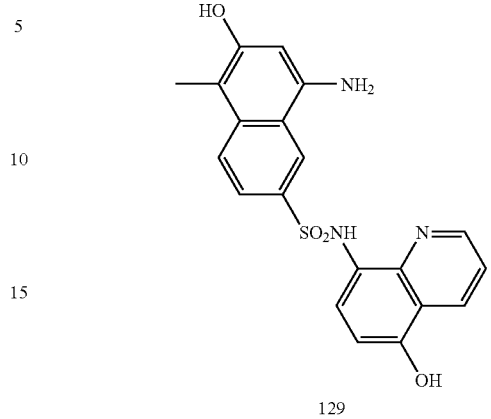
129
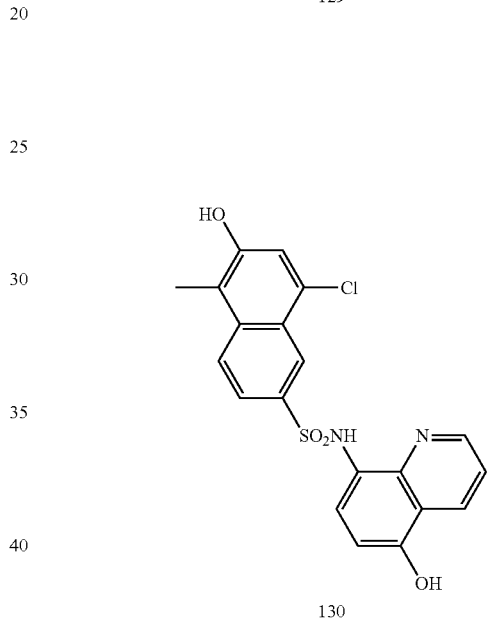
130
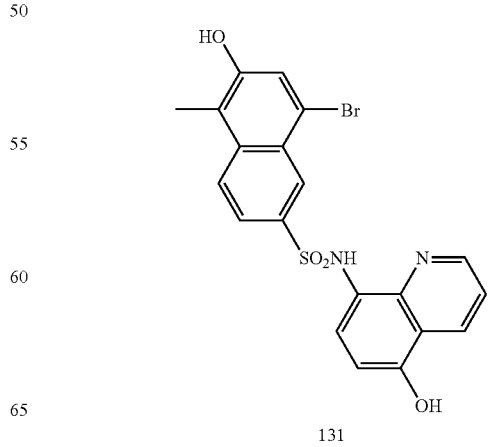
131

TABLE 5-9-continued
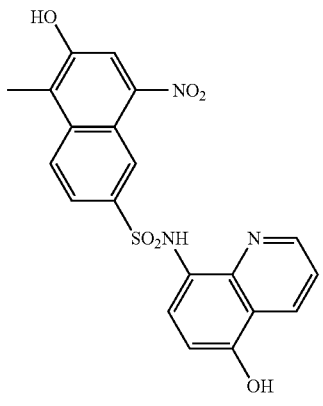
132
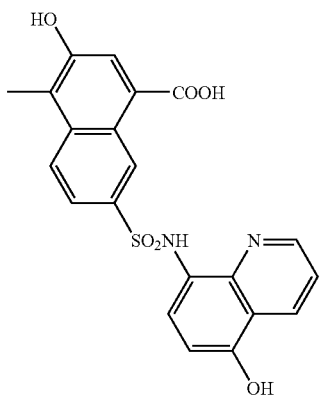
133
TABLE 5-10
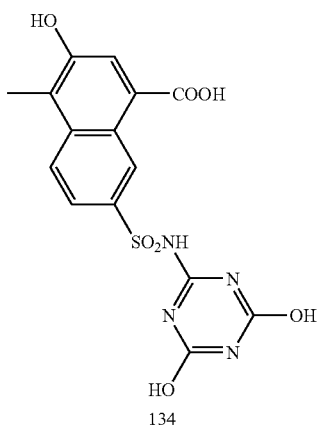
134
TABLE 5-10-continued
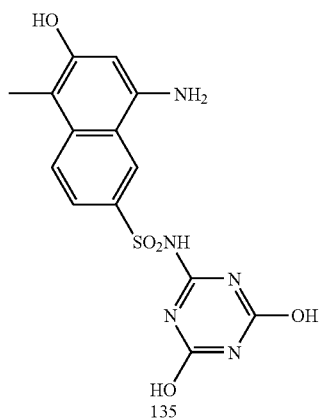
135
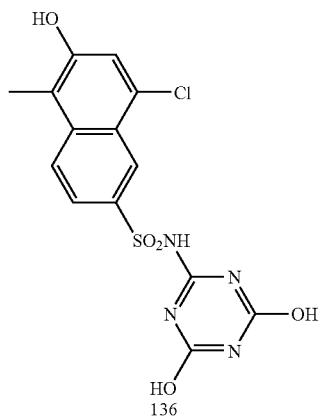
136
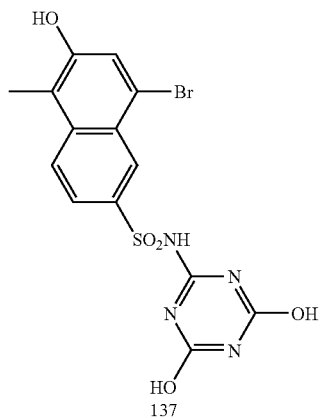
137
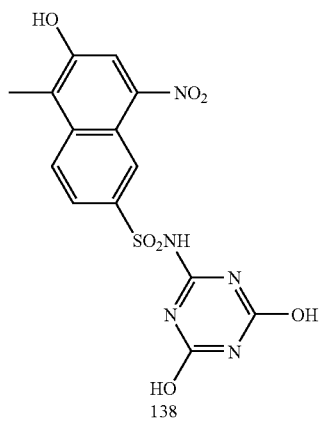
138

TABLE 5-10-continued

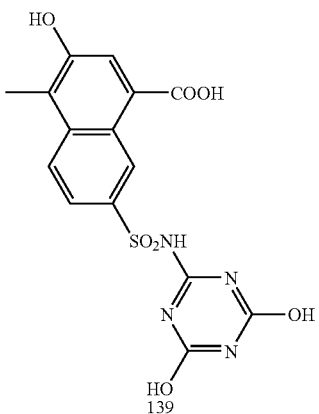

139

In the formula (104), $X^{104}$ represents a hydrogen atom, a halogen atom, a nitro group, a carboxyl group, a sulfo group, a $C_{1-4}$ alkyl group, a $C_{1-4}$ alkoxy group, a $C_{1-4}$ alkylsulfonylamino group, a $C_{6-10}$ arylsulfonylamino group, a $C_{2-7}$ acylamino group, a substituted or unsubstituted triazinylamino group, or a substituted or unsubstituted sulfamoyl group, and $X^{104'}$ represents a hydrogen atom or a sulfo group. $Q^{104}$ represents a phenyl group or a naphthyl group which has a hydroxyl group and which may have, as a further substituent, a substituent selected from the group consisting of a $C_{1-4}$ alkoxy group, a $C_{2-7}$ acylamino group, a hydroxyl group, a substituted or unsubstituted triazinylamino group and a substituted or unsubstituted carbamoyl group, wherein the hydroxyl group is one bonded to a ring-constituting atom adjacent to the carbon atom bonded to the azo group. $n^{104}$ represents 0, 1, 2 or 3.

In the formula (105), $Z^{105}$ represents a benzene ring or a naphthalene ring, which has at least a sulfo group as a substituent, and $Y^{105}$ represents a sulfo group or a substituted amino group. The substituents on the benzene ring and the naphthalene ring may be a halogen atom, a nitro group, a carboxyl group or an acylamino group. The substituent on the substituted amino group may, for example, be an acyl group, a 3,5-diaminotriazinyl group, an alkoxysulfonyl group or an aryloxysulfonyl group. $n^{105}$ is an integer of from 0 to 2.

Further, the metal atom to be used for the above chelate dye, may, for example, be silver(I), aluminum(III), gold(III), cerium(III,IV), cobalt(II,III), chromium(III), copper(I,II), europium(III), iron(II,III), gallium(III), germanium(IV), indium(III), lanthanum(III), manganese(II), nickel(II), palladium(II), platinum(II,IV), rhodium(II,III), ruthenium(II, III,IV), scandium(III), silicon(IV), samarium(III), titanium (IV), uranium(IV), zinc(II) or zirconium(IV). Among them, preferred is nickel(II), cobalt(II,III) or copper(II), more preferred is nickel(II) or copper(II), and most preferred is. nickel(II).

Preferred specific examples of the above water-soluble metal chelate azo compound may be those disclosed in JP-A-2000-160079 (corresponding U.S. Pat. No. 6,001,161), JP-A-2000-265099, JP-A-2002-080765 (corresponding English publication: EP1241232A) and JP-A-2003-096323 (corresponding English publication: EP1270676A) as well as those presented in the following Table 6. Here, the numbers disclosed in the columns for the diazo component and $Ar^{103}$ in the following Table 6 corresponds, respectively, to the numbers of specific examples for the hetero ring containing $X^{103}$ disclosed in Table 4 and $Ar^{103}$ disclosed in Table 5. In the following Table, those identified by numbers 1 to 14 are particularly preferred.

TABLE 6

| Compound No. | Diazo component | Ar1 | Metal | Metal:Azo dye |
|---|---|---|---|---|
| 1 | 4 | 1 | Ni | 1:2 |
| 2 | 5 | 2 | Ni | 1:2 |
| 3 | 12 | 6 | Ni | 1:2 |
| 4 | 21 | 7 | Ni | 1:2 |
| 5 | 49 | 8 | Ni | 1:2 |
| 6 | 51 | 27 | Ni | 1:2 |
| 7 | 54 | 28 | Ni | 1:2 |
| 8 | 64 | 32 | Ni | 1:1 |
| 9 | 66 | 33 | Ni | 1:2 |
| 10 | 67 | 34 | Ni | 1:1 |
| 11 | 77 | 40 | Ni | 1:2 |
| 12 | 78 | 42 | Cu | 1:1 |
| 13 | 91 | 48 | Ni | 1:1.5 |
| 14 | 93 | 49 | Cu | 1:1 |
| 15 | 4 | 1 | Ni | 1:2 |
| 16 | 6 | 3 | Ni | 1:2 |
| 17 | 7 | 5 | Cu | 1:1 |
| 18 | 22 | 10 | Co | 1:2 |
| 19 | 27 | 11 | Fe | 1:1 |
| 20 | 30 | 13 | Zn | 1:1 |
| 21 | 38 | 21 | Ni | 1:1 |
| 22 | 42 | 31 | Cu | 1:1 |
| 23 | 44 | 53 | Co | 1:2 |
| 24 | 56 | 74 | Ni | 1:2 |
| 25 | 59 | 85 | Cu | 1:2 |
| 26 | 79 | 88 | Co | 1:2 |
| 27 | 80 | 103 | Ni | 1:2 |
| 28 | 83 | 119 | Cu | 1:1 |
| 29 | 84 | 127 | Co | 1:2 |
| 30 | 89 | 132 | Ni | 1:2 |
| 31 | 94 | 138 | Cu | 1:1 |
| 32 | 4 | 2 | Ni | 1:2 |
| 33 | 4 | 6 | Ni | 1:2 |
| 34 | 4 | 7 | Ni | 1:2 |
| 35 | 4 | 8 | Ni | 1:2 |
| 36 | 4 | 27 | Ni | 1:2 |
| 37 | 4 | 28 | Ni | 1:2 |
| 38 | 4 | 32 | Ni | 1:2 |
| 39 | 4 | 33 | Ni | 1:2 |
| 40 | 4 | 34 | Ni | 1:2 |
| 41 | 4 | 40 | Ni | 1:2 |
| 42 | 4 | 42 | Ni | 1:2 |
| 43 | 4 | 48 | Ni | 1:2 |
| 44 | 4 | 49 | Ni | 1:2 |

Further, in the case of forming a color image, for the magenta ink, two types of inks such as a dark ink and a pale ink may sometimes be used in combination.

Cyan Ink

As the above cyan ink, one optionally containing a known cyan dye in an aqueous medium may be mentioned. Preferably, a pigment such as C.I. Pigment Blue 15, 15:1, 15:2, 15:3, 15:4, 15:6, 16, 27, 29, 61 or 62, or Pigment Green 7, 17, 18 or 36, or a dye represented by the following formula (201) or (202) is preferably employed. As the dye represented by the following formula (201) or (202), one having a molecular weight of at most 5000, is usually preferred, and among them, one having a molecular weight of at least 300 and at most 3000, is particularly preferred when the solubility, the storage stability, the printing density, etc. are totally taken into consideration. Particularly, from the viewpoint of the fastness against light, a phthalocyanine dye represented by the formula (201) is preferred, and from the viewpoint of the color and the saturation, a triphenylmethane dye represented by the formula (202) is preferably employed.

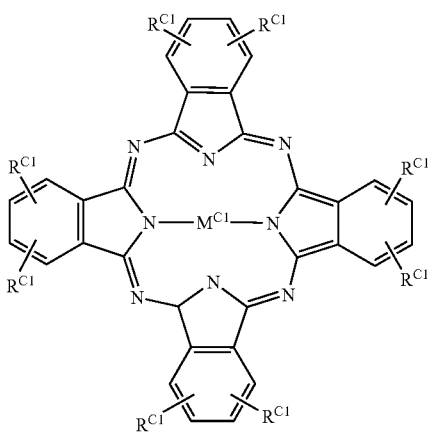

(Wherein $R^{C1}$ represents a hydrogen atom or an optional substituent, and the plurality of Rc1 may be the same or different, and $M^{c1}$ represents a metal atom.)

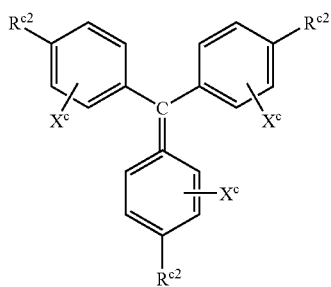

(Wherein $R^{C2}$ represents a hydrogen atom or an optional substituent, and the plurality of $R^{C2}$ may be the same or different, and Xc represents a hydrogen atom, a sulfo group, a carboxyl group, a phosphono group, an amino group or an alkyl group which may be substituted.)

In each of the formulae (201) and (202), the optional substituent for $R^{C1}$ and $R^{C2}$ may, for example, be a halogen atom, a carboxyl group, a sulfo group, a phosphono group, a sulfamoyl group which may be substituted, a $C_{1-4}$ alkyl group which may be substituted, a $C_{1-4}$ alkoxy group which may be substituted, a phenyl group which may be substituted, an amino group which may be substituted, an alkylsulfonyl group which may be substituted, an arylsulfonyl group which may be substituted, a sulfonate group, an acyl group, a carboxylate group or a triazinyl group which may be substituted.

Among them, as $R^{C1}$ in the formula (201), a hydrogen atom; a halogen atom; a sulfo group; an alkyl group which may be substituted; or a sulfamoyl group which may be substituted by a substituent selected from the group consisting of an alkyl group which may be substituted and an aryl group which may be substituted (wherein the substituents on the alkyl group and the aryl group may preferably be a hydroxyl group, a sulfo group, a carboxyl group, an alkylsulfonyl group or a triazinylamino group) may preferably be employed.

As the metal atom for $M^{c1}$, nickel or copper is preferred, and copper is particularly preferred.

Further, as $R^{C2}$ in the formula (202), a hydrogen atom, a sulfo group or an amino group which may be substituted by an alkyl group (wherein the alkyl group may be substituted by a sulfoaryl group) may be preferably employed.

As $X^c$, a hydrogen atom, a sulfo group, an amino group or a $C_{1-4}$ alkyl group is preferred.

Preferred specific examples of such a cyan dye may, for example, be C.I. Acid Blue 9, C.I. Direct Blue 86, C.I. Direct Blue 199, C.I. Reactive Blue 5, 7, 11, 14, 15:01, 18, 21, 23, 25, 35, 38, 41, 48, 63, 71, 72, 77, 80, 85, 92, 95, 105, 107, 118:1, 123, 124, 136, 138, 140, 143, 148, 152, 153, 159, 174, 197, 207, 215, 227, 229 and 231, or their hydrolyzates, or compounds of the formula (201) wherein $R^{C1}$ is groups represented by the following $R^{C1}$-1 to $R^{C1}$-10, or compounds of the formula (202) wherein each of $R^{C2}$ and $X^c$ are groups represented by the following $R^{C2}$-1 to $R^{C2}$-7 and $X^c$-1 to $X^c$-5, respectively. However, the present invention is by no means restricted thereto.

Examples of $R^{c1}$ $R^{c1}$-1   $R^{c1}$-2   $R^{c1}$-3
—SO$_3$H   —SO$_2$NH$_2$   —SO$_2$NHC$_2$H$_4$OH $R^{c1}$-4
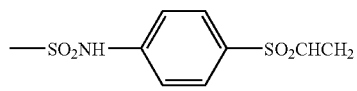

$R^{c1}$-5
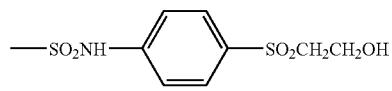

$R^{c1}$-6
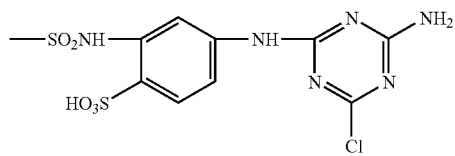

$R^{c1}$-7
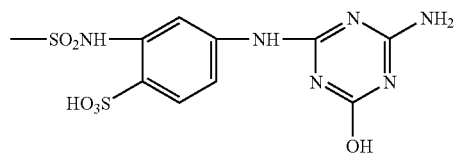

-continued

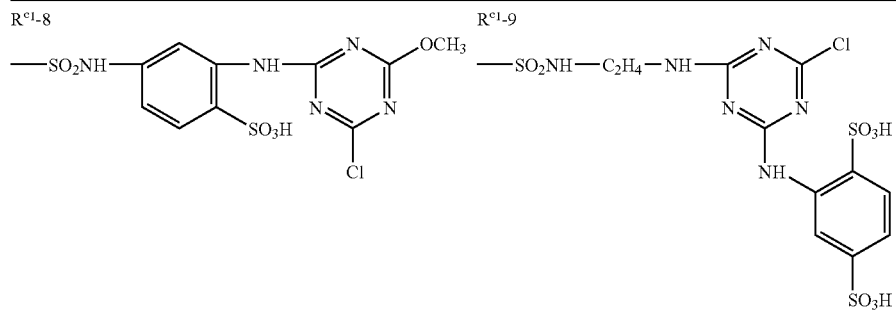

R$^{c1}$-10
H (Hydrogen atom)

Examples of R$^{c2}$

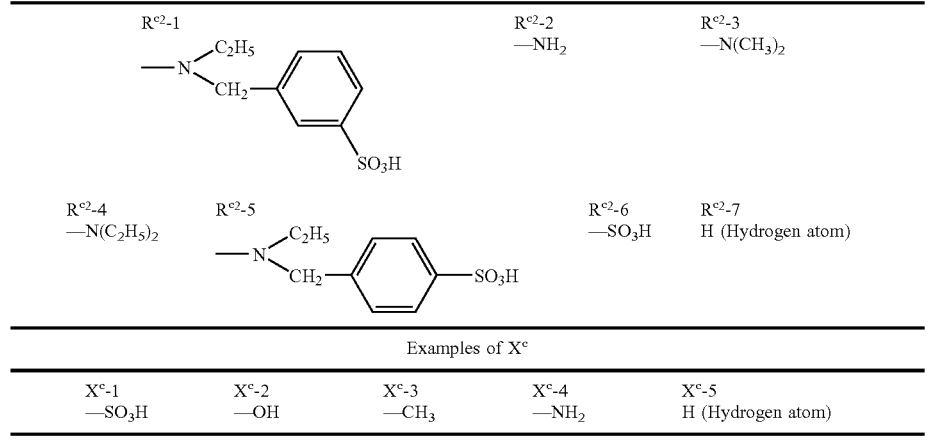

| Examples of X$^c$ | | | | |
|---|---|---|---|---|
| X$^c$-1 | X$^c$-2 | X$^c$-3 | X$^c$-4 | X$^c$-5 |
| —SO$_3$H | —OH | —CH$_3$ | —NH$_2$ | H (Hydrogen atom) |

Further, at the time of forming a color image, for the cyan ink, two types of inks such as a dark ink and a pale ink may sometimes be used in combination.

Black Ink

The above black ink may be one which optionally contains in an aqueous medium a pigment such as C.I. Pigment Black 1, 7, 11 or 31, or a known pigment type colorant represented by carbon black, or a known dyestuff type colorant.

Among them, preferred carbon black may be a various types of carbon black, such as acetylene black, channel black or furnace black, which is commonly used for ink jet recording. More preferred is channel black or furnace black, and particularly preferred is furnace black.

The DBP oil absorption of the above carbon black is preferably at least 100 ml/100 g, more preferably at least 120 ml/100 g, particularly preferably at least 140 ml/100 g, from the viewpoint of the printing density. The volatile content is preferably at most 8 wt %, particularly preferably at most 4 wt %. The pH is usually from 1 to 14, but from the viewpoint of the storage stability of the recording fluid, it is preferably from 3 to 11, particularly preferably from 6 to 9. The BET specific surface area is usually at least 200 m$^2$/g, preferably from 250 to 600 m$^2$/g, particularly preferably from 250 to 500 m$^2$/g. Here, the DBP oil absorption is a value measured by JIS K6221A method, the volatile content is a value measured by the method according to JIS K6221, and the primary particle diameter is an arithmetic average diameter (number average) by an electron microscope.

As specific examples of the above carbon black, products presented in the following (1) to (4) may be mentioned.

(1) #2700B, #2650, #2650B, #2600, #2600B, 2450B, 2400B, #2350, #2300, #2300B, #2200B, #1000, #100GB, #990, #99GB, #980, #980B, #970, #960, #960B, #950, #950B, #900, #90GB, #850, #850B, MCF88, MCF88B, MA600, MA600B, #750B, #650B, #52, #52B, #50, #47, #47B, #45, #45B, #45L, #44, #44B, #40, #40B, #33, #33B, #32, #32B, #30, #30B, #25, #25B, #20, #20B, #10, #1GB, #5, #5B, CF9, CF9B, #95, #260, MA77, MA77B, MA7, MA7B, MA8, MA8B, MA11, MA11B, MA100, MA100B, MA100R, MA100RB, MA100S, MA230, MA220, MA200RB, MA14, #3030B, #3040B, #3050B, #3230B, #3350B (all manufactured by Mitsubishi Chemical Corporation)

(2) Monarch 1400, Black Pearls 1400, Monarch 1300, Black Pearls 1300, Monarch 1100, Black Pearls 1100, Monarch 1000, Black Pearls 1000, Monarch 900, Black Pearls 900, Monarch 880, Black Pearls 880, Monarch 800, Black Pearls 800, Monarch 700, Black Pearls 700, Black Pearls 2000, Vulcan XC72R, Vulcan XC72, Vulcan PA90, Vulcan 9A32, Mogul L, Black Pearls L, Regal 660R, Regal 660, Black Pearls 570, Black Pearls 520, Regal 400R, Regal 400, Regal 330R, Regal 330, Regal 300R, Black Pearls 490, Black Pearls 480, Black Pearls 470, Black Pearls 460, Black Pearls 450, Black Pearls 430, Black Pearls 420, Black Pearls 410, Regal 350R, Regal 350, Regal 250R, Regal 250, Regal 99R, Regal 99I, Elftex Pellets 115, Elftex 8, Elftex 5, Elftex 12, Monarch 280, Black Pearls 280, Black Pearls 170, Black Pearls 160, Black Pearls 130, Monarch 120, Black Pearls 120 (all manufactured by Cabot)

(3) Color Black FW1, Color Black FW2, Color Black FW2V, Color Black FW18, Color Black FW200, Special Black 4, Special Black 4A, Special Black 5, Special Black 6, Color Black S160, Color Black S170, Printex U, Printex V, Printex 150T, Printex 140U, Printex 140V, Printex 95, Printex 90, Printex 85, Printex 80, Printex 75, Printex 55, Printex 45, Printex 40, Printex P, Printex 60, Printex XE, Printex L6, Printex L, Printex 300, Printex 30, Printex 3, Printex 35, Printex 25, Printex 200, Printex A, Printex G, Special Black 550, Special Black 350, Special Black 250, Special Black 100 (all manufactured by Degussa)

(4) Raven 7000, Raven 5750, Raven 5250, Raven 5000 ULTRA, Raven 3500, Raven 2000, Raven 1500, Raven 1255, Raven 1250, Raven 1200, Raven 1170, Raven 1060 ULTRA, Raven 1040, Raven 1035, Raven 1020, Raven 1000, Raven 890H, Raven 890, Raven 850, Raven 790 ULTRA, Raven 760 ULTRA, Raven 520, Raven 500, Raven 450, Raven 430, Raven 420, Raven 410, CONDUCTEX 975 ULTRA, CONDUCTEX SC ULTRA, Raven H20, Raven C ULTRA (all manufactured by Columbian)

Further, as the above dyestuff type colorant, water-soluble compounds represented by the formulae (301) and (302) may preferably be mentioned. The molecular weight thereof is preferably at most 4000. Among them, those having a molecular weight of at least 300 and at most 2000 are preferred when the solubility, the storage stability, the printing density, etc. are totally taken into consideration.

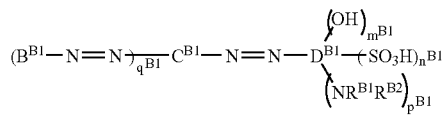

(301)

(Wherein each of $B^{B1}$, $C^{B1}$ and $D^{B1}$ which are independent of one another, represents an aromatic ring, and the aromatic ring may have an optional substituent, $m^{B1}$ represents an integer of from 0 to 1, $n^{B1}$ represents an integer of from 0 to 3, $p^{B1}$ represents an integer of from 0 to 2, and $q^{B1}$ represents an integer of from 0 to 4; in a case where a plurality of $B^{B1}$ are present, the respective $B^{B1}$ may be the same or different, and each of $R^{B1}$ and $R^{B2}$ which are independent of each other, is a hydrogen atom or an optional substituent.)

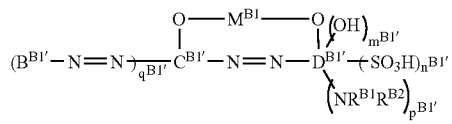

(302)

(Wherein each of $B^{B1'}$, $C^{B1'}$ and $D^{B1'}$ which are independent of one another, represents an aromatic ring, and the aromatic ring may have an optional substituent, $m^{B1'}$ represents an integer of from 0 to 1, $n^{B1'}$ represents an integer of from 0 to 3, $p^{B1'}$ represents an integer of from 0 to 2, and $q^{B1'}$ represents an integer of from 0 to 4; in a case where a plurality of $B^{B1'}$ are present, the respective $B^{B1'}$ may be the same or different; each of $R^{B1}$ and $R^{B2}$ which are independent of each other, is a hydrogen atom or an optional substituent; $M^{B1}$ represents a metal atom, provided that $M^{B1}$ may take at least three coordination, and in such a case, $M^{B1}$ may optionally be coordinated from an optional substituent or connecting moiety in the formula (302), or by an optional ligand at a specific ratio of counter ligand metal which such $M^{B1}$ has; or the metal ion may further be coordinated in the form of —O—$M^{B1}$—O— to the adjacent $B^{B1'}$ sandwiching the azo group in a case where a plurality of $B^{B1'}$ are present, or to $B^{B1'}$ and $C^{B1'}$.)

In each of the formulae (301) and (302), the optional substituent for $R^{B1}$ and $R^{B2}$ may, for example, be a hydrogen atom, a sulfamoyl group which may be substituted, an alkylsulfonyl group which may be substituted, an arylsulfonyl group which may be substituted, a sulfonate group, an acyl group and a carboxylate group, a triazinyl group which may be substituted, a $C_{1-4}$ alkyl group which may be substituted, a $C_{1-4}$ alkoxy group which may be substituted, or a phenyl group which may be substituted.

Among them, in the formula (301), $m^{B1}$ is particularly preferably 1, $n^{B1}$ is particularly preferably 1 or 2, $p^{B1}$ is particularly preferably 1, and each of $R^{B1}$ and $R^{B2}$ which are independent of each other, is particularly preferably a hydrogen atom, a phenyl group which may be substituted, or a $C_{1-4}$ alkyl group which may be substituted. $q^{B1}$ is preferably from 0 to 2. Particularly when $q^{B1}$ is 0, the aromatic ring represented by $D^{B1}$ is preferably one further substituted by an aromatic ring-substituted azo group, and particularly when $q^{B1}$ is 1, the aromatic ring represented by $B^{B1}$ is preferably a phenyl group or a naphthyl group, which is substituted by a sulfo group, a carboxyl group or a phosphono group. The aromatic ring represented by $C^{B1}$ is more preferably a phenylene group or a naphthylene group, which is substituted by e.g. a sulfo group, a carboxyl group, a $C_{1-4}$ alkyl group which may be substituted, a $C_{1-4}$ alkoxy group which may be substituted, an acetamino group or a substituted alkylsulfonyl group. When $q^{B1}$ is at least 2, among the plurality of $B^{B1}$ in the formula (301), $B^{B1}$ at the left terminal is preferably a phenyl group or a naphthyl group, which is substituted by a sulfo group, a carboxyl group or a phosphono group, and other $B^{B1}$ and $C^{B1}$ are more preferably a phenylene group or a naphthylene group, which is substituted by e.g. a sulfo group, a carboxyl group, a $C_{1-4}$ alkyl group which may be substituted, a $C_{1-4}$ alkoxy group which may be substituted, an acetamino group or a substituted alkylsulfonyl group.

In the formula (302), $m^{B1'}$ is particularly preferably 0, $n^{B1'}$ is particularly preferably 1 or 2, $p^{B1'}$ is particularly preferably 1, and each of $R^{B1}$ and $R^{B2}$ which are independent of each other, is particularly preferably a hydrogen atom, a phenyl group which may be substituted, or a $C_{-14}$ alkyl group which may be substituted. $q^{B1'}$ is more preferably from 0 to 2. When $q^{B1}$ is 0 or 1, particularly when $q^{B1}$ is 0, the aromatic ring represented by $D^{B1'}$ is preferably one further substituted by an aromatic ring-substituted azo group. When $q^{B1'}$ is 1, the aromatic ring represented by $B^{B1'}$ is preferably a phenyl group or a naphthyl group, which is substituted by a substituent selected from the group consisting of a sulfo group, a carboxyl group and a phosphono group, and the aromatic ring represented by $C^{B1'}$ is more preferably a phenylene group or a naphthylene group, which is substituted by e.g. a sulfo group, a carboxyl group, a $C_{1-4}$ alkyl group which may be substituted, a $C_{1-4}$ alkoxy group which may be substituted, an acetamino group or a substituted alkylsulfonyl group. When $q^{B1'}$ is at least 2, among the plurality of B' in the formula (302), $B^{B1'}$ at the left terminal is preferably a phenyl group or a naphthyl group, which is substituted by a substituent selected from the group consisting of a sulfo group, a carboxyl group and a phosphono group, and other $B^{B1'}$ and $C^{B1'}$ are more preferably a phenylene group or a naphthylene group, which is substituted by e.g. a sulfo group, a carboxyl group, a $C_{1-4}$ alkyl group which may be substituted, a $C_{1-4}$ alkoxy group which may be substituted, an acetamino group or a substituted alkylsulfonyl group.

Specific examples of such a dye may, for example, be C.I. Food Black 2, C.I. Direct Black 19, C.I. Direct Black 154, C.I. Direct Black 195, C.I. Direct Black 200 and Reactive Black 31, or their hydrolyzates, or dyes represented by the following formulae (301') and (302'). However, the present invention is by no means restricted thereto.

The following formula (301') and (302') are presented for the sake of convenience to explain preferred structures among black dyes represented by the above formulae (301) and (302).

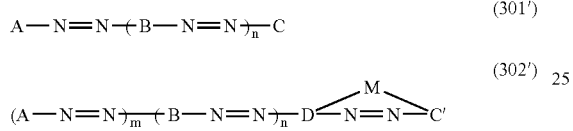

In the above formula (301'), n is 1 or 2, and when n is 2, B may be the same or different. Further, in the above formula (302'), m is preferably 0 or 1, and n is from 0 to 2, and when n is 2, B may be the same or different.

Preferred specific examples for A, B, C, C' and D in the above formulae (301') and (302') will be presented in the following Tables 11 and 12.

TABLE 11

Examples of A

A-1

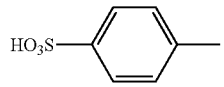

A-2

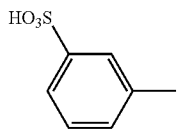

A-3

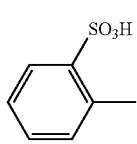

TABLE 11-continued

Examples of A

A-4

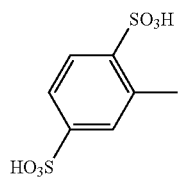

A-5

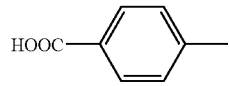

A-6

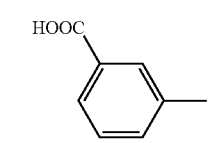

A-7

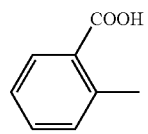

A-8

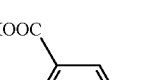

A-9

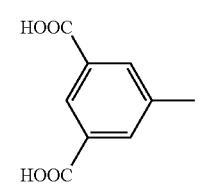

A-10

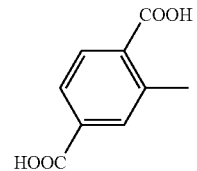

A-11

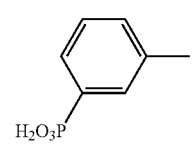

TABLE 11-continued
Examples of A
A-12
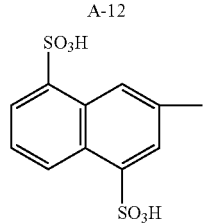
B-1
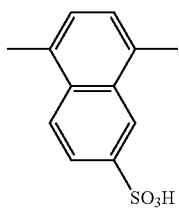
B-2
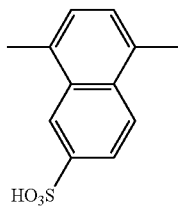
B-3
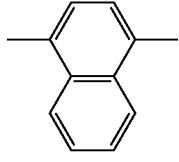
B-4
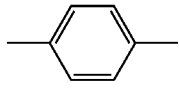
B-5
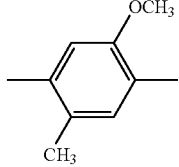
B-6
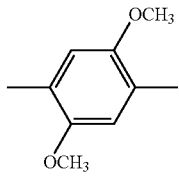
TABLE 11-continued
Examples of A
B-7
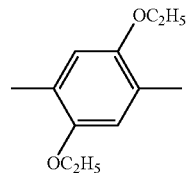
B-8
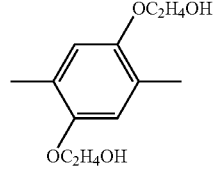
B-9
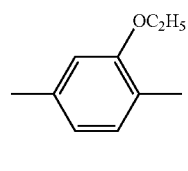
B-10
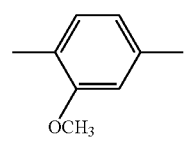
C-1
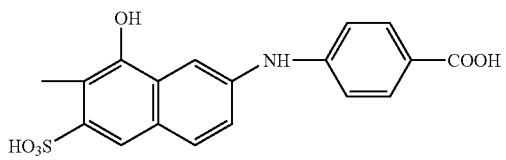
C-2
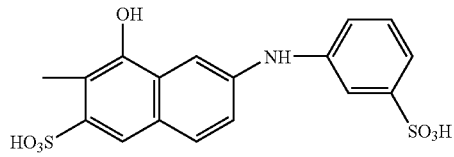
C-3
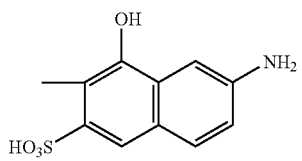

TABLE 11-continued
Examples of A
C-4
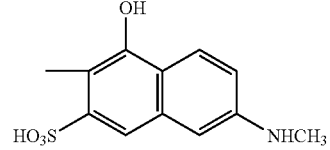
C-5
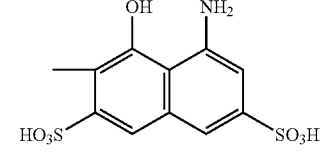
C-6
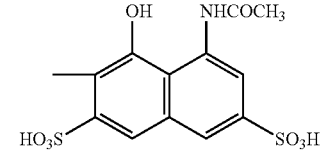
C-7
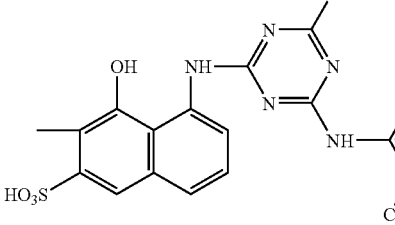
TABLE 11-continued
Examples of A
C-8
C-9
C-10
C-11
TABLE 12
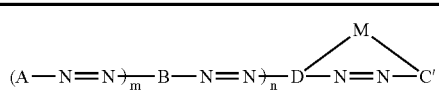
Example of A
A-1
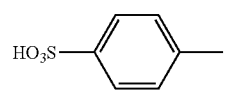
A-2
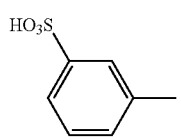

TABLE 12-continued
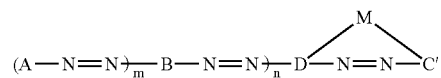
A-3
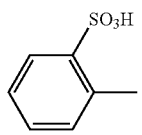
A-4
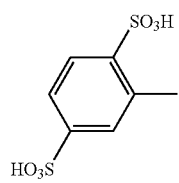
A-5
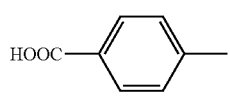
A-6
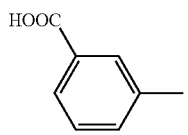
A-7
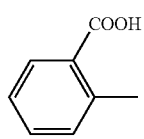
A-8
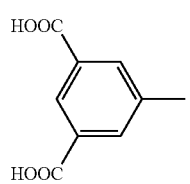
A-9
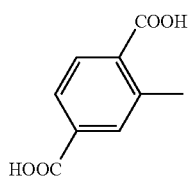

TABLE 12-continued
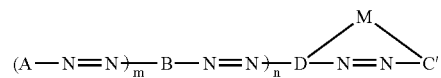
A-10
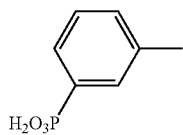
A-11
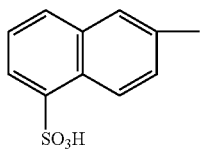
A-12
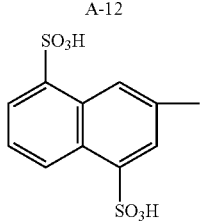
Example B
B-1
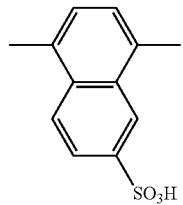
B-2
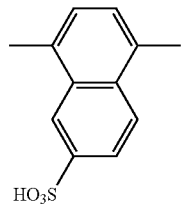
B-3
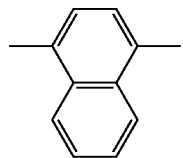

TABLE 12-continued
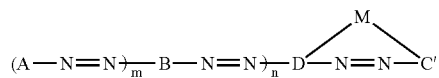
B-4
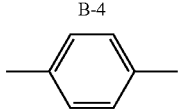
B-5
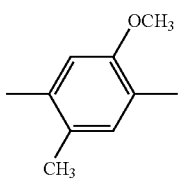
B-6
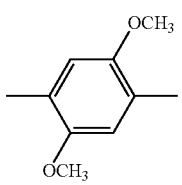
B-7
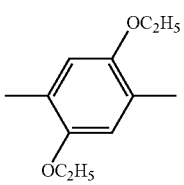
B-8
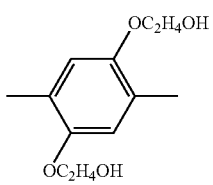
B-9
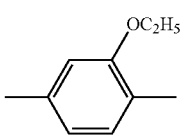
B-10
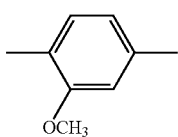

TABLE 12-continued
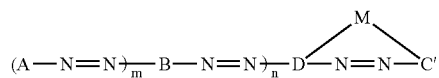
Example D
D-1
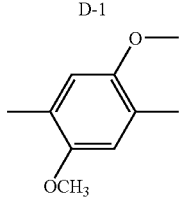
D-2
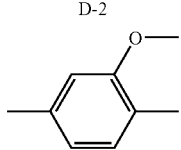
D-3
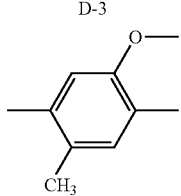
D-4
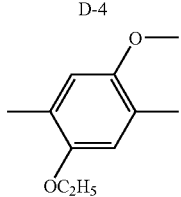
D-5
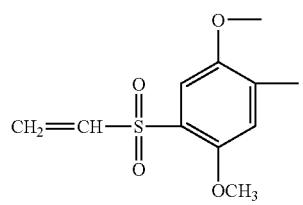
Example of C'
C'-1
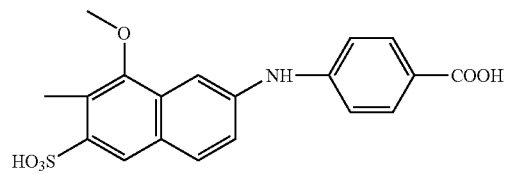

TABLE 12-continued
$$(A\!-\!N\!\!=\!\!N)_m\!\!-\!\!B\!-\!N\!\!=\!\!N)_n\!\!-\!\!D\overset{M}{\underset{N\!=\!N}{\diagup\diagdown}}C'$$
C'-2
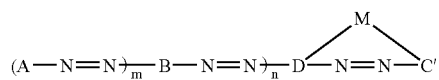
C'-3
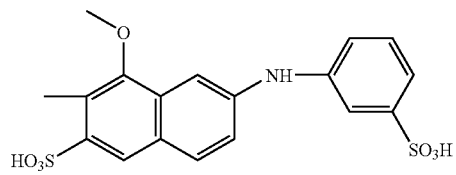
C'-4
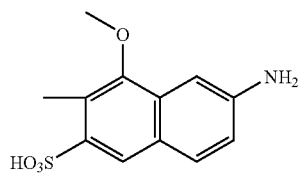
C'-5
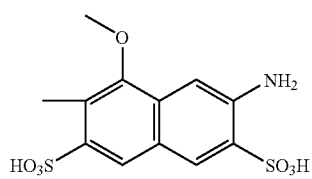
C'-6
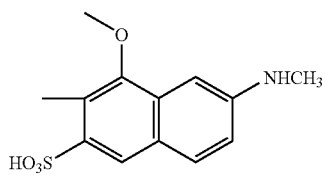
C'-7
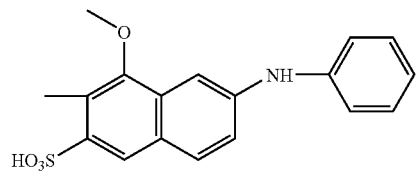
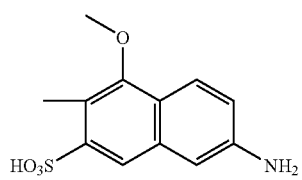

TABLE 12-continued
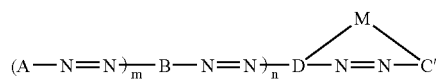
C'- 8
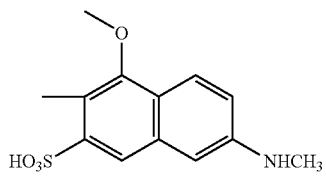
C'- 9
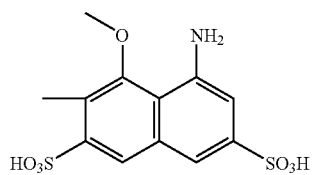
C'- 10
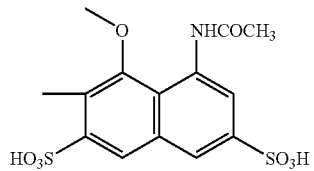
C'- 11
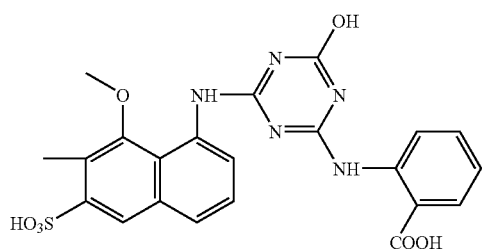
C'- 12
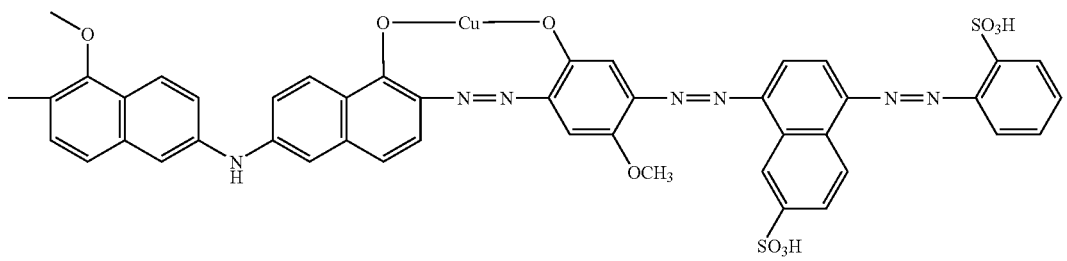

TABLE 12-continued
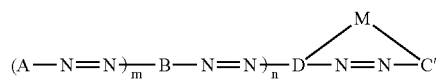
C'-13
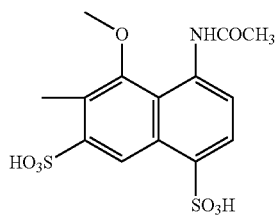
C'-14
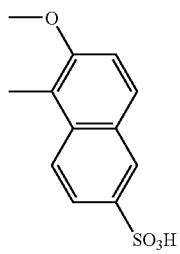
C'-15
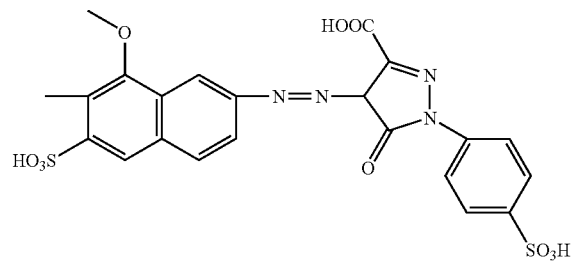
In Table 13, black dyes which may particularly preferably be used for the dye set of the present invention, will be specifically exemplified. Here, M' in the Table is a metal atom selected from the group consisting of Na, Li, K and $NH_4$.
TABLE 13
13-1
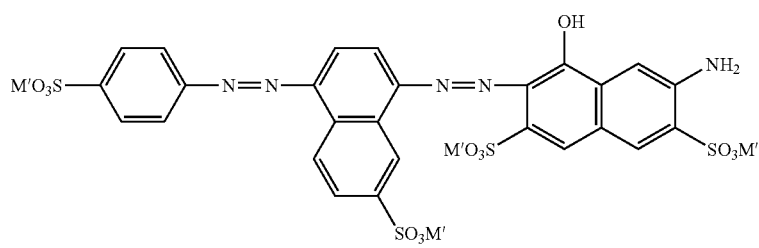

TABLE 13-continued

Each of the above-described magenta dye, cyan dye and black dye may be optionally produced by using a known method or in accordance therewith.

Further, in a case where the above-described magenta dye, cyan dye and black dye have an acid group such as a carboxyl group or a sulfonic group, such an acid group may optionally be in the form of a salt in the same manner as described in the above description of the recording fluid employing a water-soluble complex dye of the present invention, and the type of the salt may optionally be changed.

Further, preferred examples of the combination of magenta, cyan and black dyes, for the ink set of the present invention will be presented in Table 14.

TABLE 14

|  | Yellow | Magenta | Cyan | Black |
|---|---|---|---|---|
| Ink set 1 | (1) | MM-1 | C.I. Direct Blue-199 | Na salt of 13-4 |
| Ink set 2 | (9) | MM-2 | C.I. Direct Blue-199 | Na salt of 13-5 |
| Ink set 3 | (2) | MM-3 | C.I. Direct Blue-199 | Na salt of 13-6 |
| Ink set 4 | (10) | MM-4 | C.I. Direct Blue-199 | K salt of 13-4 |
| Ink set 5 | (11) | MM-5 | C.I. Direct Blue-199 | K salt of 13-5 |
| Ink set 6 | (12) | MM-6 | C.I. Direct Blue-199 | K salt of 13-6 |
| Ink set 7 | (13) | MM-7 | C.I. Direct Blue-199 | Li salt of 13-4 |
| Ink set 8 | (14) | MM-8 | C.I. Direct Blue-199 | Li salt of 13-5 |
| Ink set 9 | (15) | MM-9 | C.I. Direct Blue-86 | Li salt of 13-6 |
| Ink set 10 | (16) | MM-10 | C.I. Reactive Blue-14 | C.I. Pigment Black 1 |
| Ink set 11 | (17) | C.I. Pigment Red 122 | C.I. Pigment Blue-15:1 | Special Black 100 |
| Ink set 12 | (1) | 6-1 | C.I. Direct Blue-199 | NH$_4$ salt of 13-6 |
| Ink set 13 | (2) | C.I. Direct Violet 107 | C.I. Direct Blue-199 | NH$_4$ salt of 13-2 |
| Ink set 14 | (12) | MM-11 | C.I. Direct Blue-199 | Black Pearls 100 |

In the Table, C.I. is an abbreviation of color index. Further, the numbers presented in the column for "yellow" are the numbers of the respective compounds presented in the above Table 3-1. MM-1 to MM-10 in the column for "magenta" represent the respective compounds shown below, and MM-11 is one having the reactive group of C.I. Reactive Red 180 hydrolyzed to a stabilized form. Further, 6-1 is a compound shown by number 1 in the above Table 6. The numbers presented in the column for "black" correspond to the compound numbers presented in the above Table 13.

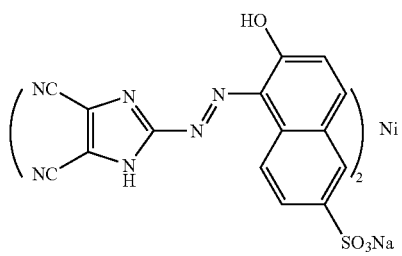

MM-1

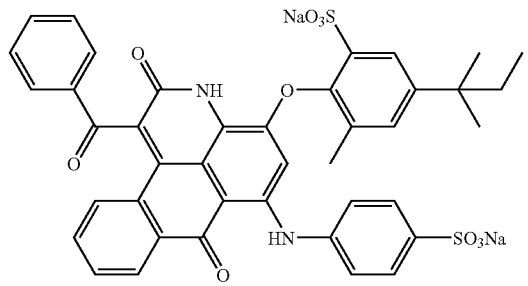

MM-2

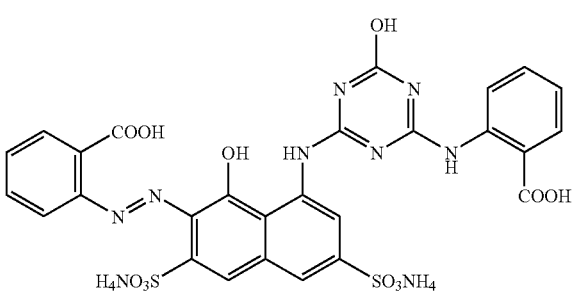

MM-3

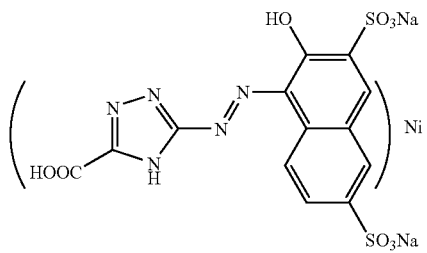

MM-4

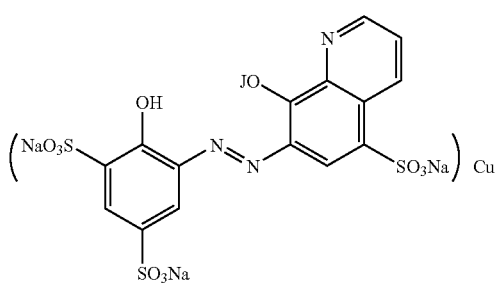

MM-5

-continued

MM-6
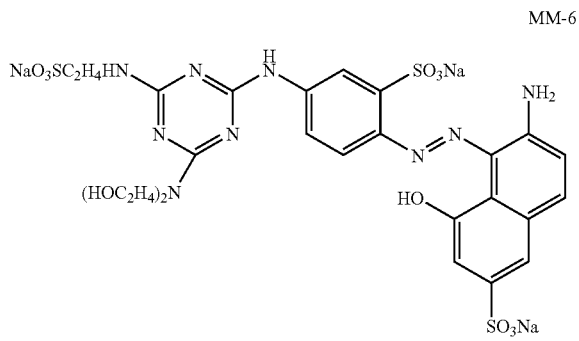

MM-7
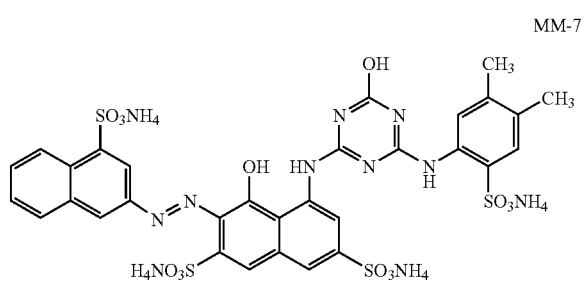

MM-8
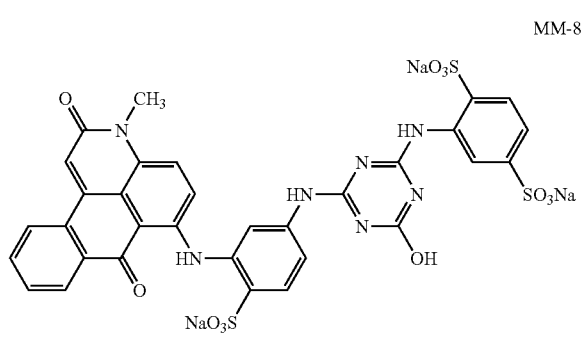

MM-9
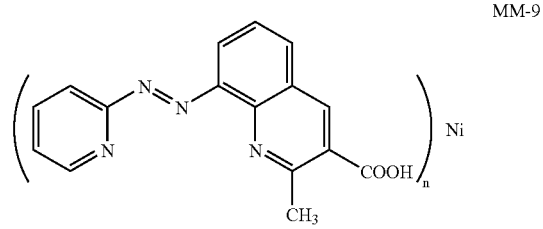

MM-10
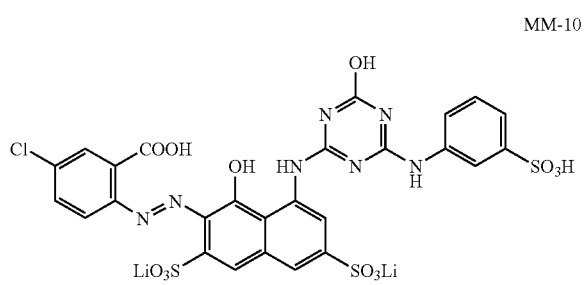

The above magenta dye, cyan dye and black dye may be incorporated in the prescribed concentrations in water containing a water-soluble organic solvent and optional additives, in the same manner as described in the above description of the recording fluid employing the water-soluble complex dye of the present invention.

Further, in a case where, with respect to the magenta and cyan inks, a dark ink and a pale ink are used in combination, the dye concentration in the dark ink is from 0.1 to 10 wt %, preferably from 0.5 to 7 wt %, particularly preferably from 2 to 5 wt %, in the total amount, based on the entire amount of the recording fluid, and the dye concentration in the pale ink is from 0.1 to 2 wt %, preferably from 0.1 to 1.5 wt %. Further, such an ink may optionally contain a plurality of dyes in addition to the above dyes.

By carrying out ink jet recording by means of the ink set obtained as described above, it is possible to obtain a color image excellent in the performance balance in light resistance, ozone resistance, etc.

EXAMPLES

Now, the present invention will be described in further detail with reference to specific Examples, but it should be understood that the present invention is by no means restricted by such specific Examples.

Preparation Example 1

Preparation of dye 3-1-(1)

a) Diazotization and Coupling

8 Parts by weight of 2-amino-4,5-dicyanoimidazole (reagent) was suspended in 150 parts by weight of water. After addition of 20 parts by weight of 35% hydrochloric acid (reagent), the suspension was cooled to 2° C., and 5 parts by weight of sodium nitrite (reagent) was added. Excessive sodium nitrite ions were decomposed by 0.5 wt % of sulfamic acid to obtain a diazo solution.

On the other hand, 10 parts by weight of 2,4-quinolinediol (reagent) was suspended in 240 parts by weight of water. After cooling to 2° C., the above-mentioned diazo solution was added while controlling the pH to be 7 with a 25% sodium hydroxide aqueous solution, to carry out a coupling reaction. The pH of the coupling solution was adjusted to 4 with 35% hydrochloric acid (reagent), and crystals were collected by filtration and then dried to obtain 10 parts by weight of an azo compound powder to be employed for the dye shown by (1) in Table 3-1.

b) Preparation of Complex 2 parts by weight of the above-mentioned ligand compound was suspended in 50 parts by weight of water, and 1 part by weight of nickel chloride hexahydrate (reagent) was added. The pH was adjusted to 9 with a 25% sodium hydroxide aqueous solution, and the solution was stirred for 1 hour at 55° C. and then left to cool. Then, 100 parts by weight of isopropanol was added. Crystals were collected by filtration and then dried to obtain 2 parts by weight of a dye chelate compound shown by (1) in the above Table 3-1.

Example 1

Preparation of Yellow Recording Fluid

Materials for the following composition were mixed, and the total amount was adjusted with water to 100 parts by weight, and the mixture was thoroughly mixed to dissolve the dye, press-filtered through a Teflon (registered trademark) filter having a pore diameter of 0.45 μm and the subjected to deaeration treatment by an ultrasonic cleaner, to prepare an ink the composition of the ink is shown in the following Table.

| Ink composition | |
|---|---|
| Component | Parts by weight |
| Dye (1) in Table 3-1 (Pre. Ex. 1) | 2 |
| OLFINE E1010 (surfactant) | 2 |
| Triethylene glycol monobuty ether | 11 |
| Diethylene glycol | 13 |
| Glycerol | 12 |
| Triethanolamine | 1 |
| Urea | 11 |
| Water | Balance |
| Total | 100 |

Using the ink prepared in Example 1, evaluation of the ink was carried out by the following evaluation method. The results are shown in Table 15 together with the structural formula of the dye (ligand) and the maximum absorption wavelength in water at a pH of 10. This dye was excellent in each of the saturation, light resistance and ozone resistance.

Evaluation Method

By means of an ink jet printer (tradename: BJ-F870, manufactured by Canon Inc.), using the ink thus prepared, ink jet solid printing was carried out on gloss paper exclusive for ink jet (tradename: PM photographic paper, manufactured by Seiko Epson Corporation), to obtain a printed product. With respect to this printed product, various evaluations were carried out by the following methods (1) to (3).

(1) Color of recorded image: Saturation (value C*) of the color of the obtained printed product was quantified by means of a color measuring apparatus Spectro Eye (manufactured by GretagMacbeth AG). Here, the value C* is an index of the saturation. With a clear yellow or magenta printed product on a paper exclusive for ink jet as used in this Example, it takes a numerical value of at least 80, in many cases. In this application, the target value was set to be at least 80.

(2) Light resistance of recorded image: Using a xenon weatherometer Ci4000 (manufactured by ATLAS SHIKENKI K.K.), the printed product was irradiated with xenon light for 80 hours. Thereafter, the degree of the color change (value ΔE) of the printed product was measured by the above-mentioned measuring apparatus. Here, the value ΔE shows the degree of the color change, and the smaller the numerical value, the smaller the degree of the color change. When the light resistance was evaluated under the same conditions as in Example of this application by using commercially available C.I. Direct Yellow 132 which is commonly used for an ink jet printer in spite of some problems in its light resistance, a numerical value of 6 was obtained. In this application, with an aim to attain at most ½ of this degree of color change i.e. with an aim to attain light resistance better by at least twice than the commonly used ink jet dye, the target value was set to be at most 3.

(3) Ozone resistance of recorded image: Using an ozone weatherometer OMS-HS (manufactured by Suga Test Instruments Co., Ltd.), the printed product was exposed to an air containing 3 ppm of ozone for 2 hours. Thereafter, the degree of color change (value ΔE) of the printed product was measured by means of the above measuring apparatus. Here, the value ΔE shows the degree of color change, and the smaller the numerical value, the smaller the degree of color change. When the ozone resistance was evaluated under the same conditions as in Example of the present application by using commercially available C.I. Direct Yellow 132 (DY-132) commonly employed for an ink jet printer and having excellent ozone resistance, a numerical value of 1 was obtained. In the comparative evaluation of fastness by the value ΔE, a level of ΔE=1 to 3 may be regarded as good at the same level. Accordingly, in this application, with an aim at ozone resistance as good as DY-132, the target value was set to be at most 3.

Comparative Example 1

An ink was prepared in the same manner as in Example 1 except that the dye was changed to the dye as disclosed in Table 15, and its amount was changed to 3 parts by weight to adjust the light absorption of the ink to be equal to Example 1, and evaluation tests of the ink were carried out by the above-mentioned evaluation method, and the results are shown in Table 15. Here, the dye disclosed in Table 15 is a compound having a structure similar to the dye of the present invention but differs in that the coordination bond to the metal is formed via a hydroxyl group of the diazo component. As shown in Table 15, with this dye, the light resistance is poorer by from 3 to 7 times than the dye of the present invention, and the dye of the present invention, and the ozone resistance was also poorer by about 10 times than the dye of the present invention.

Comparative Example 2

An ink was prepared in the same manner as in Example 1 except that the dye was change to the dye as disclosed in Table 15, and its amount was changed to 4 parts by weight so that the light absorbance of the ink was adjusted to be equal to Example 1, and evaluation tests of the ink were carried out by the above-mentioned evaluation method, and the results are shown in Table 15. Here, the dye disclosed in Table 15 is a compound having a structure similar to the dye of the present invention, but differs from the dye of the present invention in that the coupler component is a 5-membered hetero ring. With this dye, the saturation and light resistance were good, but the ozone resistance was poorer by about 10 times than the dye of the present invention.

Comparative Example 3

An ink was prepared in the same manner as in Example 1 except that the dye was changed to DY-132, and its amount was changed to 2 parts by weight so that the light absorption of the ink was adjusted to be equal to Example 1, and evaluation tests of the ink were carried out by the above-mentioned evaluation method, and the results are shown in Table 15. The dye DY-132 in this Table 15 is one of yellow ink jet dyes which are most commonly employed. As shown in Table 15, the saturation and ozone resistance of this dye were good, but the light resistance was poorer by from 3 to 6 times than the dye of the present application.

TABLE 15

| Structure of ligand | Metal | λmax (nm) | Saturation C* | Light resistance ΔE | Ozone resistance ΔE |
|---|---|---|---|---|---|
| Ex. 1 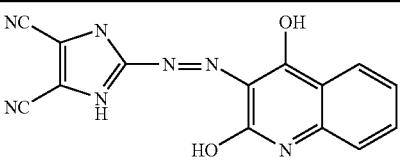 | Ni | 453 | 113 | 2 | 1 |
| Comp. Ex. 1 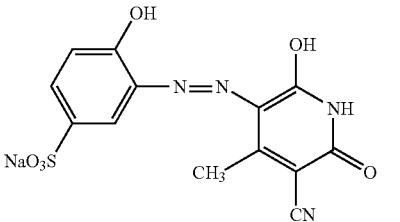 | Ni | 467 | 95 | 8 | 11 |
| Comp. Ex. 2 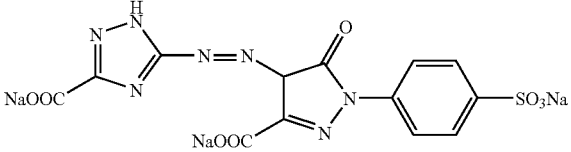 | Ni | 440 | 106 | 2 | 12 |
| Comp. Ex. 3    C.I Direct Yellow 132 | — | 407 | 98 | 6 | 1 |
| The target values for the printed performance | | | At least 80 | At most 3 | At most 3 |

Example 2

Preparation of Ink Set

Preparation of Magenta and Cyan Inks

The magenta and cyan inks having the respective compositions as shown in the following Table, were prepared in the same manner as for the above-mentioned yellow ink.

| | Pale magenta | Dark magenta | Pale cyan | Dark cyan |
|---|---|---|---|---|
| OLFINE E1010 | 2 | 2 | 1 | 1 |
| Triethylene glycol monobutyl ether | 11 | 11 | — | — |
| Diethylene glycol | 13 | 13 | 5 | 5 |
| Ethylene glycol | — | — | 7 | 7 |
| Isopropanol | — | — | 3 | 3 |
| Glycerol | 12 | 12 | 9 | 9 |
| Urea | 11 | 11 | 2 | 3 |
| Triethanolamine | 1 | 1 | — | — |
| MM-1 | 2 | 3 | — | — |
| Direct Blue-199 | — | — | 0.7 | 4.4 |
| Water | Balance | Balance | Balance | Balance |

Using the ink obtained in Example 1 as a yellow ink and further using the four types of inks obtained as described above, by means of an ink jet printer (tradename: BJ-F870, manufactured by Canon Inc.), a red printed letter by a mixed color of magenta ink and yellow ink, a green printed letter by a mixed color of cyan ink and yellow ink and a black printed letter by a mixed color of magenta ink, cyan ink, and yellow ink, were printed on a paper exclusive for ink jet (tradename, Superfine exclusive paper, manufactured by Seiko Epson Corporation). With respect to a solid image with a printed density of about 1, of this printed product, evaluation of the light resistance was carried out by the same method as in Example 1. The results are shown in Table 16.

Comparative Example 4

An ink set was prepared in the same manner as in Example 2, except that a yellow ink having the following composition employing DY-132 as a yellow dye, was used, and tests were carried out in the same manner as in Example 2. The results are shown in Table 16.

| Ink composition | |
|---|---|
| Component | Parts by weight |
| C.Y.DY-132 | 2 |
| OLFINE E1010 (surfactant) | 1 |
| Triethylene glycol monobutyl ether | 7 |
| Diethylene glycol | 3 |
| Glycerol | 2 |
| Triethanolamine | 10 |
| Urea | 3 |
| Water | Balance |
| Total | 100 |

TABLE 16

| | Light resistance of mixed color portion (ΔE) | | |
|---|---|---|---|
| | Red | Green | Black |
| Example 2 | 16 | 23 | 8 |
| Comparative Example 4 | 22 | 32 | 16 |

From the foregoing results, it is evident that the ink set of the present invention, is superior in light resistance of the red, green and black images.

INDUSTRIAL APPLICABILITY

A recorded image obtained by the recording fluid employing a water-soluble metal complex comprising an azo compound having a specific structure and a metal, of the present invention, has excellent characteristics satisfying each of the three characteristics of light fastness, gas fastness and saturation. Accordingly, the dye of the present invention has excellent properties as a dye for a recording fluid.

Further, the entire disclosures of Japanese Patent Application No. 2002-207711 and Japanese Patent Application No. 2003-099931 including specifications, claims and summaries are incorporated herein by reference in their entireties.

What is claimed is:

1. A water-soluble complex dye comprising an azo compound represented by the following formula (1) or its tautomer, and transition metal ions:

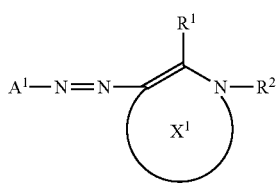

(1)

wherein in the formula (1), $A^1$ is a 5- to 7-membered hetero monocyclic group containing one or two hetero atoms among the ring forming atoms, or a condensed heterocyclic group containing such a hetero monocyclic group and may have an optional substituent, provided that it is a group which does not have a hydroxyl group as a substituent at a position adjacent to the carbon atom bonded to the azo group; ring $X^1$ represents a condensed hetero ring containing a 6-membered hetero ring, said 6-membered hetero ring being a group bonded to the azo group, and may have an optional substituent; and each of $R^1$ and $R^2$ which are independent of each other, represents a hydrogen atom or a monovalent substituent.

2. The water-soluble complex dye according to claim 1, wherein in the azo compound represented by the above formula (1) or its tautomer, $A^1$ is such that at least one of ring-forming atoms adjacent to the carbon atom bonded to the azo group, is a nitrogen atom, an oxygen atom or a sulfur atom, or a carbon atom having a substituent capable of forming a coordinate bond other than a hydroxyl group.

3. The water-soluble complex dye according to claim 1, wherein in the azo compound represented by the above formula (1) or its tautomer, $A^1$ has a nitrogen atom at a position adjacent to the carbon atom bonded to the azo group, and contains 2 hetero atoms selected from the group consisting of a nitrogen atom, an oxygen atom and a sulfur atom, as the ring-forming atoms.

4. The water-soluble complex dye according to claim 1, wherein in the azo compound represented by the above formula (1) or its tautomer, $A^1$ is a group represented by the following formula (2):

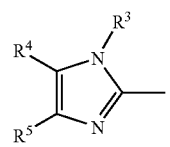

(2)

wherein in the formula (2), each of $R^3$ to $R^5$ which are independent of one another, is a hydrogen atom or a monovalent substituent.

5. The water-soluble complex dye according to claim 4, wherein in the formula (2), $R^3$ is a hydrogen atom or an alkyl group which may be substituted.

6. The water-soluble complex dye according to claim 4, wherein in the above formula (2), each of $R^4$ and $R^5$ which are independent of one another, is a hydrogen atom, a carboxyl group, a cyano group, an alkylthio group, an alkylsulfonyl group, a phenyl group, an alkoxycarbonyl group, a carbamoyl group, an alkylaminocarbonyl group which may be substituted, or a trifluoromethyl group.

7. The water-soluble complex dye according to claim 1, wherein in the azo compound represented by the above formula (1) or its tautomer, $R^1$ in the formula (1) is a substituent capable of forming a coordinate bond.

8. The water-soluble complex dye according to claim 7, wherein in the azo compound represented by the above formula (1) or its tautomer, $R^1$ in the formula (1) is a hydroxyl group, or an amino group which may be substituted by substitutent or unsubstituted alkyl group;

wherein the substituent of the substituted alkyl group is selected from the group consisting of a sulfo group, a carboxyl group and a hydroxyl group.

9. The water-soluble complex dye according to claim 1, wherein in the azo compound represented by the above formula (1) or its tautomer, ring $X^1$ in the formula (1) is a group represented by either the following formula (3) or (4):

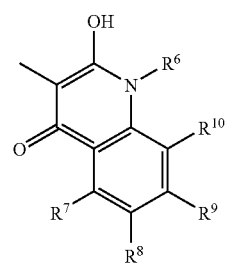

(3)

-continued

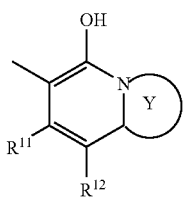

(4)

wherein in the formulae (3) and (4), each of $R^6$ to $R^{12}$ which are independent of one another, is a hydrogen atom or a monovalent substituent, inclusive of a tautomer thereof, and ring Y represents a hetero ring constituted by 5 to 7 atoms, such a hetero ring may have optional substituents, and such substituents may further form a condensed ring.

10. The water-soluble complex dye according to claim 9, wherein in the above formulae (3) and (4), each of $R^7$ to $R^{12}$ which are independent of one another, is a hydrogen atom, a halogen atom, a sulfo group, a carboxyl group, a phosphono group, a cyano group, a nitro group, a hydroxyl group, an alkyl group which may be substituted, an alkenyl group which may be substituted, an alkoxy group which may be substituted, an amino group which may be substituted, or a carbamoyl group which may be substituted;

wherein the substituents for the alkyl group, the alkenyl group and the alkoxy group, are at least one group selected from the group consisting of a halogen atom, a sulfo group, a carboxyl group, a hydroxyl group, a cyano group, a nitro group and an amino group which may be substituted, and the substituents for the amino group and the carbamoyl group, are at least one group selected from the group consisting of an alkyl group and an alkenyl group, which may be substituted by a substituent selected from the group consisting of the group consisting of a halogen atom, a sulfo group, a carboxyl group, a hydroxyl group, a cyano group and a nitro group.

11. The water-soluble complex dye according to claim 9, wherein in the above formula (3), $R^6$ is a hydrogen atom, a $C_{1-9}$ alkyl group which may be substituted, a $C_{2-9}$ alkenyl group which may be substituted, or an aryl group which may be substituted;

wherein the substituents for the alkyl group, the alkenyl group and the aryl group, are at least one group selected from the group consisting of a halogen atom, a sulfo group, a carboxyl group, a hydroxyl group, a cyano group, a nitro group, an alkyl group which may be substituted, and an amino group which may be substituted.

12. The water-soluble complex dye according to claim 9, wherein in the above formula (4), Y is a 5- or 6-membered ring which may contain an oxygen atom as a ring forming atom.

13. The water-soluble complex dye according to claim 1, wherein the transition metal ions are selected from the group consisting of Cu, Ni, Co, Zn and Fe.

14. A water-soluble complex dye comprising the azo dye represented by the above formula (1) or its tautomer, and transition metal ions, and represented by the following formula (5):

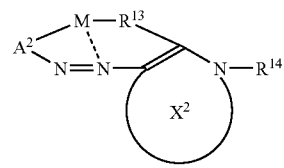

(5)

wherein in the formula (5), M represents an optional transition metal ion; $A^2$ is a 5- to 7-membered hetero monocyclic group containing one or two hetero atoms among the ring forming atoms, or a condensed heterocyclic group containing such a hetero monocyclic group, and may have an optional substituent, provided that it represents a group which does not have a hydroxyl group as a substituent at a position adjacent to the carbon atom bonded to the azo group; ring $X^2$ represents a condensed hetero ring containing a 6-membered hetero ring, said 6-membered hetero ring being a group bonded to the azo group, and may have an optional substituent; and $R^{13}$ represents a substituent capable of forming a coordinate bond; and $R^{14}$ represents a hydrogen atom or a monovalent substituent.

15. A water-based recording fluid comprising an aqueous medium and at least one water-soluble complex dye as defined in claim 1.

16. An ink jet recording fluid comprising an aqueous medium and at least one water-soluble complex dye as defined in claim 1.

17. An ink jet recording method, which comprises;
applying the ink jet recording fluid as defined in claim 16 to a substrate.

18. An ink set employing the recording fluid as defined in claim 15, as a yellow ink and having a magenta ink and a cyan ink, and, if necessary, a black ink, further combined therewith.

19. The ink set according to claim 18, wherein the magenta ink contains at least one magenta dye selected from the group consisting of a quinacridone dye, a xanthene dye, a perylene dye, an anthanthrone dye and a monoazo dye; a water-soluble azo metal chelate compound formed of an azo dye and a metal atom; an anthrapyridone water-soluble compound represented by the following formula (101); and water-soluble azo compounds represented by the following formulae (MA) to (MG):

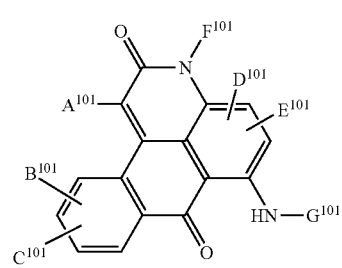

(101)

wherein each of $A^{101}$ to $E^{101}$ which are independent of one another, is a hydrogen atom, a halogen atom, a hydroxyl group, a mercapto group, a nitro group, a cyano group, a carboxyl group, a sulfo group, a phosphono group, an alkyl group which may be substituted, an alkenyl group which may be substituted, an aryl group which may be substituted, an alkoxy group which may be substituted, an alkenyloxy group which may be substituted, an aryloxy group which may be substituted, an acyl group, an acyloxy group, a carbamoyl group which may be substituted, a carboxylate group, an amino group which may be substituted, an alkylthio group which may be substituted, an alkenylthio group which may be substituted, an arylthio group which may be substituted, an alkylsulfinyl group which may be substituted, an arylsulfinyl group which may be substituted, an alkylsulfonyl group which may be substituted, an arylsulfonyl group which may be substituted, a sulfonate group, or a thiocyanate group, each of $F^{101}$ and $G^{101}$ which are independent of each other, is a hydrogen atom; an alkyl group which may be substituted; an alkenyl group which may be substituted; an aryl group which may be substituted; an acyl group; a carboxylate group; an alkylsulfonyl group which may be substituted; an arylsulfonyl group which may be substituted; a sulfonate group; or a triazinyl group which may be substituted by a substituent selected from the group consisting of a halogen atom, a hydroxyl group, an alkylamino group which may be substituted, an alkenylamino group which may be substituted, an arylamino group which may be substituted, an alkoxy group which may be substituted, an alkenyloxy group which may be substituted, an aryloxy group which may be substituted, an alkylthio group which may be substituted, an alkenylthio group which may be substituted, and an arylthio group;

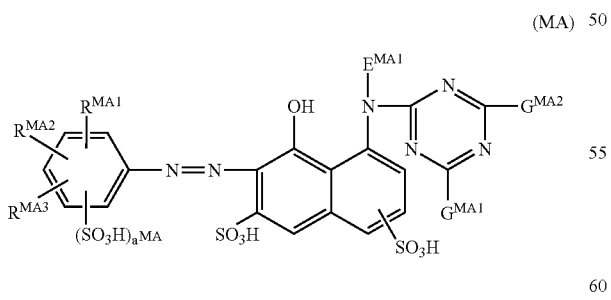

(MA)

wherein each of $R^{MA1}$, $R^{MA2}$ and $R^{MA3}$ which are independent of one another, is a hydrogen atom, a halogen atom, a hydroxyl group, a carboxyl group, a nitro group, a $C_{1-9}$ alkyl group which may be substituted, a $C_{1-9}$ alkoxy group, a carbamoyl group which may be substituted, a sulfamoyl group which may be substituted, an amino group which may be substituted, a sulfonate group, a $C_{1-9}$ alkylsulfonyl group, a $C_{6-15}$ arylsulfonyl group, or a carboxylate group; $a^{MA}$ represents 0, 1 or 2; $E^{MA1}$ is a hydrogen atom or a $C_{1-4}$ alkyl group; and each of $G^{MA1}$ and $G^{MA2}R$ which are independent of each other, is a halogen atom, a group represented by $NR^{MA4}R^{MA5}$ or $OR^{MA6}$, where each of $R^{MA4}$, $R^{MA5}$ and $R^{MA6}$ which are independent of one another, is a hydrogen atom, a $C_{1-18}$ alkyl group, a $C_{2-18}$ alkenyl group, an aryl group, an aralkyl group, an aromatic hydrocarbon cyclic group or a heterocyclic group, provided that such a group, other than the hydrogen atom, may have a substituent;

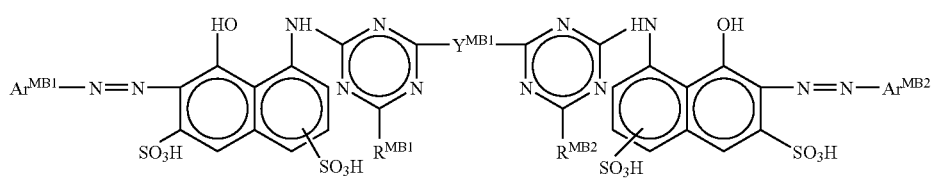

(MB)

wherein each of $R^{MA1}$ and $R^{MA2}$ represents —$OR^{Mb1}$, —$NR^{Mb2}R^{Mb3}$ or a chlorine atom, each of $R^{Mb1}$, $R^{Mb2}$ and $R^{Mb3}$ represents a hydrogen atom, a $C_{1-8}$ linear or branched alkyl group, a $C_{2-3}$ alkenyl group, an aryl group, an aralkyl group, a cycloalkyl group or a nitrogen-containing heterocyclic group, provided that such a group other than the hydrogen atom may further have a substituent, or $R^{Mb2}$ and $R^{Mb3}$ may form a 5- or 6-membered ring together with the nitrogen atom bonded thereto; $Y^{MB1}$ represents a bivalent connecting group selected from group consisting of formula (MB1), formula (MB2), formula (MB3), formula (MB4), formula (MB5), formula (MB6), formula (MB7), and formula (MB8);

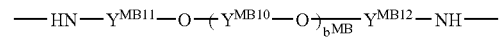

(MB1)

wherein each of $Y^{MB11}$ and $Y^{MB12}$ which are independent of each other, is a $C_{1-8}$ linear or branched alkylene group, and $y^{MB10}$ is a $C_{1-12}$ linear or branched alkylene group, and $b^{MB}$ is an integer of from 0 to 20;

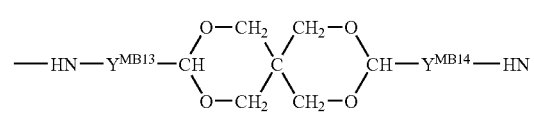

(MB2)

wherein each of $U^{MB13}$ and $Y^{MB14}$ which are independent of each other, is a $C_{1-8}$ linear or branched alkylene group;

(MB3)

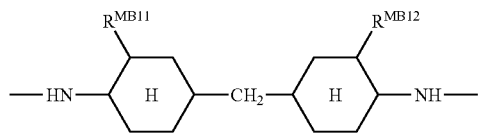

wherein each of $R^{MB11}$ and $R^{MA12}$ is a hydrogen atom or a methyl group;

(MB4)

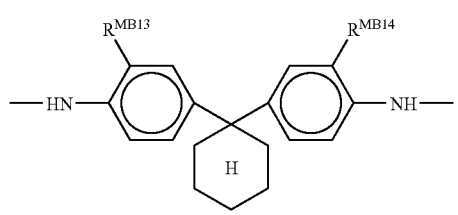

wherein each of $R^{MB13}$ and $R^{MB14}$ which are independent of each other, is a hydrogen atom, a methyl group or a methoxy group;

(MB5)

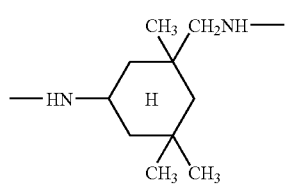

(MB6)

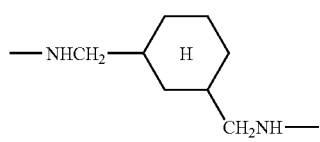

(MB7)

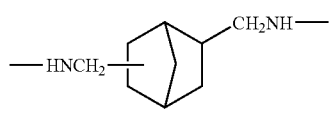

(MB8)

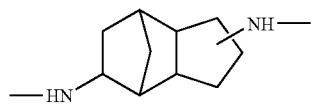

each of $Ar^{MB1}$ and $Ar^{MB2}$ which are independent of each other, is a phenyl group which may be substituted, or a naphthyl group which may be substituted;

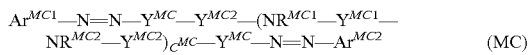

(MC)

wherein each of $Ar^{MC1}$ and $Ar^{MC2}$ which are independent of each other, is an aryl group which may be substituted, provided that at least one of $Ar^{MC1}$ and $Ar^{MC2}$ has at least one substituent selected from the group consisting of —COOH and —COSH, as a substituent; each of $R^{MC1}$ and $R^{MC2}$ which are independent of each other, is a hydrogen atom, an alkyl group which may be substituted, or an alkenyl group which may be substituted; $Y^{MC}$ represents the following group:

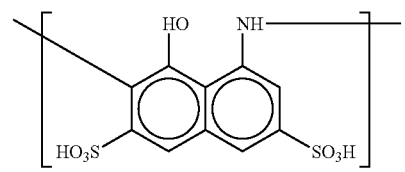

$Y^{MC1}$ represents a bivalent organic connecting group, $c^{MC}$ is 0 or 1, and $Y^{MC2}$ is a carbonyl group or a group represented by the following formula or ③:

①

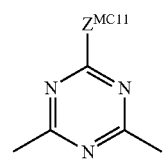

②

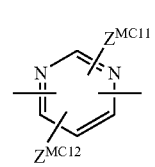

③

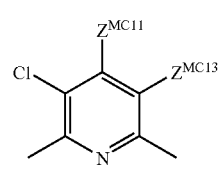

wherein $Z^{MC11}$ represents $NR^{MC21}R^{MC22}$, $SR^{MC23}$ or $OR^{MC23}$, $Z^{MC12}$ represents a hydrogen atom, a chlorine atom or a group represented by $Z^{MC11}$, $Z^{MC13}$ represents a chlorine atom or a cyano group; each of $R^{MC21}$, $R^{MC22}$ and $R^{MC23}$ which are independent of one another, is a hydrogen atom, an alkyl group which may be substituted, an alkenyl group which may be substituted, an aryl group which may be substituted, or an aralkyl group which may be substituted, provided that $R^{MC21}$ and $R^{MC22}$ may form a 5- or 6-membered ring together with the nitrogen atom bonded thereto;

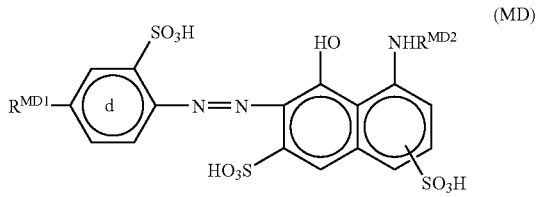

(MD)

wherein $R^{MD1}$ represents a hydrogen atom, a methyl group, a methoxy group, an acetylamino group or a nitro group, but may form a benzene ring together with the carbon atom at the 3-position of the benzene ring d; $R^{MD2}$ represents an acetyl group, a benzoyl group, a p-toluenesulfonyl group or a 4-chloro-6-hydroxy-1,3,5-triazin-2-yl group;

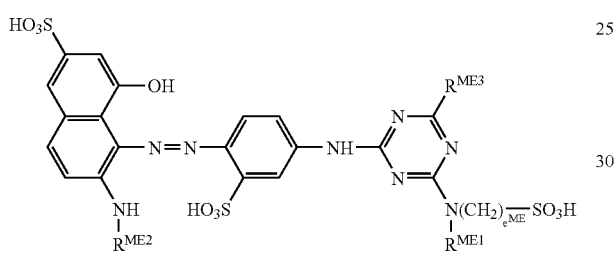

(ME)

wherein $R^{ME1}$ represents a hydrogen atom or a $C_{1-6}$ aliphatic group; $R^{ME2}$ represents a hydrogen atom; a $C_{1-6}$ alkyl group which may have a substituent selected from the group consisting of a cyano group, a hydroxyl group, a $COOR^{Me}$ group; $R^{Me}$ is a hydrogen atom, a metal atom or an ammonium group which may have a substituent, a $COOCH_3$ group and a $COOCH_2CH_3$ group; or an aryl group which may be substituted by a methyl group; $e^{ME}$ is an integer of from 2 to 4; and $R^{ME3}$ represents a hydroxyl group, an amino group which may have a substituent, an alkylthio group or an alkoxy group;

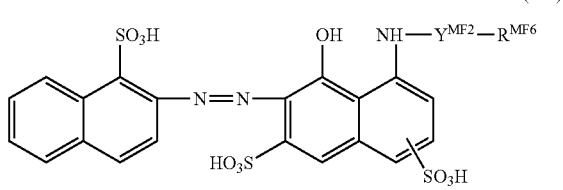

(MF)

wherein $Y^{MF2}$ represents a carbonyl group or a sulfonyl group, and $R^{MF6}$ is a $C_{1-18}$ aliphatic group or a group represented by the following formula (F1):

(F1)

wherein $R^{MF6A}$ represents a hydrogen atom, a halogen atom, a nitro group, a cyano group, a carboxyl group, a $C_{1-4}$ lower alkyl group or a $C_{1-4}$ lower alkoxy group, $R^{MF6B}$ represents a hydrogen atom, halogen atom, a carboxyl group, or a $C_{1-4}$ lower alkyl group;

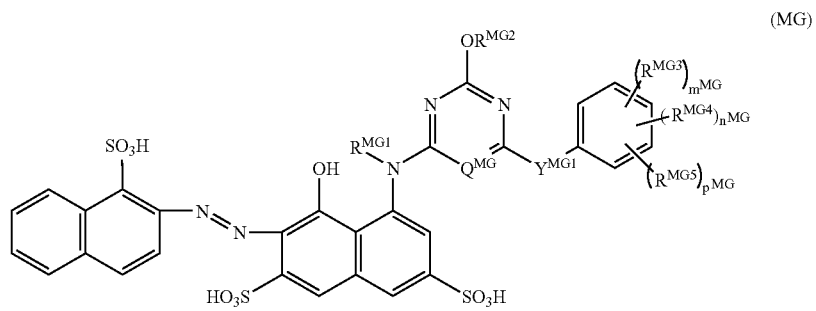

(MG)

wherein $Q^{MG1}$ represents N, C—Cl, C—CN or C—NO$_2$, $R^{MG1}$ represents a hydrogen atom or an alkyl group which may be substituted, and $R^{MG2}$ is a hydrogen atom or an alkyl group; $Y^{MG1}$ represents —O—, —S— or —NR$^{MG6}$; wherein $R^{MG6}$ represents a hydrogen atom or an alkyl group which may be substituted; $R^{MG3}$ represents —CO$_2$H or —SO$_3$H, $R^{MG4}$ represents an amino group which may be substituted, $R^{MG5}$ represents a halogen atom, a hydroxyl group, a thiol group, a nitro group, a cyano group, an alkyl group which may be substituted, an alkenyl group which may be substituted, an alkoxy group which may be substituted, an aryloxy group which may be substituted, a carbamoyl group which may be substituted, an acyl group or an acyloxy group, provided that in a case where a plurality of $R^{MG3}$, $R^{MG4}$ and $R^{MG5}$ are present, a plurality of $R^{MG3}$, $R^{MG4}$ and $R^{MG5}$ may be the same or different, respectively; each of $m^{MG}$, $n^{MG}$ and $p^{MG}$ which are independent of one another, is an integer of from 0 to 3, provided that ($m^{MG}+n^{MG}+p^{MG}$) is from 0 to 5.

20. The ink set according to claim 19, wherein the water-soluble azo metal chelate compound formed of an azo compound and a metal element is a water-soluble azo metal chelate compound formed of an azo compound represented by the following formula (103), and a metal element

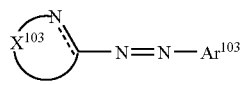
(103)

wherein the formula (103) represents an azo compound having at least one hydrophilic group in its molecule, and $X^{103}$ represents a plurality of atoms required to form at least one 5- to 7-membered heterocyclic group, and the heterocyclic group containing $X^{103}$ may have a substituent on its hetero ring, and the substituents on the hetero ring may be condensed to form a condensed ring, or the condensed hetero ring containing $X^{103}$ may further be substituted, and $Ar^{103}$ represents a substituted naphthyl group selected from the group consisting of formula (103-1), formula (103-2), and formula (103-3), $Y^{103}$ represents a chelating group, and $Z^{103}$ represents optional substituents which may be different from one another, and $a^{103}$ represents an integer of from 0 to 6.

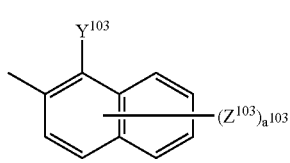
(103-1)

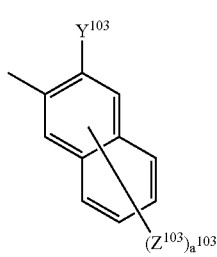
(103-2)

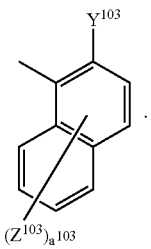
(103-3)

21. The ink set according to claim 18, wherein the cyan ink contains at least one cyan dye selected from the group consisting of formula (201) and formula (202);

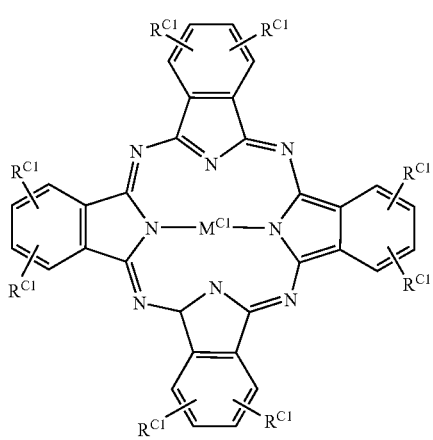
(201)

wherein $R^{C1}$ represents a hydrogen atom or an optional substituent, and the plurality of $R^{C1}$ may be the same or different from one another, and $M^{C1}$ represents a metal atom;

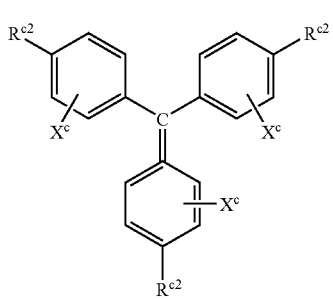
(202)

wherein $R^{C2}$ represents a hydrogen atom or an optional substituent, and the plurality of $R^{C2}$ may be the same or different from one another; $X^C$ represents a hydrogen atom, a sulfo group, a carboxyl group, a phosphono group, an amino group, or an alkyl group which may be substituted.

22. The ink set according to any one of claims 18 to 21, wherein the black ink contains at least one black dye selected from the group consisting of carbon black and water-soluble compounds represented by the following formulae (301) and (302):

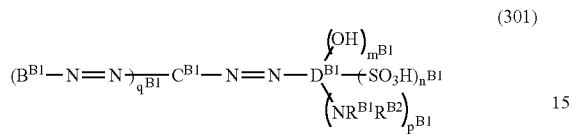
(301)

wherein each of $B^{B1}$, $C^{B1}$ and $D^{B1}$ which are independent of one another, represents an aromatic ring, and the aromatic ring may have an optional substituent, $m^{B1}$ represents an integer of from 0 to 1, $n^{B1}$ represents an integer of from 0 to 3, $p^{B1}$ represents an integer of from 0 to 2, and $q^{B1}$ represents an integer of from 0 to 4; in a case where a plurality of $B^{B1}$ are present, the respective $B^{B1}$ may be the same or different, and each of $R^{B1}$ and $R^{B2}$ which are independent of each other, is a hydrogen atom or an optional substituent;

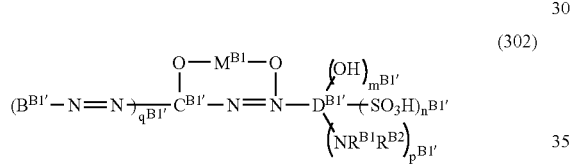
(302)

wherein each of $B^{B1'}$, $C^{B1'}$ and $D^{B1'}$ which are independent of one another, represents an aromatic ring, and the aromatic ring may have an optional substituent, $m^{B1'}$ represents an integer of from 0 to 1, $n^{B1'}$ represents an integer of from 0 to 3, $p^{B1'}$ represents an integer 0 to 2, and $q^{B1'}$ represents an integer of from 0 to 4; in a case where a plurality of $B^{B1'}$ are present, the respective $B^{B1'}$ may be the same or different; each of $R^{B1}$ and $R^{B2}$ which are independent of each other, is a hydrogen atom or an optional substituent; $M^{B1}$ represents a metal atom, provided that $M^{B1}$ is at least tri-coordinate, and in such a case, $M^{B1}$ may optionally be coordinated from an optional substituent or connecting moiety in the formula (302), or by an optional ligand at a specific ratio of counter ligand metal which such $M^{B1}$ has; or the metal ion may further be coordinated in the form of —O-M31-O— to the adjacent $B^{B1'}$ sandwiching the azo group in a case where a plurality of $B^{B1'}$ are present, or to $B^{B1'}$ and $C^{B1'}$.

23. A dye set which is employed for the ink set as defined in claim 18;
wherein the magenta ink contains at least one magenta dye selected from the group consisting of a quinacridone dye, a xanthene dye, a perylene dye, an anthanthrone dye, and a monoazo dye; a water-soluble azo metal chelate compound formed of an azo dye and a metal atom; an anthrapyridone water-soluble compound represented by the following formula (101); and water-soluble azo compounds represented by the following formulae (MA) to (MG):

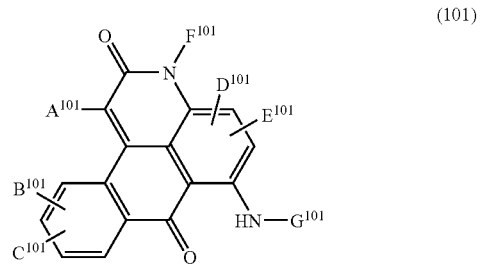
(101)

wherein each of $A^{101}$ to $E^{101}$ which are independent of one another, is a hydrogen atom, a halogen atom, a hydroxyl group, a mercapto group, a nitro group, a cyano group, a carboxyl group, a sulfo group, a phosphono group, an alkyl group which may be substituted, an alkenyl group which may be substituted, an aryl group which may be substituted, an alkoxy group which may be substituted, an alkenyloxy group which may be substituted, an aryloxy group which may be substituted, an acyl group, an acyloxy group, a carbamoyl group which may be substituted, a carboxylate group, an amino group which may be substituted, an alkylthio group which may be substituted, an alkenylthio group which may be substituted, an arylthio group which may be substituted, an alkylsulfinyl group which may be substituted, an arylsulfinyl group which may be substituted, an alkylsulfonyl group which may be substituted, an arylsulfonyl group which may be substituted, a sulfonate group, or a thiocyanate group, each of $F^{101}$ and $G^{101}$ which are independent of each other, is a hydrogen atom; an alkyl group which may be substituted; an alkenyl group which may be substituted; an aryl group which may be substituted; an acyl group; a carboxylate group; an alkylsulfonyl group which may be substituted; an arylsulfonyl group which may be substituted; a sulfonate group; or a triazinyl group which may be substituted by a substituent selected from the group consisting of a halogen atom, a hydroxyl group, an alkylamino group which may be substituted, an alkenylamino group which may be substituted, an arylamino group which may be substituted, an alkoxy group which may be substituted, an alkenyloxy group which may be substituted, an aryloxy group which may be substituted, an alkylthio group which may be substituted, an alkenylthio group which may be substituted, and an arylthio group;

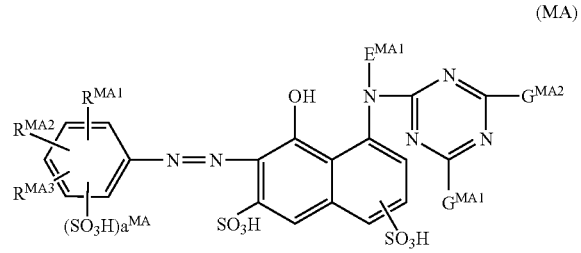
(MA)

wherein each of $R^{MA1}$, $R^{MA2}$ and $R^{MA3}$ which are independent of one another, is a hydrogen atom, a halogen atom, a hydroxyl group, a carboxyl group, a nitro group, a $C_{1-9}$ alkyl group which may be substituted, a $C_{1-9}$ alkoxy group, a carbamoyl group which may be substituted, a sulfamoyl group which may be substituted, an amino group which may be substituted, a sulfonate group, a $C_{1-9}$ alkylsulfonyl group, a $C_{6-15}$ arylsulfonyl group, or a carboxylate group; $a^{MA}$ represents 0, 1 or 2; $E^{MA1}$ is a hydrogen atom or a $C_{1-4}$ alkyl group; and each of $G^{MA1}$ and $G^{MA2}R$ which are independent of each other, is a halogen atom, a group represented by $NR^{MA4}R^{MA5}$ or $OR^{MA6}$, where each of $R^{MA4}$, $R^{MA5}$ and $R^{MA6}$ which are independent of one another, is a hydrogen atom, a $C_{1-18}$ alkyl group, a $C_{2-18}$ alkenyl group, an aryl group, an aralkyl group, an aromatic hydrocarbon cyclic group or a heterocyclic group, provided that such a group, other than the hydrogen atom, may have a substituent;

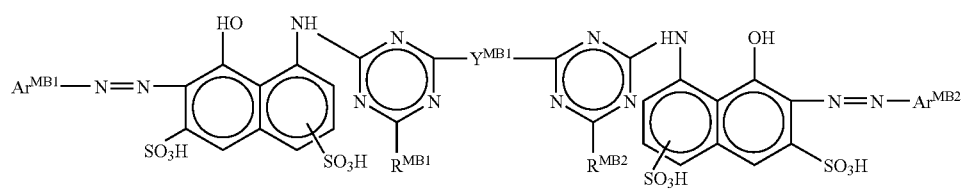

(MB)

wherein each of $R^{MB1}$ and $R^{MB2}$ represents —$OR^{Mb1}$, —$NR^{Mb2}R^{Mb3}$ or a chlorine atom, each of $R^{Mb1}$, $R^{Mb2}$ and $R^{Mb3}$ represents a hydrogen atom, a $C_{1-8}$ linear or branched alkyl group, a $C_{2-3}$ alkenyl group, an aryl group, an aralkyl group, a cycloalkyl group or a nitrogen-containing heterocyclic group, provided that such a group other than the hydrogen atom may further have a substituent, or $R^{Mb2}$ and $R^{Mb3}$ may form a 5- or 6-membered ring together with the nitrogen atom bonded thereto; $Y^{MB1}$ represents a bivalent connecting group selected from the group consisting of formula (MB1), formula (MB2), formula (MB3), formula (MB4), formula (MB5), formula (MB6), formula (MB7), and formula (MB8);

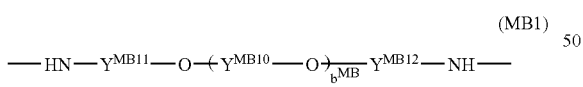
(MB1)

wherein each of $Y^{MB11}$ and $Y^{MB12}$ which are independent of each other, is a $C_{1-8}$ linear or branched alkylene group, and $Y^{MB10}$ is a $C_{1-12}$ linear or branched alkylene group, and $b^{MB}$ is an integer of from 0 to 20;

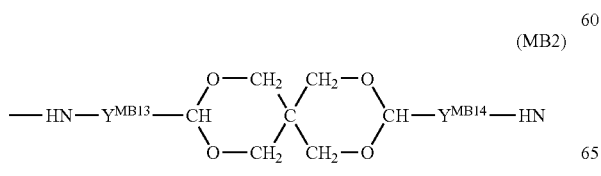
(MB2)

wherein each of $Y^{MB13}$ and $Y^{MB14}$ which are independent of each other, is a $C_{1-8}$ linear or branched alkylene group;

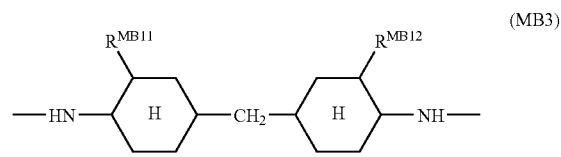
(MB3)

wherein each of $R^{MB11}$ and $R^{MB12}$ is a hydrogen atom or a methyl group;

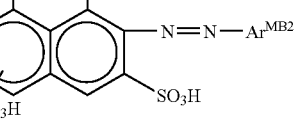
(MB4)

wherein each of $R^{MB13}$ and $R^{MB14}$ which are independent of each other, is a hydrogen atom, a methyl group or a methoxy group;

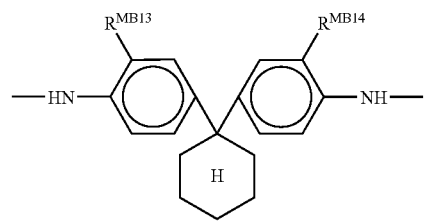
(MB5)

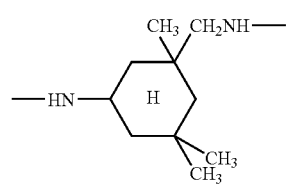
(MB6)

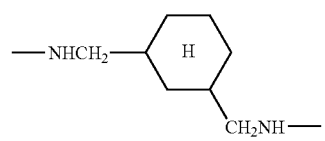
(MB7)

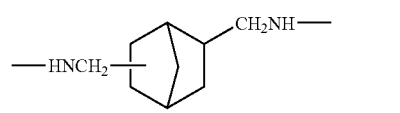

-continued

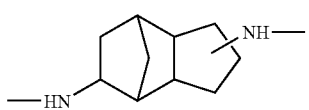
(MB8)

each of Ar$^{MB1}$ and Ar$^{MB2}$ which are independent of each other, is a phenyl group which may be substituted, or a naphthyl group which may be substituted;

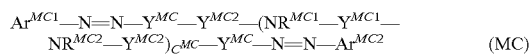
(MC)

wherein each of Ar$^{MC1}$ and Ar$^{MC2}$ which are independent of each other, is an aryl group which may be substituted, provided that at least one of Ar$^{MC1}$ and A$^{MC2}$ has at least one substituent selected from the group consisting of —COOH and —COSH, as a substituent; each of R$^{MC1}$ and R$^{MC2}$ which are independent of each other, is a hydrogen atom, an alkyl group which may be substituted, or an alkenyl group which may be substituted; Y$^{MC}$ represents the following group:

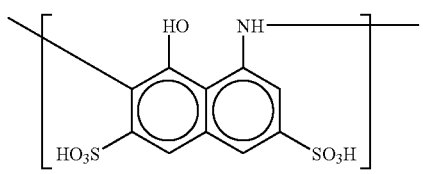

Y$^{MC1}$ represents a bivalent organic connecting group, c$^{MC}$ is 0 or 1, and Y$^{MC2}$ is a carbonyl group or a group represented by the following formula ①, ② or ③:

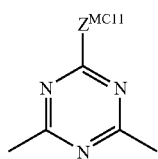
①

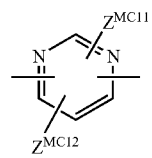
②

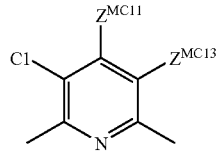
③ wherein Z$^{MC11}$ represents NR$^{MC21}$R$^{MC22}$, SR$^{MC23}$ or OR$^{MC23}$, Z$^{MC12}$ represents a hydrogen atom, a chlorine atom or a group represented by Z$^{MC11}$, Z$^{MC13}$ represents a chlorine atom or a cyano group; each of R$^{MC21}$, R$^{MC22}$ and R$^{MC23}$ which are independent of one another, is a hydrogen atom, an alkyl group which may be substituted, an alkenyl group which may be substituted, an aryl group which may be substituted, or an aralkyl group which may be substituted, provided that R$^{MC21}$ and R$^{MC22}$ may form a 5- or 6-membered ring together with the nitrogen atom bonded thereto;

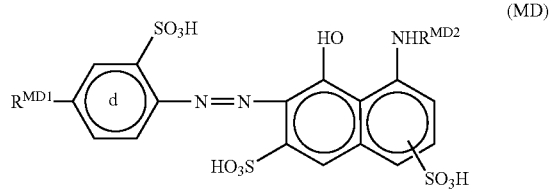
(MD)

wherein R$^{MD1}$ represents a hydrogen atom, a methyl group, a methoxy group, an acetylamino group or a nitro group, but may form a benzene ring together with the carbon atom at the 3-position of the benzene ring d; R$^{MD2}$ represents an acetyl group, a benzoyl group, a p-toluenesulfonyl group or a 4-chloro-6-hydroxy-1,3,5-triazin-2-yl group;

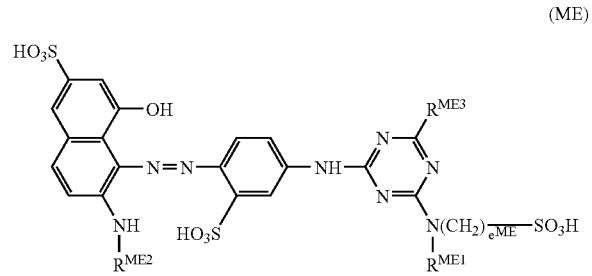
(ME)

wherein R$^{ME1}$ represents a hydrogen atom or a C$_{1-6}$ aliphatic group; R$^{ME2}$ represents a hydrogen atom; a C$_{1-6}$ alkyl group which may have a substituent selected from the group consisting of a cyano group, a hydroxyl group, a COOR$^{Me}$ group; R$^{Me}$ is a hydrogen atom, a metal atom or an ammonium group which may have a substituent, a COOCH$_3$ group and a COOCH$_2$CH$_3$ group; or an aryl group which may be substituted by a methyl group; e$^{ME}$ is an integer of from 2 to 4; and R$^{ME3}$ represents a hydroxyl group, an amino group which may have a substituent, an alkylthio group or an alkoxy group;

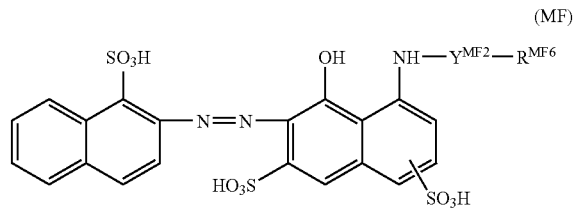
(MF)

wherein $Y^{MF2}$ represents a carbonyl group or a sulfonyl group, and $R^{MF6}$ is a $C_{1-18}$ aliphatic group or a group represented by the following formula (F1):

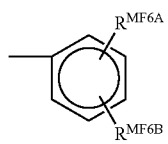
(F1)

wherein $R^{MF6A}$ represents a hydrogen atom, a halogen atom, a nitro group, a cyano group, a carboxyl group, a $C_{1-4}$ lower alkyl group or a $C_{1-4}$ lower alkoxy group, $R^{MF6B}$ represents a hydrogen atom, a halogen atom, a carboxyl group, or a $C_{1-4}$ lower alkyl group;

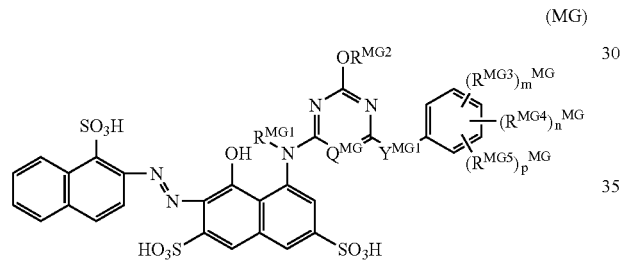
(MG)

wherein $Q^{MG1}$ represents N, C—Cl, C—CN or C—NO$_2$, $R^{MG1}$ represents a hydrogen atom or an alkyl group which may be substituted, and $R^{MG2}$ is a hydrogen atom or an alkyl group; $Y^{MG1}$ represents —O—, —S— or —NR$^{MG6}$; wherein $R^{MG6}$ represents a hydrogen atom or an alkyl group which may be substituted; $R^{MG3}$ represents —CO$_2$H or —SO$_3$H, $R^{MG4}$ represents an amino group which may be substituted, $R^{MG5}$ represents a halogen atom, a hydroxyl group, a thiol group, a nitro group, a cyano group, an alkyl group which may be substituted, an alkenyl group which may be substituted, an alkoxy group which may be substituted, an aryloxy group which may be substituted, a carbamoyl group which may be substituted, an acyl group or an acyloxy group, provided that in a case where a plurality of $R^{MG3}$, $R^{MG4}$ and $R^{MG5}$ are present, a plurality of $R^{MG3}$, $R^{MG4}$ and $R^{MG5}$ may be the same or different, respectively; each of $m^{MG}$, $n^{MG}$ and $p^{MG}$ which are independent of one another, is an integer of from 0 to 3, provided that ($m^{MG}+n^{MG}+p^{MG}$) is from 0 to 5;

wherein the cyan ink contains at least one cyan dye selected from the group consisting of formula (201) and formula (202);

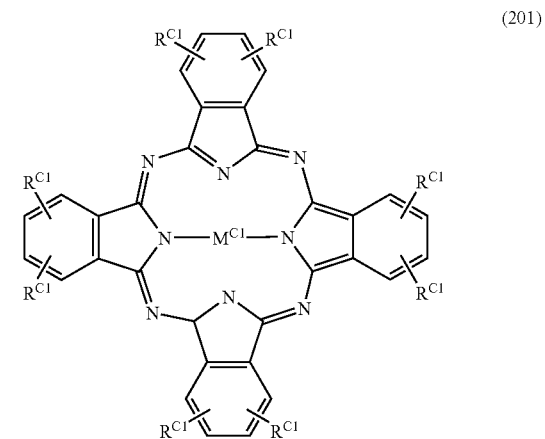
(201)

wherein $R^{C1}$ represents a hydrogen atom or an optional substituent, and the plurality of $R^{C1}$ may be the same or different from one another, and $M^{C1}$ represents a metal atom;

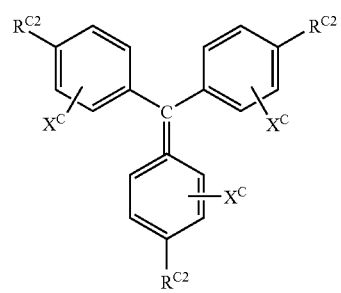
(202)

wherein $R^{C2}$ represents a hydrogen atom or an optional substituent, and the plurality of $R^{C2}$ may be the same or different from one another; $X^C$ represents a hydrogen atom, a sulfo group, a carboxyl group, a phosphono group, an amino group, or an alkyl group which may be substituted;

wherein the black ink contains at least one black dye selected from the group consisting of carbon black and water-soluble compounds represented by the following formula (301) and (302);

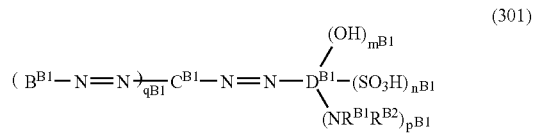
(301)

wherein each of $B^{B1}$, $C^{B1}$ and $D^{B1}$ which are independent of one another, represents an aromatic ring, and the aromatic ring may have an optional substituent, $m^{B1}$ represents an integer of from 0 to 1, $n^{B1}$ represents an integer of from 0 to 3, $p^{B1}$ represents an integer of from 0 to 2, and $q^{B1}$ represents an integer of from 0 to 4; in a case where a plurality of $B^{B1}$ are present, the respective $B^{B1}$ may be the same or different, and each of $R^{B1}$ and $R^{B2}$ which are independent of each other, is a hydrogen atom or an optional substituent;

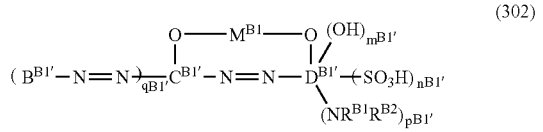

(302)

wherein each of $B^{B1'}$, $C^{B1'}$ and $D^{B1'}$ which are independent of one another, represents an aromatic ring, and the aromatic ring may have an optional substituent, $m^{B1'}$ represents an integer of from 0 to 1, $n^{B1'}$ represents an integer of from 0 to 3, $p^{B1'}$ represents an integer 0 to 2, and $q^{B1'}$ represents an integer of from 0 to 4; in a case where a plurality of $B^{B1'}$ are present, the respective $B^{B1'}$ may be the same or different; each of $R^{B1}$ and $R^{B2}$ which are independent of each other, is a hydrogen atom or an optional substituent; $M^{B1}$ represents a metal atom, provided that $M^{B1}$ is at least tri-coordinate, and in such a case, $M^{B1}$ may optionally be coordinated from an optional substituent or connecting moiety in the formula (302), or by an optional ligand at a specific ratio of counter ligand metal which such $M^{B1}$ has; or the metal ion may further be coordinated in the form of —O-M31-O— to the adjacent $B^{B1'}$ sandwiching the azo group in a case where a plurality of $B^{B1'}$ are present, or to $B^{B1'}$ and $C^{B1'}$.

24. A method for forming a color image, which comprises jetting water-based inks of magenta, yellow and cyan, or magenta, yellow, cyan and black, by an ink jet system, wherein the recording fluid as defined in claim 16 is used as the yellow ink.

25. The dye set according to claim 23, wherein the water-soluble azo metal chelate compound formed of an azo compound and a metal element is a water-soluble azo metal chelate compound formed of an azo compound represented by the following formula (103), and a metal element (103)

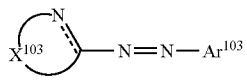

wherein the formula (103) represents an azo compound having at least one hydrophilic group in its molecule, and $X^{103}$ represents a plurality of atoms required to form at least one 5- to 7-membered heterocyclic group, and the heterocyclic group containing $X^{103}$ may have a substituent on its hetero ring, and the substituents on the hetero ring may be condensed to form a condensed ring, or the condensed hetero ring containing $X^{103}$ may further be substituted, and $Ar^{103}$ represents a substituted naphthyl group selected from the group consisting of formula (103-1), formula (103-2), and formula (103-3), $Y^{103}$ represents a chelating group, and $Z^{103}$ represents optional substituents which may be different from one another, and $a^{103}$ represents an integer of from 0 to 6

(103-1)

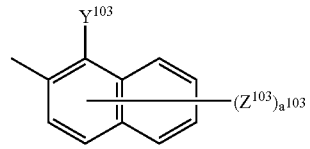

(103-2)

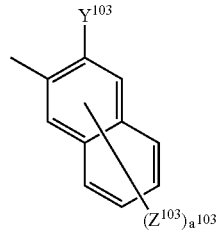

(103-3)

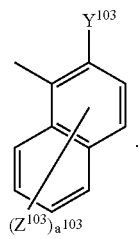

* * * * *